US 6,671,747 B1

(12) United States Patent
Benkual et al.

(10) Patent No.: US 6,671,747 B1
(45) Date of Patent: Dec. 30, 2003

(54) SYSTEM, APPARATUS, METHOD, AND COMPUTER PROGRAM FOR EXECUTION-ORDER PRESERVING UNCACHED WRITE COMBINE OPERATION

(75) Inventors: Jack Benkual, Cupertino, CA (US); Thomas Y. Ho, Fremont, CA (US); Jerome F. Duluk, Jr., Palo Alto, CA (US)

(73) Assignee: Apple Computer, Inc., Cupertino, CA (US)

( * ) Notice: Subject to any disclaimer, the term of this patent is extended or adjusted under 35 U.S.C. 154(b) by 552 days.

(21) Appl. No.: 09/632,278

(22) Filed: Aug. 3, 2000

(51) Int. Cl.[7] .................................................. G06F 3/00
(52) U.S. Cl. .............................. 710/1; 710/52; 710/65; 711/100; 712/225
(58) Field of Search ............................ 710/1, 5, 20, 31, 710/33, 36, 52, 65; 712/225; 709/223; 711/100, 147

(56) References Cited

U.S. PATENT DOCUMENTS

| | | | | |
|---|---|---|---|---|
| 4,564,952 A | * | 1/1986 | Karabinis et al. ............ | 375/232 |
| 4,961,581 A | * | 10/1990 | Barnes et al. ................ | 273/236 |
| 5,265,222 A | * | 11/1993 | Nishya et al. ................ | 706/10 |
| 6,201,540 B1 | * | 3/2001 | Gallup et al. ................ | 345/339 |
| 6,216,004 B1 | * | 4/2001 | Tiedemann et al. .......... | 455/442 |
| 6,243,744 B1 | * | 6/2001 | Snaman, Jr. et al. ......... | 709/220 |
| 6,263,493 B1 | * | 7/2001 | Ehrman .......................... | 717/6 |

* cited by examiner

*Primary Examiner*—Jeffrey Gaffin
*Assistant Examiner*—Rijue Mai
(74) *Attorney, Agent, or Firm*—Dorsey & Whitney LLP; R. Michael Ananian

(57) ABSTRACT

A mechanism that allows an application program running on a processor, to send data to a device using a medium that temporarily stores data and changes the order of the data dispatch on the way to the device. An inventive Random-In-First-Out (RIFO) buffer or memory device that restores the original order is provided. Several alternative approaches for implementing the RIFO control mechanisms for write efficiency and correctness. Method for use in conjunction with a data processing system having a host processor executing write instructions and communicating results in the form of symbols generated by the write instructions to at least one hardware device coupled to the host processor for receiving the symbols from the host processor, where the method preserves a predetermined order in which the symbols are received by the hardware device. Method includes sending a symbol from the host processor to a storage with an identifier indicating a symbol ordering relative to other of the symbols, storing the symbol and the indicator in the storage, and altering the order of dispatch of the symbols from the storage to the hardware device based on the indicator so that the symbols are received by the hardware device in the predetermined order independent of the order in which the symbols were communicated by the host processor. The invention also provides numerous embodiments of system, apparatus, method, computer program, and computer program product associated with the inventive concept.

7 Claims, 18 Drawing Sheets

SYSTEM, APPARATUS, METHOD, AND COMPUTER PROGRAM FOR EXECUTION-ORDER PRESERVING UNCACHED WRITE COMBINE OPERATION

FIELD OF INVENTION

This invention pertains generally to the field of computer system device write operations and more particularly to system, apparatus, method, and computer program for performing multiple write operations of data and/or commands from a processor or other command or data source to a hardware device in a manner that the processor's or executing procedure's intended order of receipt by the device is preserved.

BACKGROUND OF THE INVENTION

Heretofore, programs and/or processes that generate data and/or commands under programmatic control, such as in a device driver program, applications program, or the like, have frequently been forced to employ a conservative memory management strategy when the target for the command or data is a hardware device, so that the intended order of receipt of data or commands by the device is assured. Hardware devices (such as printer devices, modems, graphics processors, and the like, to name a few) may be problematic because such devices do or may respond immediately upon receipt of the particular command or data item, and may not typically wait to receive all of the data or commands that will be sent from a processor, microprocessor, or computing system. Waiting to receive all the data or comments would provide an opportunity to sort the data or commands into the temporal order intended by the application executing on the computing system and being communicated to the hardware device. In some instances, it would not even be possible for the hardware device to reconstruct the intended time order as insufficient information is provided to the device respective of the intended temporal order. Often the temporal order is an indicator of the identity of particular data or commands, so that out-of-order receipt causes the data on command to be interpreted by the receiving device in an unintended manner. A memory on the other hand, can typically wait for all of the anticipated data and/or commands to arrive before accessing it, and if required, restore it to the proper temporal order, before accessing it.

While this approach may be applicable to some hardware devices, for such hardware devices, this conservative approach (sometimes referred to as sequential, in-order, or strong memory management) unfortunately results in some degradation in performance, typically manifested as reduction of available bandwidth. On the other hand, if a less conservative memory management strategy (sometimes referred to as out-of-order or weak memory management) could be employed for hardware devices, then performance sacrifices could be minimized.

In the embodiment of a computer system 102 illustrated in FIG. 1, level 1 (L1) cache memory 252 is coupled to processor 250 via a bus 258, and level 2 (L2) cache 254 is coupled to processor 250 by bus 256. Bridge circuits as are known in the art may be interposed between the structure. The inventive structure and method described hereinafter are also applicable to multi-processor environments and multi-processor computers; however, we use the term processor or CPU generally to refer to single processor environments, dual-processor environments, and other multiple processor environments and computer or information processing systems. Caches 252, 254 serve to provide temporary memory storage for processing that may or will be needed for near-term execution cycles within the processor. For non-short term storage the system memory 278 would generally be used rather than caches 252, 254. The use of a cache memory in association with a processor 250 in a computing system 102 system of the type illustrated in FIG. 1 is known, and not described further.

System memory 278 may, for example comprise solid-state addressable Random Access Memory (RAM) of which there are many conventional varieties, and is used to store commands, addresses, data, and procedures for use by the computer system 102. System memory 278 may for example, store all, or portions of hardware drivers for operating devices 290, 292, 110 and in the inventive graphic processor 210 described above.

Processor 250 is also connected to a write buffer 204 by address bus (ADDR) 260, and data bus (DAT) 262. Write buffer 204 is interposed between processor 250 and memory controller 268 which controls the flow of command/control/address/data between write buffer 204 and either system memory 278 or devices attached to one or more peripheral busses, such as a graphics processor 110 on a Advanced Graphics Processor (AGP) Bus 286, or Device "A" 290 or Device "B" 292 on a Personal Computer Interface (PCI) Bus 288. Devices "A" or "B" could for example, comprise printers, cameras or other sensors, modems, secondary processors, other graphics processors, and any other conventionally known computer device or system.

It should also be understood that such devices need not be PCI Bus compatible devices, but may also include for example AGP Bus, SCSI, ISA, Universal Serial Bus (USB), fibre channel, fire wire, or other compatible devices, and that such devices may be configured to operate internal to a computer housing such as within a slot on the computer motherboard, or as external peripheral devices connected by cable or wireless connection. The types of computer system devices or hardware devices include the types used for IBM compatible personal computers (PCs), MacIntosh PowerMac, Power PC, iMAC, and the like computers made by Apple Computer, workstations (such as, for example, the Sun Microsystems, SPARC workstation), specialized microprocessors, or even mainframe type computer systems.

Processor 250 may be of the type having internal or external caches with or without chipsets connecting to I/O or graphics processor buses, or where multiple processors are connected tightly or distributively sharing or not storing memory. Such microprocessor may for example implement RISC, CISC, VWIS, or other instruction sets and may support speculative execution, or the like advanced processing concepts. For example, the Intel Pentium, Intel Pentium II, Intel Pentium III, Intel Merced, ARM, Advanced Micro Devices K6, Advanced Micro Devices K6-3 or K7, Compaq Alpha, IBM Power PC, Sun Microsystems SPARC, Silicon Graphics (SGI) MIPS or any other processor, microprocessor or CPU may be used. Systems may also include a plurality of the same or different processors.

Of particular interest are the Intel Pentium® II & III microprocessors (and other successor processors that utilize the functionality) which utilize fast writes and uncached write combine operations. Other modem processors also generate results out-of-order, for example as a result of speculative execution, branch operations, parallel processing, and the like. Generally, uncached write operations refer to program-generated data written directly to system memory, rather than to an L1 or L2 cache. This may also be called uncached speculative write combining (USWC), and part of the address space of the processor may be specified to be of the UWSC type. The advantage of USWC-type memory is the ability to receive out-of-order write operations shortly after the processor generates a write operation, avoiding synchronization with other write operations, thereby increasing processing throughput.

Write buffer 204 is of conventional type and may for example be implemented with a static RAM. Usually, processor 250, L1 cache 252, and write buffer 204 are formed on a single common substrate within a single chip. Write buffer 204 may be envisioned as including a plurality (for example "n") of cache lines 205 for temporarily storing command/address/data sent from processor 250 to memory controller 268 and ultimately to either system memory 278 or other input/output or peripheral devices, including for example device "A" 290, device "B" 292, or hardware device 110.

In the embodiment illustrated in FIG. 1, the hardware device includes a hardware device processor 134 (such as a graphics pipeline of a graphics processor), and a First-In-First-Out (FIFO) memory 120 interposed between AGP bus 286 communicating information from the host processor 207 to the hardware device processor 134. FIFO memories or buffers are known in the art and not described further here, except in order to distinguish conventional structure or operation from the inventive structure, operation, and method. Conventional structures, lines, signals, and the like, not central to understanding the invention are implied but are not shown in the drawings to avoid obscuring the invention.

We now describe the some problems associated with out-of-order generation of datum (include data and commands) by the computer system. In high-performance computer systems, there is a desire to execute instructions as rapidly and efficiently as possible. This often means that either intermediate or final "results" are generated out-of-order from the order they will be used, or out-of-order relative to the desired order of receipt by some other process or device. Usually, if the results are only to be written to a memory, such as to memory system memory 278, the order in which such results (datum) are generated is not important since either the subsequent process can wait until all results have been generated, or the results (datum) will be retrieved from memory in the order desired. Usually, the results are written to particular address locations and proper ordering is inherent in reading the final memory contents at the completion of the process. So for example, if it is ultimately desired to read the contents of memory locations 001h–008h (h=hexadecimal) in order of ascending address location, but the contents of these memory locations were generated in the order 002h, 001h, 005h, 006h, 004h, 003h, 008h, 007h, it is only necessary to read the results from memory in the proper ascending order after the values have been written to memory.

However, a problem arises in a computer system where the processor 250 treats a device, such as graphics processor 110, or devices "A" or "B" as memory. This paradigm is sometime referred to as the "memory mapped I/O" model. A system using memory mapped I/O devices are addressed at certain reserved address ranges on the main memory bus, these addresses cannot therefore be used for system memory, and when memory mapped I/O is used, it may not be possible for the processor or memory controller to treat datum destined for system memory to be treated differently from datum destined for the I/O devices. This problem arises when the operation of a device depends on the correct order of receipt of commands or data where there is no opportunity to delay the expression of a received data or command item until it is reordered.

In one simple example of this problematic situation, consider a printer or printing device that prints each character as it is received. The order in which each character is received is important to the correct operation of the printer device. If the intended characters and/or words "dog ran down the street" are received out of order, the printer might print each letter as it is received and erroneously print "god ran down the street", "street ran down the dog", "the street ran down god", or something entirely unintelligible. Preserving order is important.

The out-of-order result is due at least in part to the use of cached or uncached write combine mode in a system where the processor can not determine or does not determine that it is writing to an I/O device or other device where order may be important rather than to a memory.

One conventional approach to eliminate the occurrence of the out-of-order result is to apply a so called "strong memory model" to the I/O access rather than a so called "weak memory model". Conventionally, a strong memory model assumes that all read and write from all processors are in sequential order and as a result, the I/O devices will receive them in the same order in which they have been issued. In a weak memory model, there is an assumption that memory reads and writes can go out-of-order from the order in which they are issued by the same or other processors so that a synchronization and reordering is required on the receiving side to ensure correct processing at the receiver. There is somewhat of a continuum between the strong and weak memory models so that intermediate levels of performance (and problems) may be realized.

Therefore, absent some additional mechanism for preserving order, datum or other results may reach a device out of order from that intended by the process generating the results, for example, out of the order intended by the applications program or device driver.

One such order preserving mechanism applicable to a limited class of situations but which does not solve the problem for reasons described hereinafter, is the "write fence". A write fence is a special processor operation (included in some Intel processors) or command in the form of an instruction that asserts signals between the processor and the write buffer or otherwise communicates with the processor and the write buffer, to signify that the later (second) write block on one side of the write fence is to be held (not sent to the I/O device) until the earlier (first) write block has been sent to the I/O device. Here, earlier (first) refers to the intended programmatic order and later (second) refers to subsequent programmatic order, rather than to the actual temporal order of the result. A conventional write fence command is a low level (usually an assembly language code level) primitive that does not typically exist in high level programming languages.

This type of fence can provide some order presentation between write blocks, but unfortunately, a fence written by the conventional Write Fence command, while present in the instruction memory, does not get sent to an I/O or hardware device and is therefore not visible to such I/O devices, and cannot be used to solve the problems in these conventional systems. Also, even if the write fence could be seen by the hardware I/O device, the write fence would not generally assist in maintaining temporal order or result identity within a single cache line, and some mis-ordering or scrambling would still occur.

For a system in which a particular device, which benefits from receiving data and commands in the temporal order intended by the device driver of other program, is coupled to a processor 250 and write buffer 204 having conventional design, there therefore remains a need for system, apparatus, and method that maintains the ordering intended by the software or firmware driver program.

SUMMARY OF THE INVENTION

Figure 1:
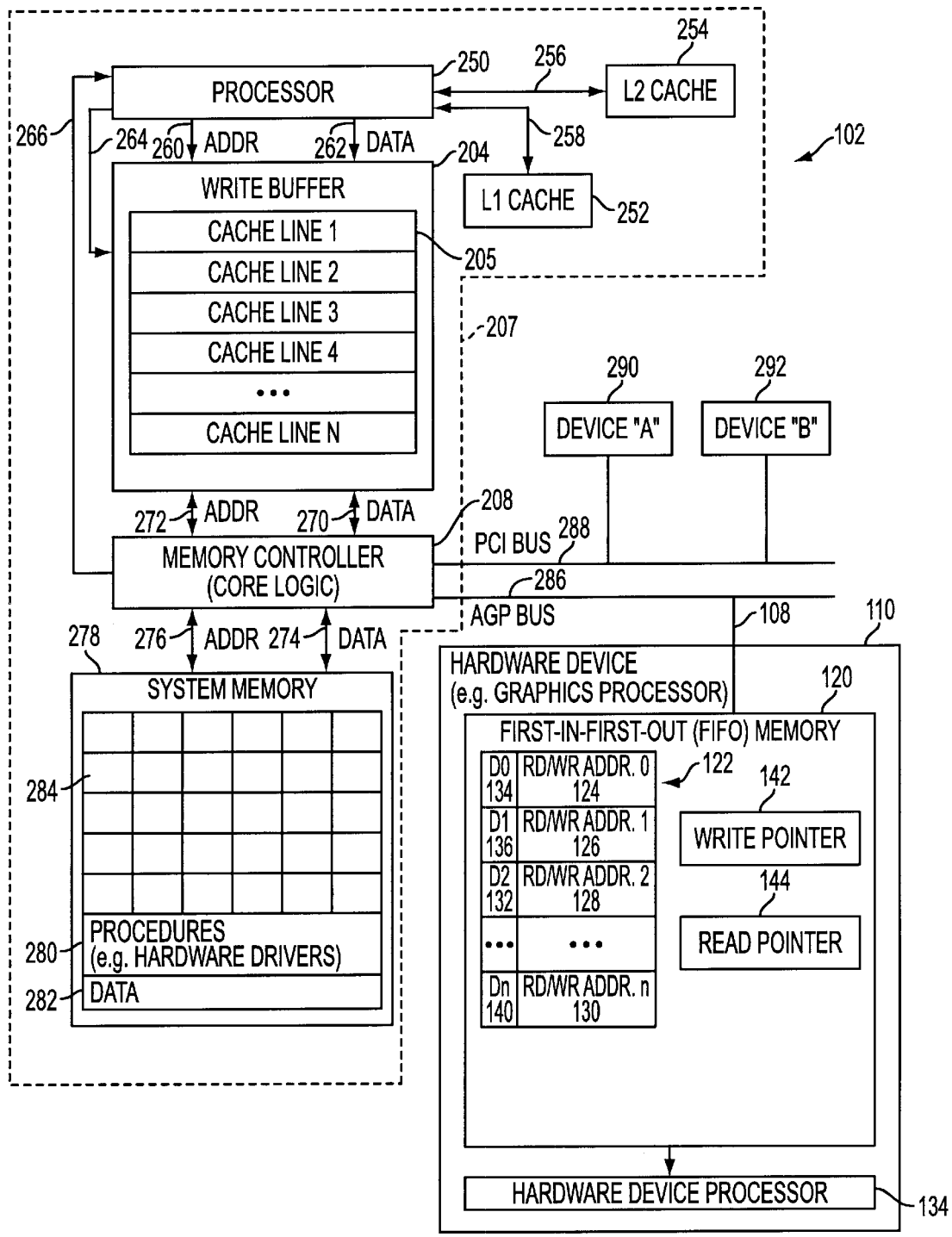
FIG. 1 is an illustration showing a conventional computer system wherein the hardware device incorporates a conventional First-In-First-Out (FIFO) receiving datum within the hardware device.

The inventive structure and method provide a mechanism that allows an application, such as an application program running on a processor, to send data to a device using a medium that temporarily stores data and changes the order of the data dispatch on the way to the device. To achieve this task an inventive system, apparatus, method, and computer program for a Random-In-First-Out (RIFO) buffer or memory device that restores the original order is provided. The invention provides several alternative approaches for implementing the RIFO control mechanisms for write efficiency and correctness.

In one aspect, the invention provides a method for use in conjunction with a data processing system having a host processor executing write instructions and communicating results in the form of symbols generated by the write instructions to at least one hardware device coupled to the host processor for receiving the symbols from the host processor, where the method preserves a predetermined order in which the symbols are received by the hardware device. The method includes the steps of sending a symbol from the host processor to a storage with an identifier indicating a symbol ordering relative to other of the symbols, storing the symbol and the indicator in the storage, and altering the order of dispatch of the symbols from the storage to the hardware device based on the indicator so that the symbols are received by the hardware device in the predetermined order independent of the order in which the symbols were communicated by the host processor. The indicator may be a bit associated with an address. The method may further optionally include executing a write fence operation in the host processor when a particular first symbol is intended to be received by the hardware device before the hardware device receives a second symbol. This method may further include changing the state of the bit associated with the address from a current state to a different state every time the step of executing a write fence operation is preformed.

In another aspect, the invention utilizes validity flags to identify whether a symbol at a particular location is valid or invalid. This method for preserving a predetermined order in which the symbols are received by the hardware device from a data processing system having a host processor executing write instructions and communicating results in the form of symbols generated by the write instructions to at least one hardware device coupled to the host processor for receiving the symbols from the host processor, includes the steps of: sending a symbol from the host processor to a storage with an address indicating a symbol ordering relative to other of the symbols; storing the sent symbol at a location in the storage if a flag indicator associated with the location indicates the storage does not have valid data at the address, the location being associated with the address; waiting to store the sent symbol at the location in the storage if the flag indicator associated with the location indicates the storage contains a valid symbol at the location; reading, in a sequential location manner, a next symbol from the storage at a next location if a flag indicator associated with the next location indicates the storage contains the valid symbol at the next location; and waiting to read from the next location if the flag indicator associated with the next location indicates the storage does not contain a the valid symbol at the next location.

In another aspect, the invention provides a novel type of buffer memory referred to as a random-in-first-out (RIFO) buffer memory. The RIFO may be counter based or validity flag based. The counter based RIFO includes: a first memory storing a plurality of data words, the first memory associated with more than one address range in an address space of a processor; a first counter storing the number of data words stored in the first memory that are considered to be stored out-of-order; a second counter storing the number of data words in the first memory that are considered to be stored in-order; first logic detecting a condition of data written to the first memory being written to an address in a first one of the more than one address spaces and a condition of prior data written to an address in a second one of the more than one address spaces; and second logic adding the number in the first counter to the number in the second counter when the condition is detected.

In another aspect, the invention provides a random-in-first-out (RIFO) that utilizes valid flags in its operation. This alternative RIFO includes a first memory storing a plurality of data words in a plurality of memory locations; a plurality of validity indicators, at least one the validity indicators corresponding to each the memory location; first logic receiving data elements with associated write addresses into the first memory, the associated write addresses being received in a non-sequential order; second logic determining, for each the data element, whether to write the data element into the first memory at a selected memory location selected by the associated write address based on the validity indicator corresponding the selected memory location; and third logic reading, in a sequential address order, the written data elements from the first memory based on the validity indicators.

In yet another aspect, the inventive buffer comprises: a first memory for storing data received from a processor, first logic associating first data words in the memory with a first condition of being out of order, second logic associating second data words in the memory with a second condition of being in order, third logic detecting the third condition of a write fence instruction being executed by the processor; and fourth logic changing the associated first condition to the second condition for the first words when the third condition is detected.

The invention also provides method, computer program, and computer program product associated with the inventive structures.

DETAILED DESCRIPTION OF EMBODIMENTS OF THE INVENTION

Figure 2:
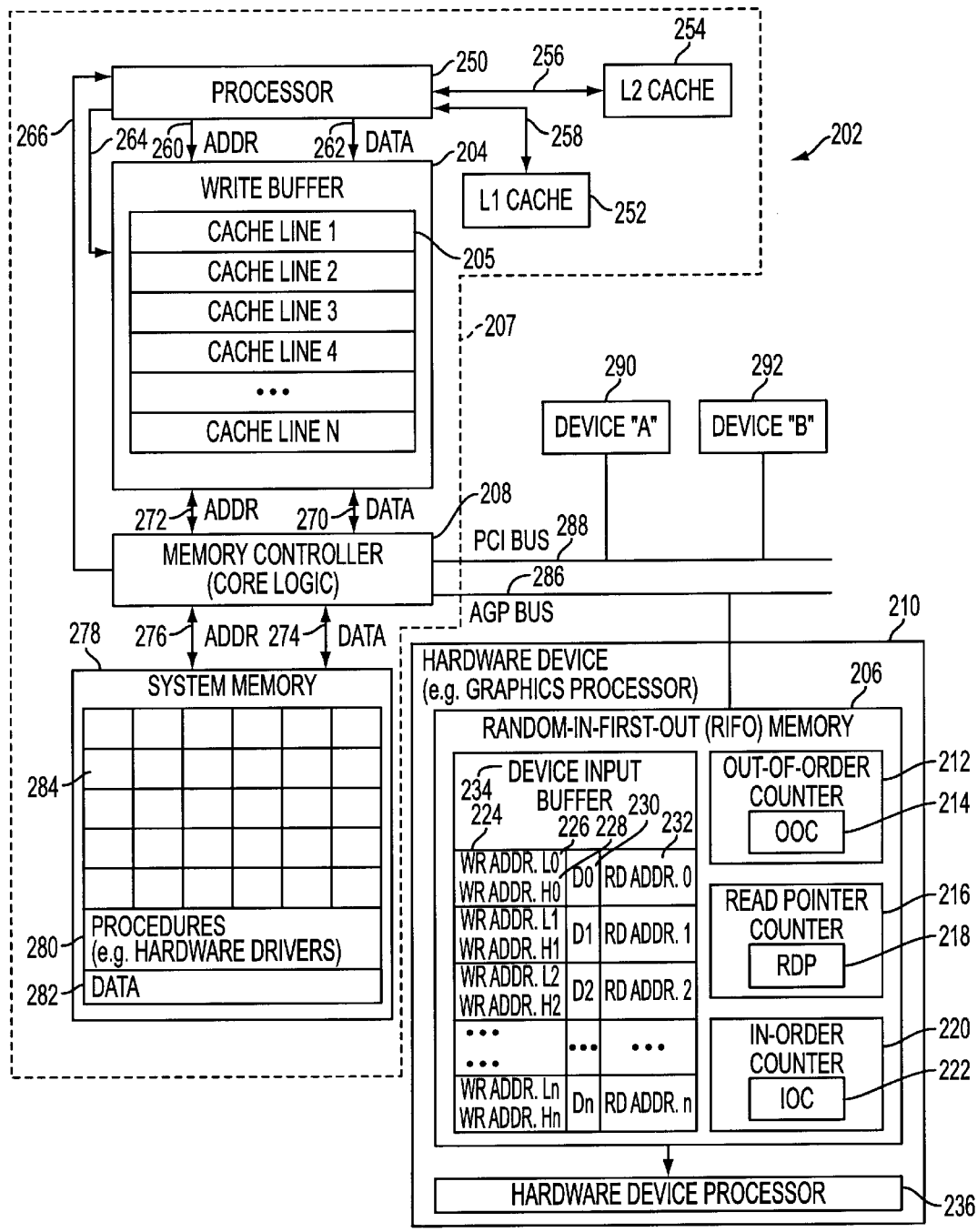
FIG. 2 is an illustration showing an embodiment of the inventive computer system wherein the hardware device incorporates the inventive order preserving Random-In-First-Out (RIFO) receiving datum within the hardware device.

An exemplary embodiment of the invention is now described relative to the embodiment of a computer system 202 illustrated in FIG. 2. Hereinafter, it is assumed that the computer system 202 comprises a single host processor 207, but a plurality of host processors 207 can be used with the invention presented herein. In the exemplary embodiment, data and/or commands are received from write buffer 204 into a Random-In-First-Out (RIFO) data structure 206 within a physical memory storage located within the hardware device 210, rather than into a conventional linear First-In-First-Out (FIFO) 106 within a memory store of the device 108 as illustrated in FIG. 1. The differences and advantages of the RIFO 206 as compared to the FIFO 106, and the manner in which the RIFO 206 operates to provide some of the inventive features is described in detail elsewhere in this specification.

RIFO addresses are generated (or identified) under programmatic control (typically, by the program in the order the program wants the device to which the data/control is being sent to receive the data/control command status or the like, also referred to as results or symbols. Because an address is associated with each data/control item, the device input buffer controller can sort any data/control items that are received out-of-program-order into the desired or intended order based on its address. Maintaining temporal order of the commands, control, status, and/or data by the hardware device may be important or even essential for proper operation of the device.

For example, in one embodiment of the invention, the hardware device is an advanced graphics processor, such as for example the graphics processor described in copending U.S. patent application Ser. No. 09/378,637 filed Aug. 20, 1999 entitled Graphics Processor with Deferred Shading and in copending U.S. patent application Ser. No. 09/377,503 filed Aug. 20, 1999 entitled Deferred Shading Graphics Pipeline Processor Having Advanced Features, each assigned to the assignee of the instant invention which application is hereby incorporated by reference. In embodiments of that graphics processor, commands, data, status, or other information items are sent from the host processor in the form of tokens (address/data pairs) which are received by the graphics processor. For example, sets of drawn lines identified in a "draw_line" type command communicate a set of four coordinates "xstart", "ystart", "xend", and "yend" to the graphics processor pipeline. These coordinate data must be received in the order expected otherwise the wrong line will be drawn. For example, if "xend" is received before "ystart" then the line will be drawn from the coordinate point pair (xstart, xend) to (ystart, yend) which is a different line than the intended line drawn from (xstart, ystart) to (xend, yend).

In the inventive structure and method, addresses are assigned to each data/command item that are to be sent to the hardware device 210 including RIFO 206 and hardware device processor 236 by a procedure (typically a hardware device driver 280) in software or firmware running in the host processor 207 and system memory 278 at the time the procedure generates or identifies the data/command item to be sent. In some embodiments, the address will be identified to the item just prior to its generation, in other embodiments the address may be identified after generation. The manner in which the address of a hardware device physical memory location is identified to a host processor write operation is described in greater detail hereinafter relative to the step-by-step sequential write and read operations summarized in Tables 1–3.

It is advantageous for the hardware device 210 to know that the intended physical memory address of interest within the device has actually been written with current data/control and that the contents at that address are ready to be read, and that the item stored at that address is not merely "old" data. In one embodiment of the invention, this is achieved in part using an indicator in the form of an address discontinuity coupled to the execution of a Write Fence command and communicated by the processor to the device when it sends new data/control, an in-order counter and its in-order count (IOC), an out-of-order counter and its out-of-order count (OOC), and a read pointer (RDP). An in-order-pointer (IOP) is also provided in some embodiments of the invention.

In this connection, a particular circular data structure which we shall refer to as a Random-In-First-Out or RIFO data structure 206 having a first plurality of physical addressable memory locations 232 is defined in device physical memory and a second plurality of virtual or logical addressable storage locations 224, 226. The RIFO is conveniently located within the hardware device 210, facilitating communication between the host processor 207 and with the hardware device processor 236. Each RIFO physical memory location in device input buffer 234 is adapted to store an item of data or command. The RIFO may be addressable on bit, byte, word, double-precision word, or other boundaries as desired, but in the embodiment described in detail here, we describe the inventive structure and method on the basis of word boundary addressability for convenience.

The second plurality of virtual or logical memory locations is greater than the first plurality of physical memory locations for reasons explained below, and in a preferred embodiment of the invention, the number of logical memory locations is twice the number of physical locations. Stated equivalently, each physical RIFO memory location has a corresponding Device Input Buffer Read Address (or simply read addresses) 232, usually specified in words, and two different write address locations referred to as Device Write Address Space 1 (low-write address) 224 and Device Write Address Space 2 (high-write address) 226. The processor 250 or memory controller 268 on the host or processor 250 side of bus 286 effectively sees the logical or virtual memory locations low-write address 224 and high-write address 226, while hardware device 210 on the read side of bus 286 effectively sees and uses the physical or read address locations 232.

The RIFO should be sized such that there are sufficient physical memory locations in RIFO 206 to store the amount or number of data/command items that are sent from write buffer 204, or more generally from host processor 207, without filling up the physical memory locations before the data/command items can be acted upon, used, processed, communicated to other devices, or otherwise consumed by the hardware device 210. Enhancements to the basic RIFO structure and method are also described that assist in controlling the RIFO and structures that operate in conjunction with the RIFO to lessen or eliminate the possibility that the RIFO 206 will fill.

In the embodiment described below, a RIFO 206 having 8192 (2×4096) decimal logically addressable memory locations is implemented in circular manner in physical memory having at least 4096 physically addressable locations. Of course, the physical memory itself may be larger to permit storage of additional information, or the physical memory may be used exclusively for RIFO 206 and other different memory provided within hardware device 210 for other storage functionality. The size of 4096 is chosen as an example to make description of the invention easier, but the size can be easily changed to be optimized for a particular product or function.

In one particular embodiment of the invention, the 4096 addresses are defined on 32-bit double-precision word boundaries. For example, a 1 kbyte×32 bit dual port SRAM module is used to provide the 4 kilobytes of RIFO memory 206. The RIFO memory 206 may be single-ported or double-ported, but is advantageously double-ported so as to support simultaneous asynchronous read and write operations from the hardware device processor 236 and from the memory controller 268 within the host, respectively.

For a RIFO having 4096 addressable physical memory locations, there will be 8192 virtual memory locations, partitioned into a first or low memory address range (000000000000 to 111111111111 ($2^{12}$–1) binary, 0 to 4095 decimal, or 0 to FFF hexadecimal); and a second or high memory address range (1000000000000 ($2^{12}$) to 1111111111111 ($2^{13}$–1) binary, 4096 to 8191 decimal, or 1000 to 1FFF hexadecimal). It is noted that when the number of logical address locations is twice the number of physical address locations and a power of 2, the most significant binary bit may serve as an address range indicator or address range flag, where the bit in a "0" logic state designates the low address range and the bit in a "1" logic state designates the high address range.

In at least one embodiment of the invention, the communication of a transition from a high range address to a low range address and from a low range address to a high range address serves to communicate the presence of a write fence between one or more write operations or blocks of write operations. In essence, the address sent with the data or command includes a bit that serves as a flag to identify the presence of the write fence (corresponding to a Write Fence instruction executed by the processor 250), thereby communicating the execution of a Write Fence operation to the hardware device 210 that would otherwise not be communicated to the hardware device. This bit may alternatively be characterized as a write fence indicator bit or flag. Multiple bits may be used, as well as other bit coding schemes, but are not generally needed as a single bit suffices. Two counters (out-of-order counter 212 and in-order counter 216) and their counts (out-of-order count 214 and in-order count 222), and a read pointer counter 216 and its read pointer 218, further control operation of the RIFO and/or access to the RIFO by memory controller 268 and hardware device processor 236. For example, the counters and pointers, indicate the currency or validity of the items stored in physical memory.

The RIFO is referred to as being circular because as an address pointer reaches the upper end of the address range, incrementing the address pointer further returns it to zero and the memory locations are reused in circular manner. This is an additional reason why the memory should have sufficient size to prevent later entries from overrunning earlier entries that may still have valid datum which is needed. Optional enhancements to the invention are also described hereinafter that reduce or eliminate read and write overrun.

Of course, those workers having ordinary skill in the art, in light of this description, will appreciate that in other embodiments of the invention, the least significant address bit, or some other predetermined bit or set of bits might also serve as the write fence indicator, and that where it is desired to provide additional information to the device, a plurality of bits may be used to communicate a plurality of different status, states, conditions, or commands.

The RIFO 206 is used in conjunction with an out-of-order counter 212 and its out-of-order count (OOC) 214, in-order counter 220 and its in-order count (IOC) 222, and a read pointer counter 216 and its read pointer (RDP) 218. An optional In-Order Pointer (IOP) is also implemented for some embodiments of the invention.

The out-of-order count 214 indicates the number of entries received that were written since the last fence was detected. The in-order count 222 indicates the number of in-order entries that are available to be dispatched to the hardware device processor 236. Read pointer 218 points to the address of the first in-order entry that is ready to be dispatched.

Operations in the out-of-order, in-order, and read pointer counter are carried out "modulo-(number of entries in the buffer)", modulo 1 k for example, so that the RIFO data structure is utilized in a circular manner. The size of the data structure should be sufficient to store a number of data groups separated by write fences, so that no concern need arise relative to overwriting still needed information in a subsequent write operation.

With referenced to FIG. 2, we now describe a sequence of Device Write Operations and the result of execution of these Device Write Operations on exemplary Cache Lines 205 within a Write Buffer 204 within the host processor 207, on the contents and organization of contents of an exemplary embodiment of the inventive Random-In-First-Out (RIFO) 206 data structure in a memory of hardware device 210.

In the exemplary embodiment, computer system 202 includes a host processor 207 which communicates data, status, commands, and the like, with external devices such as optional device "A" 290, optional device "B" 292, and hardware device 210 over one or more busses, such as a PCI bus 288 and/or an advanced graphics port (AGP) bus 286. Host processor 207 includes processor 250, level 1 (L1) cache 252, level 2 (L2) cache 254, write buffer 204 having a plurality of write buffer cache lines 205, a memory controller (some times referred to as core logic) 268, and system memory 278. One or more of caches L1 and L2 are optional. Each of the microprocessor components 252, 254, 204, 268, 278 are coupled to other constituent elements within the host processor 207 in conventional manner as illustrated in FIG. 2. Computer system 202 is exemplary and the inventive RIFO structure and method may be used with many other available computer system architectures. As the structure of microprocessors is well known in the art, we do not describe the structures or relationships between structures further here. Those workers having ordinary skill in the art in light of the description provided here, will appreciate that the inventive structure and method may be used with a variety of microprocessor or computer architectures, and that the system illustrated in FIG. 2 is only provided so that the inventive Random-In-First-Out memory structure, the method for operating the RIFO structure, the method for preserving execution order during uncached write combine operations, and other aspects of the invention may be more readily understood.

For example, the host processor 207 may equivalently be provided by a variety of personal computer products, information appliances, PDAs, palmtop computers, workstations, and the like. Personal computer systems or workstations made by Compaq, Dell, IBM, Sun Microsystems, Apple Computers, and the like employing so called "386", "486", Intel Pentium, Intel Pentium II, Intel Pentium III, Advanced Micro Devices K6, National Semiconductor microprocessors, PowerPC, and the like processors and improved versions thereof, for example may be used with the invention.

In Table 1 are illustrated seventeen groups of processor commands that implement device write operations. For purposes of clearer explanation, the entries in Table 1 include only device write operations, however, it should be understood that other processor operations would normally be interspersed among the write operations. Only write operations have been shown, because only the write operations have an effect on the write buffer cache lines and on the RIFO content and organization. The exemplary groups of write operations in Table 1 variously contain 1, 2, 3 or 4 individual write operations and the number of write operations in each group are merely meant to provide variation for purposes of illustration (for example, group 5 includes two "WRITE" operations 5$a$ and 5$b$).

In Table 1, the term "WRITE" means any write operation and is not tied to any particular programming or instruction language. For example, in the assembly language on a Pentium platform, a "WRITE" operation oft his type would be performed using the "MOV", "MOVSD", or "STOSD" commands. In this document, the syntax "WRITE 1$b$ To addr. A+0+4" means write the datum (data or command) 1$b$ to RIFO address A+0+4, where "A" is the base address and "A+0+4" means the base address in low-order memory ("0" signifying the low memory offset versus 4096 signifying the high memory offset) plus four (4) bytes or one (1) word further offset. In analogous manner, the syntax "A+4096+108" means base address plus 4096 byte offset into high-order memory plus a 108 byte further offset. The meanings and usage of this syntax, especially the meaning of low-order, high-order, and offset in the context of the inventive RIFO will become even clearer when we consider some examples later in the description.

It is important to appreciate that the order of the write operations presented in Table 1 is the order desired by the processor procedure, such as by the device driver 280 procedure executing in processor 250, 207. This ordering may be accomplished by software or firmware executing on the computer or host processor 207. In this regard, it is intended that the order of write operations be as follows: 1$a$, 1$b$, 1$c$, 1$d$, 2$a$, 2$b$, 2$c$, 2$d$, 3$a$, 3$b$, 3$c$, 4$a$, 5$a$, 5$b$, . . . , 14$d$, 15$a$, . . . , etc. It is also important to appreciate that while the actual order of execution of the commands may or may not be important for the operation of the hardware device to which the datum are directed, the order of receipt of the command is assumed to be important. This may not always be the case, or may be the case for some operations and not for others. In any event, preserving order in situations where order is not important will not generally be a detriment to the operation. To this end, the inventive structure and method are designed to receive the datum from the write operations in random order yet present them to the hardware device processor 236 in the intended order. This is one reason why embodiments of the invention are referred to as a Random-In-First-Out data structure in memory, or more simply a RIFO memory 206.

Table 2 (Tables 2A–2Z) provide sequential snapshots of the contents of cache lines 205 of an exemplary write buffer 204 at different times t. For simplicity of description, the write buffer includes only five cache lines identified as cache line 0, cache line 1, cache line 2, cache line 3, and cache line 4. Usually many more cache lines would exist in a write buffer. In the table, each cache line of the write buffer 204 is associated with a RIFO address which is the address range that the processor 250 has associated with that cache line 205.

We start our examination with Table 2A which illustrates the contents of a five cache linexeight word write buffer 204 within the computer system 202 or host processor 207 at time t=$t_0$. An "X" entry means either that we do not care what the contents stored at that address location are, or that we do not know what the contents of that address location are, or simply that the contents are not valid. Each entry in Table 2A is an "X" and represents some initial state. One might equally well assume that an "X" indicated a "0" value, or any other value.

From Table 2b we see that as of time t=$t_1$, the processor has sent four words (1$a$, 1$b$, 1$c$, 1$d$) to cache line 1 ("CL1") to be stored in the RIFO beginning at address A+0+0 (which for four words is actually to A+0+0, A+0+4, A+0+8, and A+0+12). Of course it is understood that bit, byte, word, double-precision word, or the like boundaries might alternatively be identified. For purposes of this description, it is assumed that the write buffer 204 is implemented by a standard set of rules or procedures so that the write buffer 204 does not fill up and an appropriate write buffer cache line 205 is allocated for the write cache line operation. Those workers having ordinary skill in the art will also appreciate in light of the disclosure provided herein that the write buffer 204 would have a greater number of cache lines 205 (for example, "n" cache lines) rather than five cache lines, and that the number of lines and the width (number of bits or number of words) of each cache line has been keep small in this example so that the underlying methodology is not obscured by an excessive number of entries.

Basically, the processor 250 writes to write buffer 204 as datum become available, and are written from the write buffer 204 to system memory 278 or to a hardware device 210, as the case may be, according to conventional memory mapping rules, as is known in the art. The write buffer 204 provides for write combining, which is, multiple writes from the processor 250 to a particular cache line 205 are then combined into one write operation from the particular cache line to system memory 278, a hardware device 210, or other location within the address space of the processor.

During succeeding cache write operations, processor 250 writes datum 8a, 8b, 8c, 8d beginning at A+0+64 (Table 2C for t=$t_2$), then 2a, 2b, 2c, 2d beginning at RIFO address A+0+16 (Table 2D for t=$t_3$), and then 6a, 6b beginning at RIFO address A+0+32 (Table 2E for t=$t_4$). Generally, bold characters in the table signify current operations or changes, or addresses for the RIFO that are being addressed for a write operation (some of which can be masked). However, at this stage, cache line 1 (CL1) is full and the write buffer 204 sends the contents of CL1 with its associated address tags to the memory controller 268. The memory controller does a write operation into the processor's 250 address space at the locations indicated by the address tags, thus sending the contents of CL1 with its associated address tags to the RIFO in a first RIFO Write operation (RIFOWR1) (Table 2F at t=$t_5$). In this context, an address tag refers to the address of the cache line or write buffer line and may also include an enable for the data on that line. The "W" in the tables indicate that the contents previously stored in the cache line (see "1a, 1b, 1c, 1d, 2a, 2b, 2c, 2d" in Table 2E) have been written out of the cache line (see "$W_1W_1W_1W_1W_1W_1W_1$" in Table 2F). In some instances a zero subscripted W, that is "$W_0$," is used to identify fields within the cache line that do not have valid data for subsequent operations (See for example Table 2R). The zero subscript identifies a masked condition (i.e., the write is not done), and the one subscript (i.e., $W_1$) identifies a non-masked condition. Masking for memory read/write operations is known in the art and not described further here but the use as a masking bit is new in the context of the RIFO. In many instances, it is more efficient to write out a cache line from write buffer 204 before it is full and in such instances it is advantageous to designate which fields contain valid data and which do not. Valid fields would have a "1" Mask bit value or state in the valid fields and a "0" in the non-valid fields.

Upon the occurrence of the first RIFO write operation, we now turn to Tables 3A and 3B, which show a presumed initial state of the RIFO (Table 3A at time t=$t_0$) and a state of the RIFO after RIFOWR1 operation has completed (Table 3B at time t=t5). We observe that datum (1a, 1b, 1c, 1d, 2a, 2b, 2c, 2d) have been stored at the RIFO Device Write Address Space 1 addresses A+0+0 through A+0+28 as specified by the program instructions (See Table 1). At the end of the first RIFO Write operation (Table 3B), the out-of-order-counter has a value of 8 (OOC=8), the in-order-counter has a value of zero (IOC=0), and the read pointer has a value of zero (RDP=0).

In subsequent operations, datum 3a–3c (Table 2G at t=$t_6$), and datum 5a–5b (Table 2H at t=$t_7$) are written to the cache before the next RIFO write operation during which the contents of cache line 0 (XXX8a8b8c8dX) are written to RIFO ($W_1$) address A+0+64 (Table 2I at t=$t_8$). Actually, in this instance, only datum 8a, 8b, 8c, 8d are valid and map to RIFO Device Write Address Space locations A+0+76 through A+0+88 as further illustrated in Table 3C at t=$t_8$. The masked locations ($W_0$), A+0+64, A+0+68, A+0+72, and A+0+92 are not actually written to as the cache line does not include valid data for those address locations. Note also that upon writing these four additional datum to the RIFO, the OOC increases from OOC=8 to OOC=12, while the in-order counter and the read pointer are unchanged (IOC=0 and RDP=0). The mechanism will also work if not valid data is also written into the RIFO as long as they are marked as such.

Note that, in this example, the order in which datum appear in the write buffer cache lines 205 does not have any deterministic relationship relative to the order of the commands that generated the data in the program. This is because we assume that the processor does not maintain the order of the input commands in the output datum, as a result, for example, of speculative and/or out-of-order execution, branching, parallel execution, provision of multiple execution units, or the like structures or methodologies employed in contemporary processor, microprocessor, and computer systems design generally.

In the following stage (Table 2J at t=$t_9$), datum 7a–7c are written to cache line 4 (CL4) having an associated starting RIFO address A+0+64 and at that stage write buffer 205 has two partially filled cache lines (CL2 and CL4). (Note that this RIFO address is the same as the one used at t=$t_5$, but the RIFO address is a base address for eight words, and these two write operations do not conflict because they write to different words at the same base address)

At the next stage (Table 2K at time t=$t_{10}$) we note that the address range associated with the first location in CL1 storing datum 9a is A+4096+64 and the address range associated with the first location in CL3 storing datum 9b–9c is A+4096+96 while the address range associated with CL2 and CL4 are A+0+32 and A+0+64 respectively. This address range discontinuity is used as an indicator or flag to communicate to hardware device 210 via RIFO 206 that a "write fence" operation preceded the command or operation which generated the 9a–9c datum, and that until all write operations preceding the write fence have been received, these post-write-fence datum (CL1 and CL2) should not be read from the RIFO even though they may have been written from write buffer 204 to RIFO 206. As soon as the actual write fence is detected by the write buffer, typically all outstanding writes are flushed. It is much more complicated, but feasible, to keep data of two domains separated by a write fence in the write buffer. The write buffer has no knowledge typically of the address changing mechanism for write fences. The write fence is generally part of the driver software that is responsible for writing data to a hardware device.

Referring back to Table 1, we observe that a first write fence operation occurs as processor operation Group 9 ("WRITE FENCE (1)"), and a second write fence operation ("WRITE FENCE (2)") occurs at Group 13. For each write operation that precedes the first write fence operation, the address offset is zero ("0"). For each write operation that follows the first write fence (for example those operations that generate datum 9a–9c, 10a–10d, and 11a–b) there is an address offset of 4096; while for each write operation that follows the second write operation, the address offset is again zero. The address offset essentially experiences a discontinuity or toggle at each write fence, changing from an address in the first Device Write Address space (low memory) to an address in the second Device Write Address space (high memory) at each write fence.

The use of a 4096 offset is somewhat arbitrary in this embodiment, and other address offsets may be used consistent with the actual memory size. For example, offsets of 1024, 2048, 8192, or other offsets whether or not a power of two, may be used. As described elsewhere in this application, one embodiment of the RIFO has first and second device write address spaces, normally chosen to be of equal size. These first and second device write address spaces are also referred to as low and high address space ranges. Both the first (low) and second (high) device write address spaces map to a single physical Device Input Read Buffer Address Space.

In the following stages ($t=t_{10}$), datum 9a–9c are written to CL1 and CL3 (Table 2K at $t=t_{10}$) having an associated starting address of A+4096+64 and A+4096+96 respectively (datum 9a is actually to be stored at A+4096+92 and datum 9b–9c at A+4096+96 through A+4096+100). As datum 9a–9c are on the other side of the write fence, they cannot be read from RIFO 206 until all earlier data have been read. These data are essentially read blocked or wedged. This read block or "wedging" is indicated by an under lineation in the tables, such as the under lineation of 9a, 9b, and 9c in Table 2K. In similar manner data 11a–11b are written to CL3 (Table 2L at $K=t_{11}$) before CL2 is written in a third RIFO write operation (Table 2M and Table 3D at $t=t_{12}$) at which time OOC=19, IOC=0, and RDP=0. Notice that after the third RIFO write operation, the datum 1a–3c are in proper order within RIFO 206 (Table 3D), datum 4a has not yet arrived and is still represented by "X", datum 5a–6b are in proper in-sequence order, datum 7a–7c have not arrived, and datum 8a–8d are in proper order.

We note for purposes of clarity that there is not a one-to-one correspondence between a Table 2 write buffer 204 content and a Table 3 RIFO 206 content. The RIFO content is updated only when a RIFO write operation writes a cache line 205 from the write buffer 204 into the RIFO 206, and a RIFO read operation by the device hardware 210 does not have a counterpart in write buffer 204. However, when the two sets of tables identify the same time segment, the sets of tables are synchronized, such as Table 2M and Table 3D which are synchronized at time $t=_{12}$. The time resolutions in each set of tables is generally different.

The processor continues to send data to the write buffer (Tables 2P, 2Q, 2S, 2U, 2W and 2Z) at times $t=t_{15}$, $t_{16}$, $t_{18}$, $t_{20}$, $t_{27}$, and $t_{30}$; and to write data to the RIFO (Tables 2O, 2R, 2T, 2V, 2X and 2Y at times $t_{14}$, $t_{17}$, $t_{19}$, $t_{24}$, $t_{28}$ and $t_{29}$ respectively). We note that although these cache line write operations and RIFO write operations are described as occurring at different stages or during particular time intervals, in fact, writes to the write buffer and writes to the RIFO happen so quickly that they are essentially independent processes. Therefore the time $t=t_{14}$ in Table 2O may not be at exactly the same time as $t=t_{14}$ in Table 3E, for example. Several RIFO read operations are also depicted in Tables 3H ($t=t_{20}$), 3I ($t=t_{21}$), 3J ($t=t_{22}$), 3K ($t=t_{23}$), 3M ($t=t_{25}$), 3N ($t=t_{26}$), and 3O ($t=t_{27}$). Note also, that while time $t=t_{N+1}$ occurs after time $t=t_N$, there may have been intervening events.

In the example, a fence is detected at time $t=t_{19}$ because RIFOWR6 occurs. RIFOWR6 writes to address A+4096+96 and the preceding write, RIFOWR5, was to address A+0+32. The RIFO 206 detects the transition on address bit 12 (i.e., decimal value 0 changing to 4096), which is the fence flag. In Table 2T, the underlining of 9a, 9b, 9c, 10a, 10b, 10c, 11a, and 11b have been removed because these items are no longer blocked or "wedged" behind WRITE FENCE (1); the unblocking being due to the fact that no data from before the fence instruction is left in the write buffer 204.

We now briefly describe how the OOC 214, IOC 222, and RDP 218 counters and pointers are updated with respect to the tables. The Out-of-Order counter (OOC) is updated upon the occurrence of a write into the RIFO by incrementing the counter by a value equal to the number of entries written into the RIFO. The OOC 214 is cleared when a fence is detected. The In-Order counter (IOC) 222 is updated upon: (1) the occurrence of fence, which causes incrementing the counter 222 by a value equal to the content of the OOC 214 before it is cleared; and (2) a read from the RIFO which decrements the IOC 222 by the number of words read. The Read Pointer (RDP) 218 is updated upon the occurrence of read from the RIFO by incrementing the counter by a value equal to the number of words read.

A RIFO Device read operation occurs when the hardware device is ready to consume new data and the IOC is not zero. The read operation can be initiated either by RIFO control or device control. As a result of the RIFO read, the data pointed to by RDP is sent to the data consuming hardware device, the RDP increments by one (assuming one word is read and that reads are done word-by-word) and the IOC decremented by one count.

In this illustrative example, the first RIFO-to-Device read operation occurs at time $t=t_{20}$ (Table 3H) when OOC=8, IOC=22, and RDP=1. RDP points to the entry "1a" address 1 of buffer memory (RDP=1). A right-pointing arrow ("→") in the Contents of Device Input Buffer field of Table 3 identifies that the contents of that address location are being read out during that cycle, the contents thereafter being identified by an "X" to indicate that the contents of that location are no longer valid after the RIFO read operation. In the accompanying Table 3, the read pointer (RDP) is a numerical value between 0 and 1023 (words) that identifies an offset in buffer memory location. (Recall that the buffer write address is given in bytes and that in a preferred embodiment of the invention the words are 32-bit double precision words.) Tables 3H–3K illustrate the manner in which four in-order entries stored in the RIFO at device input buffer read addresses 0–4 are read by the hardware device in proper sequential order. After each RIFO read, RDP is incremented by one word so as to point to the (next) RIFO contents to be read. Also note that as the RIFO is read out, the IOC decrements to reflect the number of in-order entries available to be read.

Table 3L reflects the first appearance of datum 9a at address A+4096+92 in the RIFO (See also Table 2V for cache line write to RIFO) at time $t=t_{24}$. An additional cache line to RIFO write occurs at $t=t_{28}$ of datum "12a12b12c13a13b14b14c14d" from CL2, the write buffer still holding datum "14a15a" in CL0. Finally for purposes of this example, in Table 3Q, datum "14a15a" are written from CL0 to RIFO at time $t=t_{29}$ in the eighth RIFO write operation from write buffer to RIFO. Table 3R represents the condition of the RIFO after this write operation at time $t=t_{30}$.

Figure 3:
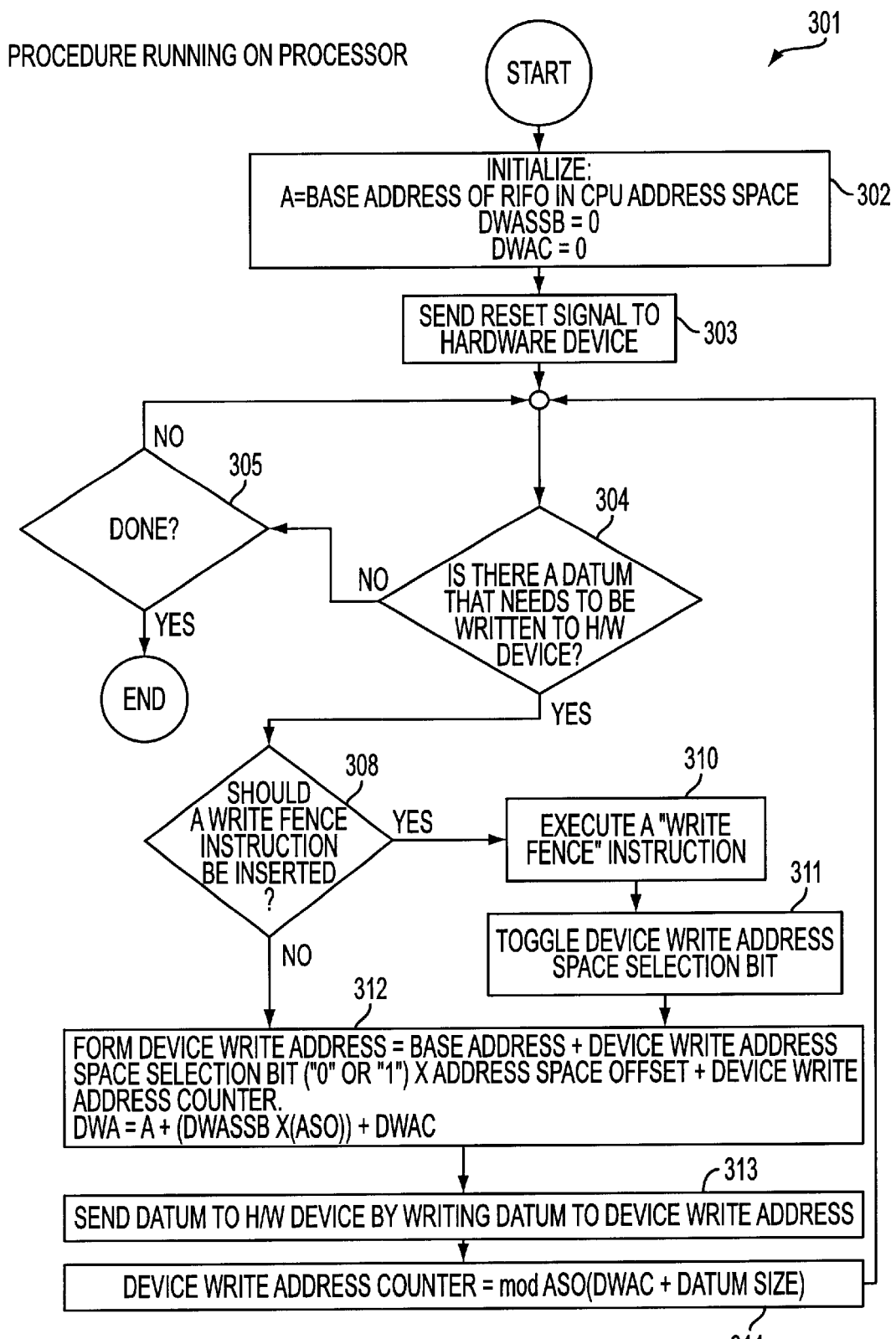
FIG. 3 is an flow-chart illustration showing an embodiment of the inventive RIFO write procedure running on the processor.

With respect to the diagrammatic flow-chart in FIG. 3, we now describe an embodiment of the inventive Processor Procedure 301 running on processor 250 or within host processor 207 (typically running, for example, as part of a hardware device driver) and generating the data that are to be sent to and received by hardware device 210 and hardware device processor 236 in a particular order. First, the Device Write Address Space Selection Bit (DWASSB=0) and Device Write Address Counter (DWAC=0) are initialized to zero, and a base address ("A") for RIFO 206 is established in CPU or processor 250 address space (Step 302). This is a component of the memory mapped I/O device paradigm described earlier. Next, a reset signal is communicated to the hardware device 210 (Step 303) which causes, among other device initializations, the initializations of the counters and pointer (IOC=OOC=RDP=0). This reset signal may be in the form of a command (for example a special register write data command) communicated over bus 286 or 288. A determination is then made as to whether there is currently a datum that needs to be written to hardware device 210 (Step 304). A datum will be waiting to be written to RIFO 206 when valid data needs to be sent to the hardware device. (See earlier discussion relative to Tables 2 and 3.) The flowchart of FIG. 3 shows this determination (Step 304) as a conditional loop, but a more practical implementation is a driver call from an application program, where the device driver software receives the number of data words to be written as well as the data, and then writes that amount of data. The "done" condition is reached when the computer system shuts down (terminating the driver), or, possibly, if the driver runs in user memory space (as compared to system memory space) the "done condition is reached when the application program is terminated.

When it is determined that a datum is ready to be written to the RIFO (or the driver has received a datum that needs to be sent), a further determination is made (Step 308) as to whether to execute a write fence instruction (Step 310). Write fence instructions are inserted by the device driver at logical places to break the write data flow. If a write fence instruction is executed, the device write address space selection bit (DWASSB) is toggled (from "0" to "1" or from "1" to "0" depending on its then current state (Step 311). Recall that a change in this bit embedded in the addresses that follow the write fence communicates the presence of a write fence to the hardware device. If no write fence command occurs, the DWASSB is not changed.

Next, a new device write address (DWA) is formed which is equal to the base address (A) plus the device write address space selection bit (DWASSB) times the address space offset (ASO) (the ASO was set to 4096 in the above example) plus the device write address counter (DWAC) (Step 312), or in mathematical terms:

DWA=A+(DWASSB×ASO)+DWAC, where DWASSB is 0 or 1, A is the base address established in the initialization step (Step 302), and ASO is the address space offset, usually chosen to be the size of the physical memory or one-half the number of logical memory locations. For example, if the memory has 4096 physically addressable write storage locations and 8192 logically addressable write locations, ASO=4096. In general, ASO may be any integer N.

Next, the datum is "sent" to the hardware device by writing the datum to the device write address (DWA) computed in Step 312 (Step 313). Writing the datum to the device write address sends the datum to the hardware device 210 because the base address maps it to that device (for example, to device 210). Then, the new device write address counter (DWAC) is updated to reflect the memory consumed by the last written datum as the modulo-n sum of the previous DWAC plus the datum size (Step 314), or $DWAC_{new}=mod_{ASO}(DWAC_{old}+Datum\ Size)$. Finally, step 304 is repeated to determine if there are any other datum that need to be written to the hardware device.

Figure 4:
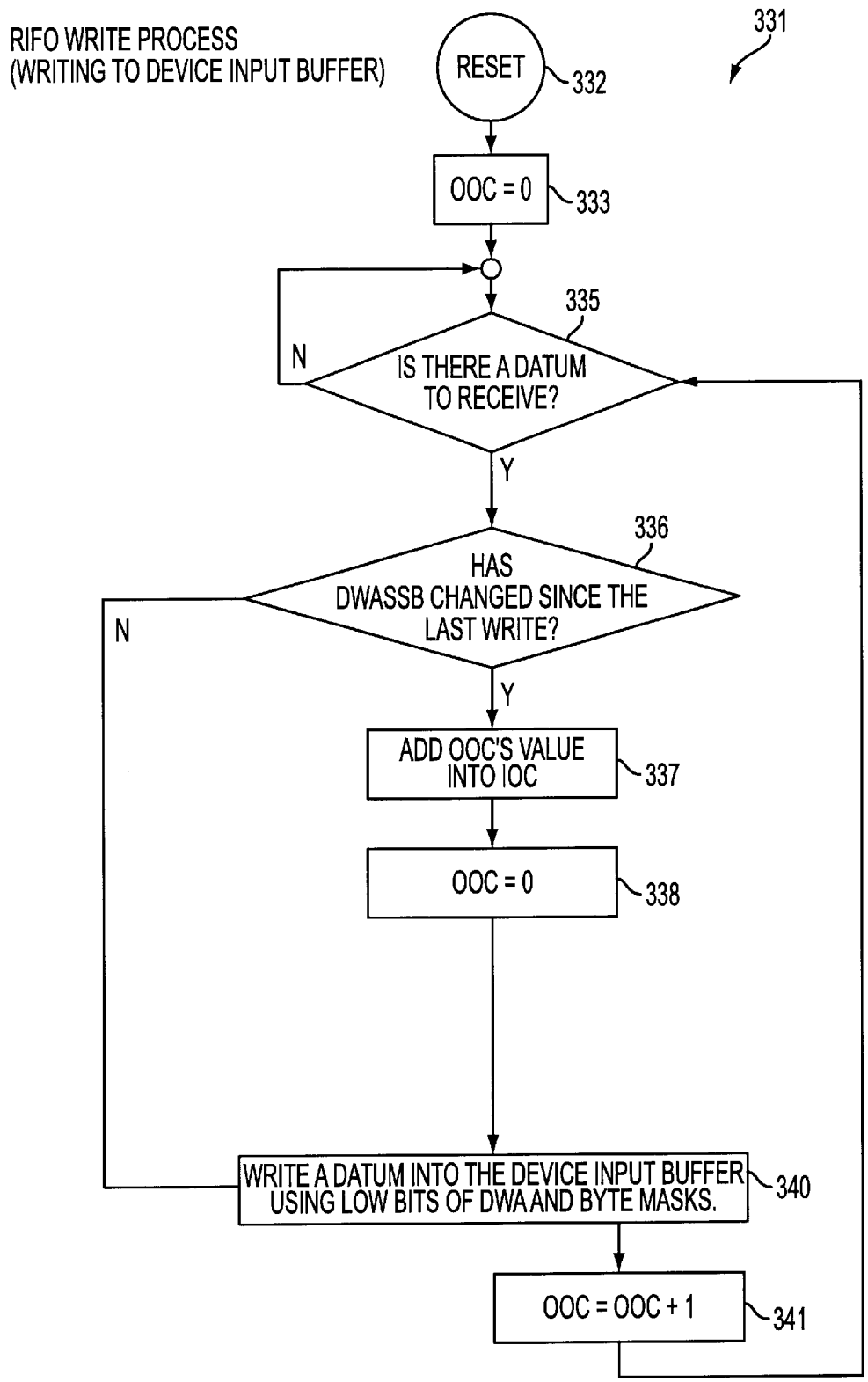
FIG. 4 is an flow-chart illustration showing an embodiment of the inventive RIFO write procedure running within the RIFO.

A separate RIFO Write Procedure 331 for writing data into the hardware device input buffer 234 of RIFO 206 is executed in the RIFO 206, generally by dedicated hardware. This procedure is described relative to the flow chart in FIG. 4. Upon receipt of reset signal sent as a result of Step 303 of the procedure 301 running on the processor 250, the RIFO Write Procedure is reset (Step 332) by setting the out-of-order counter to zero (OOC=0) (Step 333). Next, a determination is made as to whether is being written into the RIFO 206 (this would be done by the memory controller 268 trying to take a datum from the write buffer 204 and write it into the RIFO) (Step 335). If not, the test (Step 335) is repeatedly performed until a cache line is ready to be received. If data is received, then a determination is made as to whether the DWASSB has changed since the last RIFO write operation (Step 336). Recall, that a change (toggle) in DWASSB indicates the presence of a write fence.

If DWASSB has not changed since the last FIFO write, the datum is written from the received cache line to the device RIFO input buffer 234 using low bits of DWA and byte masks (if any) to write only valid cache line entries ($W_0$) but not invalid entries ($W_0$). (Step 340).

If DWASSB has changed since the last FIFO write, the out-of-order count is added to the in-order count to form a new in-order count $IOC_{new}=OOC+IOC_{old}$ (Step 337) and the out-of-order count is set to zero (OOC=0) (Step 338). Then, the datum is written to the device RIFO input buffer 234 using low bits of DWA and byte masks (if any) to write only valid cache line entries ($W_1$) but not invalid entries ($W_0$). (Step 340). The OOC is incremented by one count (OOC=OOC+1) (Step 341) and the procedure repeats at Step 335 to determine if there is a datum to receive.

Figure 5:
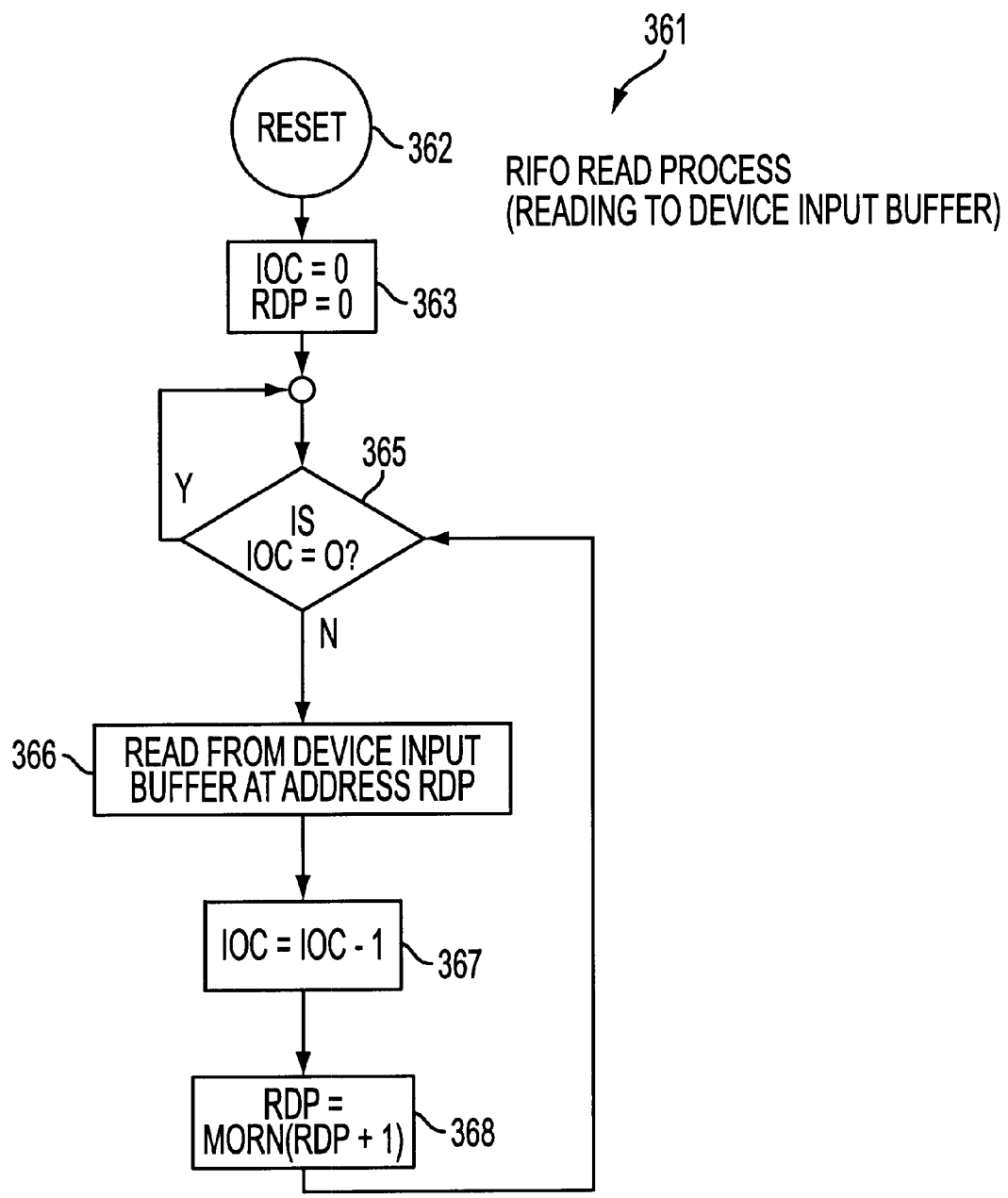
FIG. 5 is an flow-chart illustration showing an embodiment of the inventive RIFO read procedure running within the RIFO.

Read operations by hardware device processor 236 can occur anytime there is valid data for the processor 236 in the RIFO device input buffer 234. One embodiment of the RIFO Read Procedure 361 for reading a datum from the device input buffer 234 is now described with reference to FIG. 5, and this procedure is generally executed in dedicated hardware in the RIFO 206. Upon receipt of reset signal sent as a result of Step 303 of the procedure 301 running on the processor 250, the RIFO Read Procedure is reset (Step 363) by initializing the in-order count (IOC=0) and the read pointer (RDP=0) (Step 363). Next, a determination is made as to whether the in-order count is equal to zero (Step 365). An in-order counter that is equal to zero means that there is no valid data in RIFO input buffer 234 ready to read, whereas any positive value indicates that number of entries are ready to be read. If IOC=0, the determination (Step 365) is repeated until IOC>0, and when that condition exists, a read operation (Step 366) is performed at the address identified by the read pointer (RDP). It is noted that the Read Pointer is advantageously specified in words in one embodiment of the invention for ease of incrementing and decrementing the pointer value; however, read pointer could alternatively be specified in bytes, bits, octbytes, or any other convenient units. Refer to the Device Input Buffer Read Address column in Table 3 for exemplary read pointer values given in units of words.

After performing the read operation (Step 366) for a single location, the in-order counter is decremented (Step 367) by one count (IOC=IOC-1) and the read pointer is incremented (Step 368) by one count modulo the ASO value ($RDP=mod_{ASO}(RDP+1)$). The procedure is repeated (Steps 365, 366, 367, 368) until IOC=0 and there are no additional read operations ready to be performed.

It is noted that although read and write operations have been described separately, typically read and write operations will be interspersed, and where the RIFO device input memory 234 is dual-ported memory, the read and write operations may take place asynchronously without interference with each other.

Figure 6:
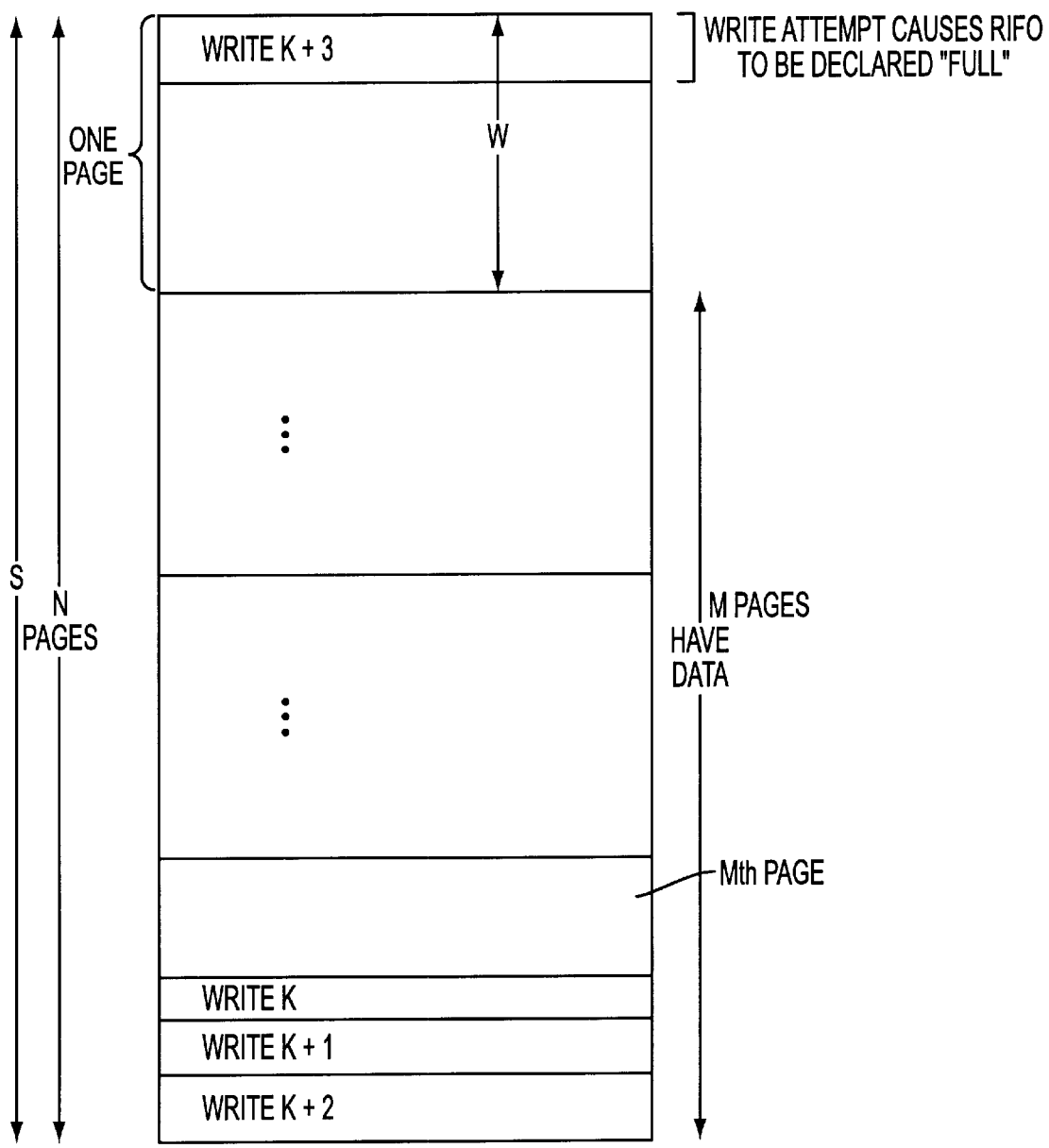
FIG. 6 is an illustration showing one embodiment of the manner in which simple RIFO full condition is detected.

We now describe several variations of optional enhancements of the basic RIFO procedure which provide protection against RIFO overwrite by accounting for a so called write "skid." In embodiment illustrated in FIG. 6, a RIFO having size S (in words) is divided into the number of pages N, were each page size has W words, and M pages have readable data. The number of pages that can have readable data is advantageously made programmable. We see from the illustration that the Mth page is written to with a write operation k, a write operation (k+1), and a write operation (k+2) before the Mth page fills. Here k is an index. The next attempt to write (write operation k+3) would be made to the $(M+1)^{th}$ page and results in the RIFO being declared "full" by the RIFO control. It is declared full even though some number of locations (words) in the RIFO do not currently store readable data. These extra storage locations are reserved for data that may be sent to the RIFO 206, but have not yet arrived and been stored, before the "full" signal is received by either the Processor Procedure 301 or by hardware handshaking logic. A number of memory locations are needed to absorb the "skid" caused by stopping the flow of data to the RIFO. The number of such reserved locations may be adjusted by setting (e.g. programming) the RIFO parameters (S, N, W, M, and k) appropriately. In this example, the maximum number of words Wmax between write fences is W×(N−M). Pages become available for writing when all of their data has been read. Write fences can be set so that the number of unaccounted words are relatively small but still spread out so as not to compromise efficiency. To incorporate the "full" signal the Processor Procedure 301 has its Step 304 modified to loop on the "full" signal as well as on the absence of a datum to write.

Figure 7:
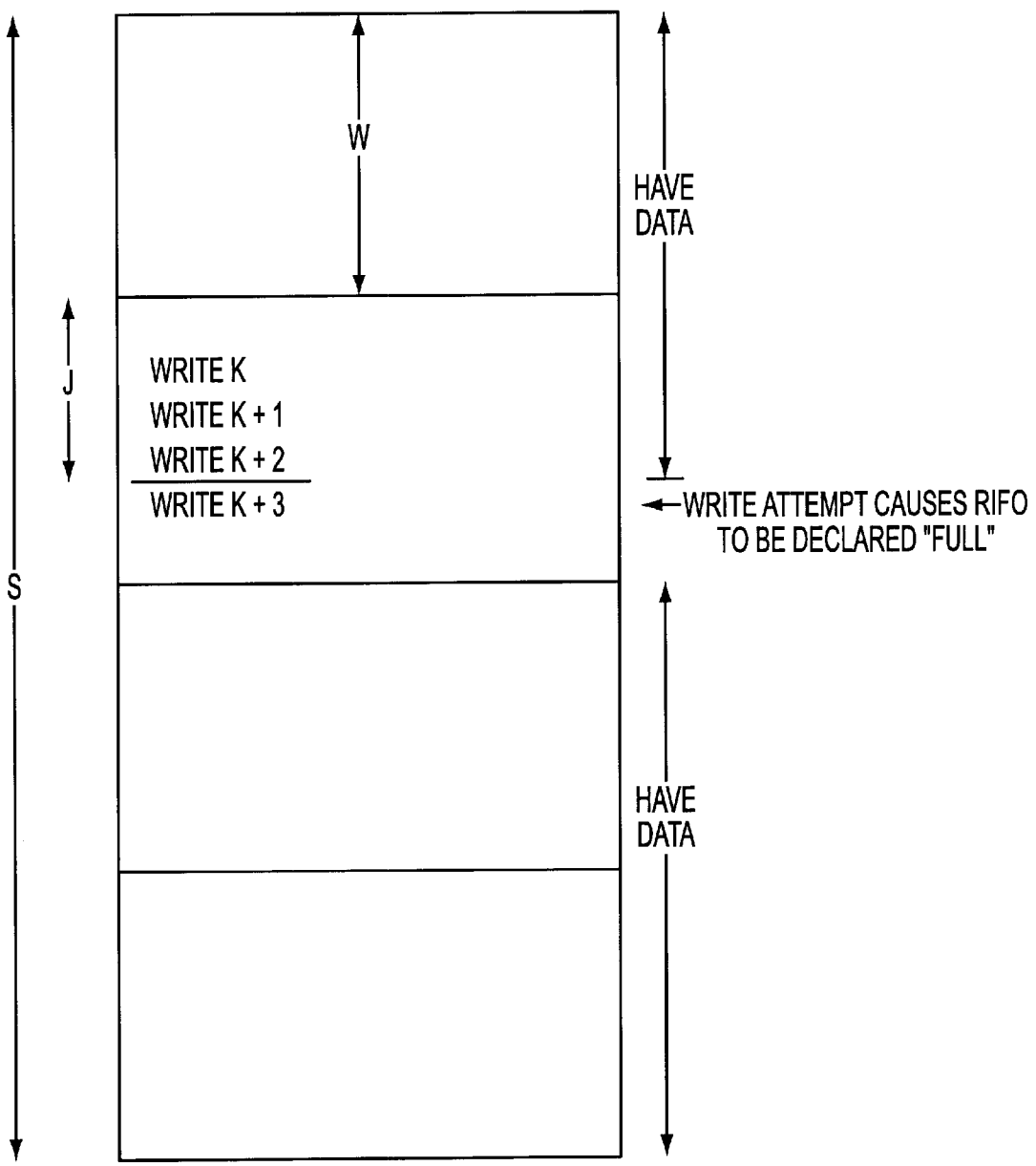
FIG. 7 is an illustration showing another embodiment of the manner in which a more aggressive RIFO full condition is detected.

In the embodiment of the RIFO illustrated in FIG. 7, the RIFO used more aggressively, and fewer storage locations are reserved than were in the embodiment of FIG. 6. In this embodiment a programmable offset J within a page is used. When a write attempt to Jth storage locations within the page is attempted, the RIFO is declared to be "full". Therefore, in this embodiment, the maximum number of words (Wmax) between fences is equal to W×(N−M)−J. It may readily be seen that when the J equals 0, that is no offset is provided within a page, and this embodiment of the procedure becomes the same as that described relative to FIG. 6. Advantageously, the value J is programmable.

Figure 8:
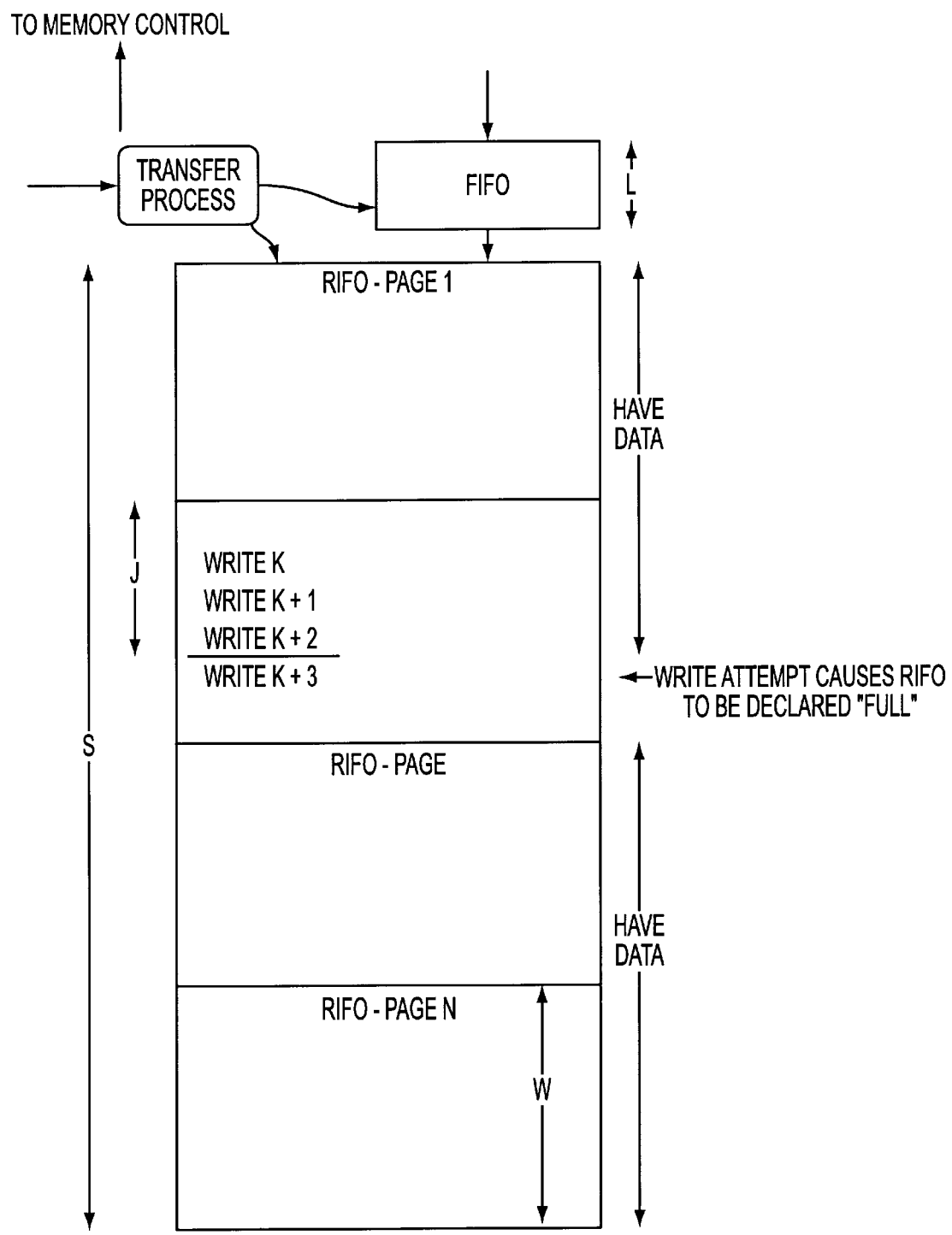
FIG. 8 is an illustration showing yet another embodiment of the manner in which a FIFO is added to the RIFO in order to spread further the frequency of fence operations.

A third variation is illustrated in the embodiment FIG. 8, where a conventional First-In-First-Out (FIFO) buffer memory having length L is provided in addition to the program offset J already described relative to FIG. 7. The data been communicated to the RIFO first passes through the FIFO in conventional manner. The FIFO provides additional "skid" capacity, while the RIFO provides the inventive reordering to preserve the intended output order. In this particular embodiment, the maximum number of words (Wmax) between fences is equal to W×(N−M)−J+L. As the FIFO may be arbitrarily long, this can substantially enhance the ability of the RIFO to accommodate a large spread of writes before fences.

Figure 9:
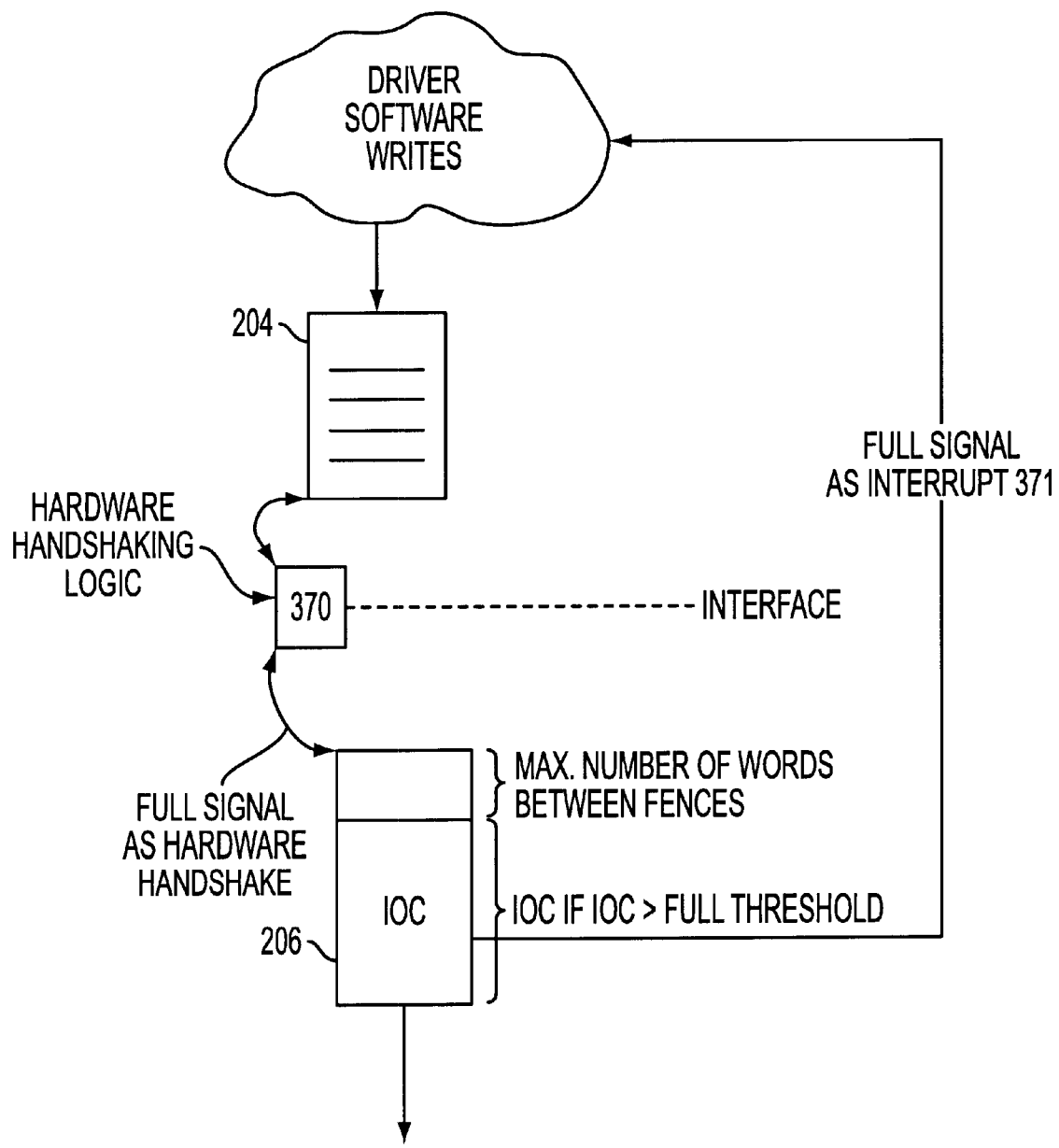
FIG. 9 is an illustration of one embodiment of an overwrite prevention mechanism.

We now describe another alternate embodiment with respect to the diagrammatic illustration in FIG. 9, which shows the write buffer 204 and the RIFO 206. A "full" condition with respect to this embodiment is a condition in which no writes are permitted and also corresponds to the condition for which the number of valid data is greater than or equal to a RIFO full threshold, that is: "full" when number of valid data is greater than full_threshold. The "number of valid data" is the in-order count (IOC). The total number of words available (i.e., the amount of memory) in the RIFO 206 must always be greater than the arithmetic sum of the IOC plus the number of committed words (IOC+number of committed words≦total number of words available). We also note that the driver controls the number of words between each fence, so the maximum number of committed words (i.e., not counted in the IOC 222) is equal to the number of words between fences. Therefore, the driver sets the full_threshold equal to the total number of words minus the maximum number of words between fences (full_threshold=the total number of words—maximum number of words between fences).

An additional layer can be added by providing a first (yellow) and second (red) thresholds, where the first or yellow threshold indicates that caution should be exercised as to how much is written, and the second or red threshold is a warning that indicates that no additional writes should be performed. When IOC≧red_threshold, we rely on hardware handshaking 370. When IOC≧yellow_threshold, we send an interrupt 371 to suspend the write operations. Hence, two comparisons are done with the IOC, which can be done with one shared comparator or two dedicated comparators.

Figure 10:
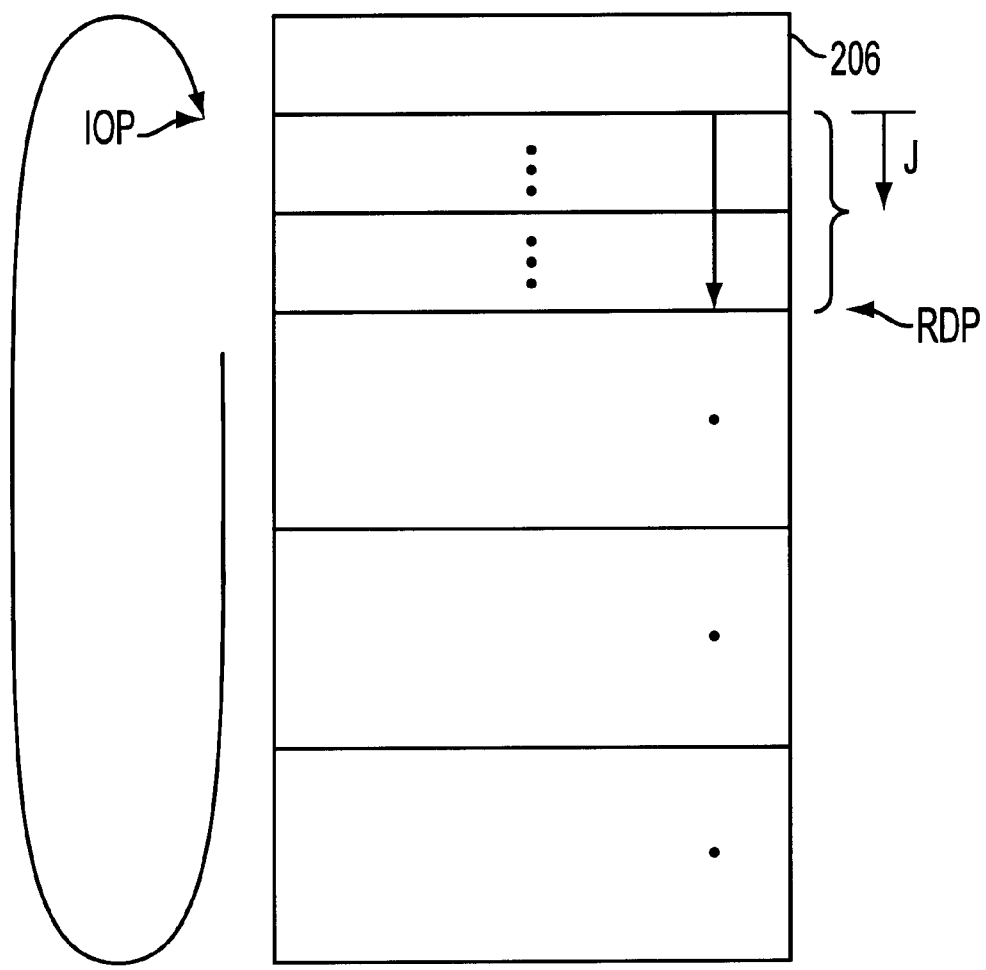
FIG. 10 is an illustration of another embodiment of an overwrite prevention mechanism.

As another alternative, we next describe the in-order pointer (IOP) relative to an embodiment of the RIFO in FIG. 10. On reset (or initialization) the in-order pointer is set to zero (IOP=0). The IOP plus the skid offset J is less than or equal to the full threshold (IOC+J≦full_threshold), full_threshold having been described earlier relative to FIG. 9. Upon detection of a write fence, the in-order pointer is set equal to the sum of the previous in-order pointer plus the out-of-order counter modulo N, that is IOP=$mod_N$(IOP+OOC) on write fence detection. We allow writes only if the read pointer is greater than the write pointer by more than the skid offset, taking into account the modulo N due to address wrapping; in equation form: $mod_N$(IOP+J>RDP). In addition, we can once again use two thresholds rather than one: red_threshold using hardware handshaking 370; and yellow_threshold using an interrupt 371.

In the previous schemes, the RIFO full detection is used to prevent a valid unread data from being overwritten by new write data. The device hardware uses the I/O bus protocols to stall the bus master (the processor and/or the chip set) that is attempting to send new data. The mechanism of these protocols are known in the art and will not be described here. In general, hardware handshaking 370 can cause the write operation over the bus to be either frozen or repeated until the data is accepted by the slave hardware device.

Alternate embodiments can involve implementation of watermarks that flag as interrupts or status fields that the RIFO is getting fuller (possibly including both a yellow mark for caution and a red mark for stop). This involves one or more registers and comparators, the registers storing a programmable "almost full" and "almost empty" levels.

An additional innovative solution is to establish a credit system. The writing process 380 (generally the driver) maintains a count of written data (modulo 32 bit, or modulo some other appropriate number) and the read process 390 (the device hardware) maintains a credit count that is initialized with the RIFO size and is incremented on every read (modulo the same number as used for the write process 380). At any given time the difference between the credit count and the write count is the available space in RIFO. This is an important innovation for the case of multiple RIFOs, as shown in FIG. 11.

Figure 11:
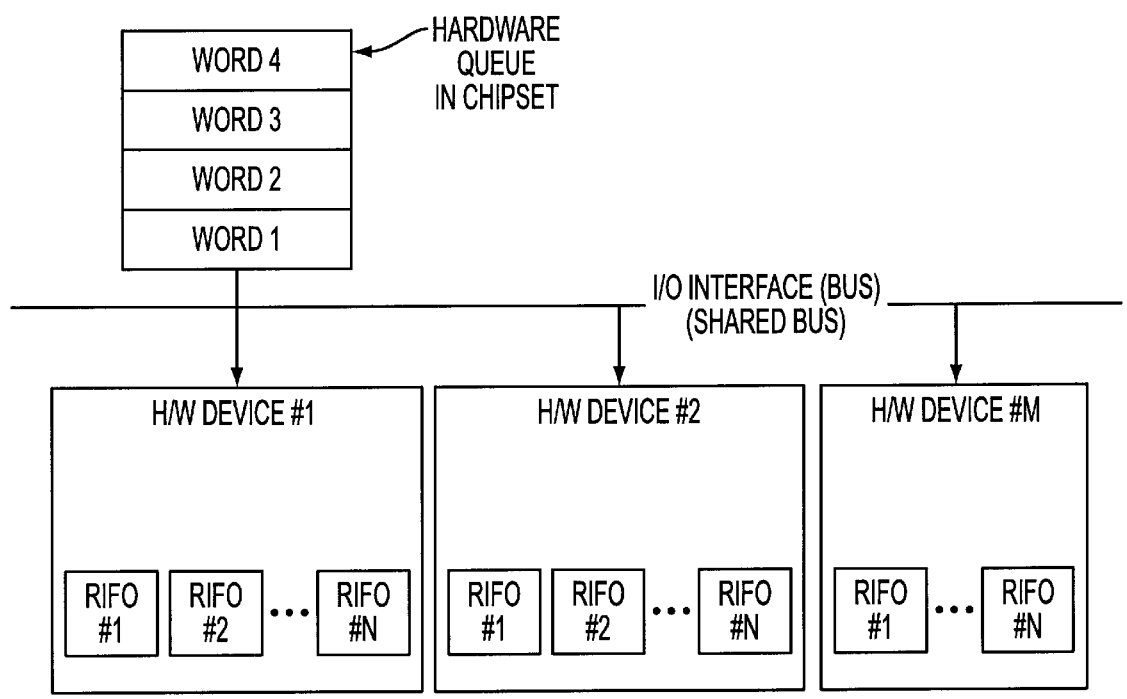
FIG. 11 is an illustration of a system with a plurality of hardware devices, each with one or more RIFOs.
Figure 12:
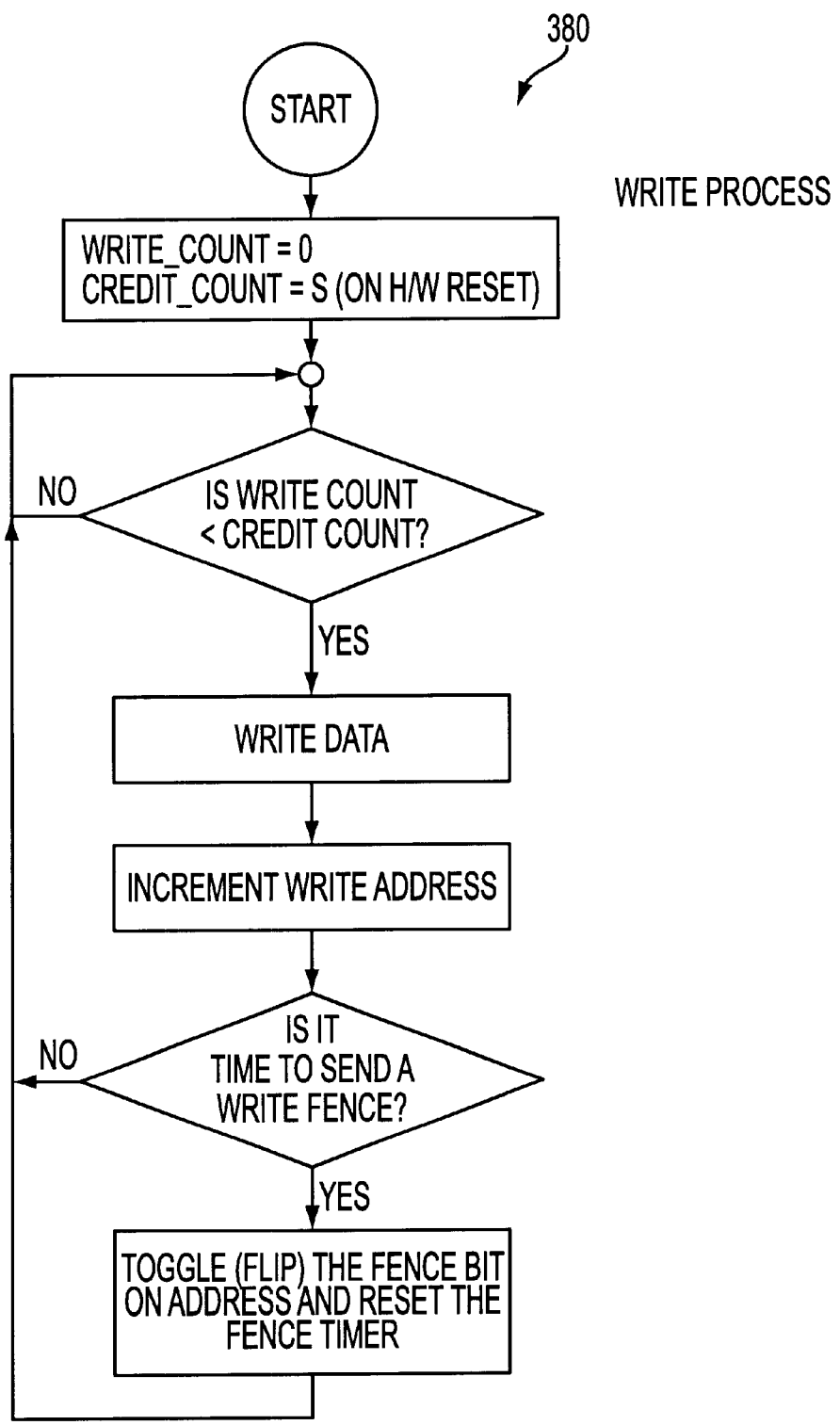
FIG. 12 is a flow diagram of a write process using a credit counting system to prevent overwrites.
Figure 13:
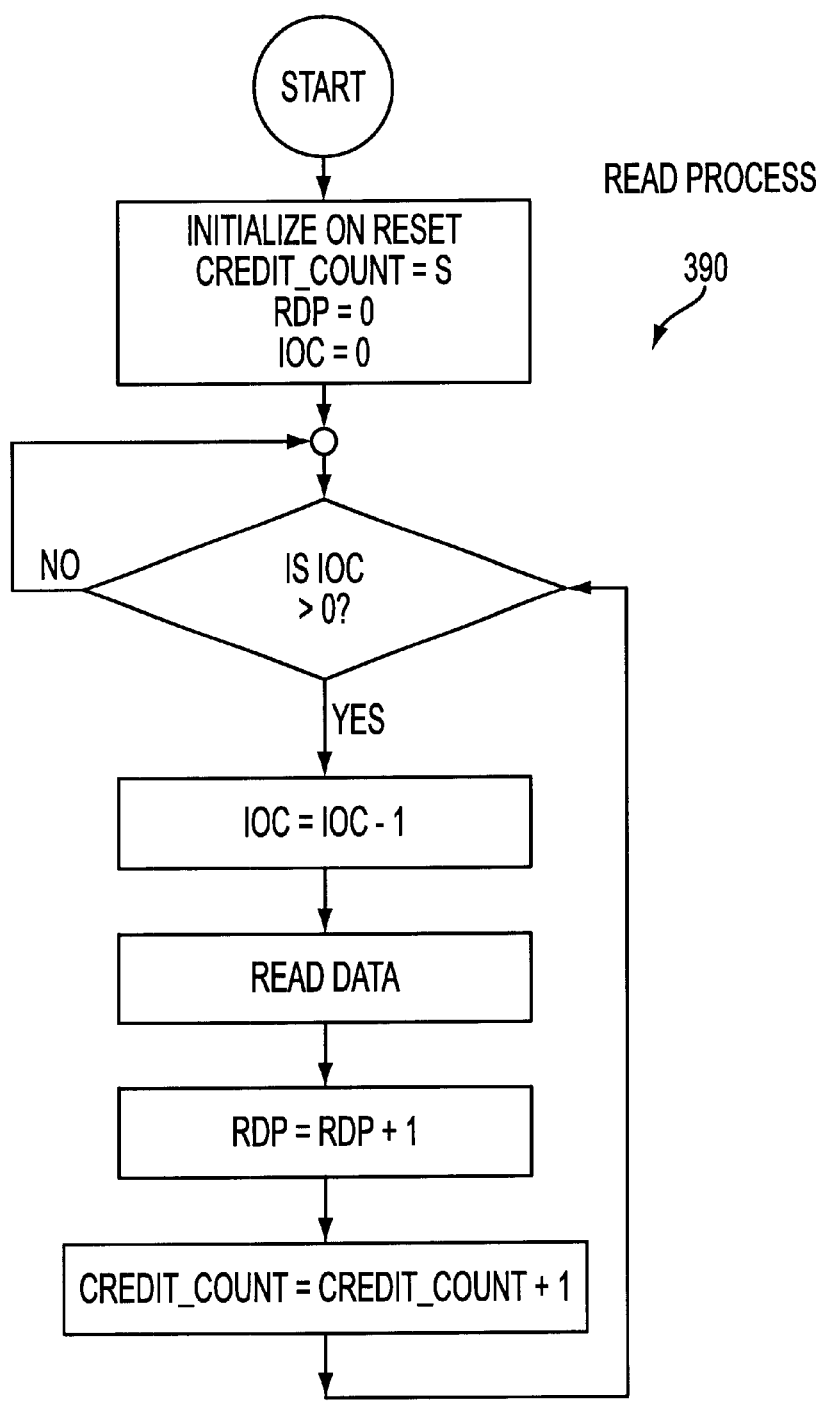
FIG. 13 is a flow diagram of a read process, corresponding generally to the write process of FIG. 12, using a credit system to prevent overwrites.

We now consider the following possible application where multiple hardware devices share the same I/O bus and/or multiple RIFOs or other destinations exist in the same hardware device, and describe this situation relative to the embodiment of the invention illustrated in FIG. 11. When the word 1 is stalled because the destination RIFO (RIFO 2 or device 1 for example) is full, the subsequent words (2 to ... 4) are not sent to their destinations (device 2, ..., device N, or RIFO 2 ... RIFO N). This may cause, at minimum, reduced inefficiency and in the worst case may cause deadlocks in the system. Therefore, it is more desirable if we prevent the software (the driver) from sending more data than there is place to put it in the destination RIFO, and flow diagrams for this are shown in FIG. 12 and FIG. 13. FIG. 12 is the write process 380 running in the driver, where an instance of this flow diagram corresponds to each RIFO in the system shown in FIG. 11. FIG. 13 is the read process 390 running in each of the RIFOs. By having an instance of both the write process 380 and read process 390 for each RIFO, software control can intervene before any hardware deadlock or hardware stalls occur. It is advantageous to have the credit_count kept in the processor memory (updated by the driver) for the write process 380 and a separate credit_count register in hardware in the RIFO for the read process 390.

Note that the flow control mechanisms described above (yellow, red indications, credit system, etc.) do not replace hardware stalling mechanisms (e.g. hardware handshaking logic 370) that prevent actual overwriting of valid data. The control mechanisms are higher level protocols to minimize and avoid bus stalls, thereby increasing system throughput.

Figure 14:
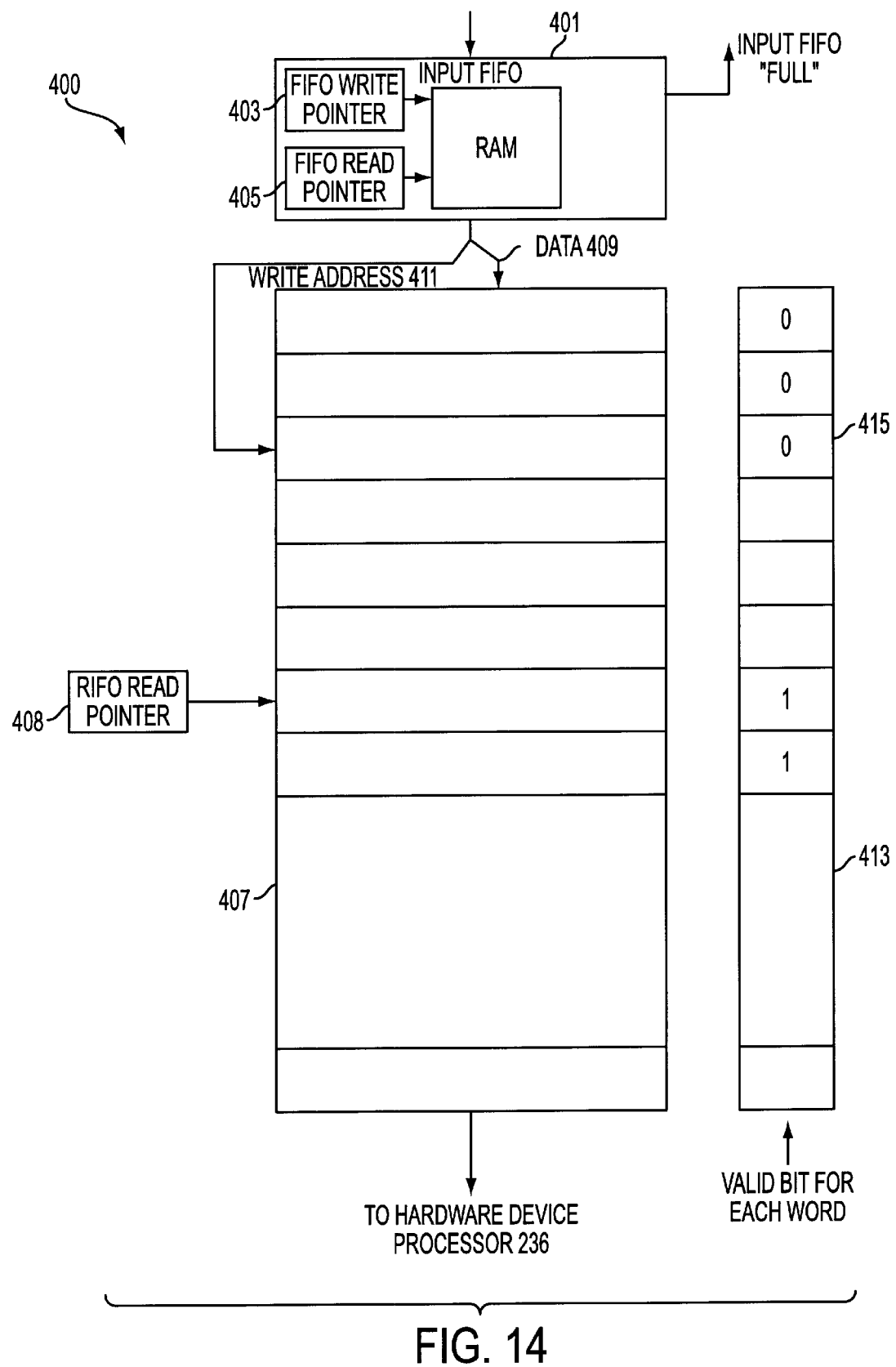
FIG. 14 is an illustration showing still another embodiment of the manner in which valid bits are used to determine if RIFO data is "out of order" or "in order".

In another embodiment of the RIFO 400, illustrated in FIG. 14, the input FIFO of the FIG. 8 embodiment is combined with a mechanism associating a valid bit with each word in the RIFO. This embodiment 400 differs from the previously described embodiment 206 by replacing the counters 214, 218, 222 with the a set of valid bits 413, one valid bit 415 for each word. In essence, the valid bits prevent overwrite of data that has not been read by the hardware device processor 236, and also indicate, for reading purposes, whether each datum stored in the RIFO is considered out of order or in order. For reading, a datum is considered "in order" if it is the next datum to be read and its valid flag is logically "true", and a datum is considered to be "out of order" if an unread RIFO location at a lower address has its valid flag set to logic "false".

The RIFO 400 is a functional replacement for RIFO 206 in FIG. 2. The input FIFO is used to cover any skid in the receipt of data. Skid refers to data which as already been communicated to the RIFO when the RIFO determines that it is full or nearly full. By providing a reasonable amount of FIFO at, or prior to, the RIFO input, the data which is in route to the RIFO can be safely stored without locking the system or losing data. One disadvantage of this embodiment is the requirement to allocate one valid bit per word, where the valid bit memory should be dual-ported memory or memory that runs at twice the clock frequency. The dual-ported or double-clock frequency requirement arises from the need to: read the valid bit (to check if the corresponding word is valid and available for reading) and write "0" (to clear it when a read is done); and, in parallel, write a valid bit as "1" (when writing into the RIFO).

In operation, the embodiment of FIG. 14 operates by receiving a datum at the FIFO 401 input where it is stored in the FIFO RAM according to the values of the FIFO write pointer 403. A FIFO read pointer 405 controls which address location in FIFO RAM is communicated to RIFO RAM 407. Control logic coupled to the input FIFO and the host computer bus interface (not shown) directs the manner in which a datum is written to and read from the input FIFO. The input FIFO 401 stores the data and the write address of the data being written into the RIFO 400. The write address 411 is used to write data 409 into the FIFO RAM 407, which can arrive in an out-of-order sequence, as described above. The manner in which the RIFO 400 performs a wrote process 501 and a read process 521 are shown in the diagrammatic flow charts of FIG. 15 and FIG. 16.

Figure 15:
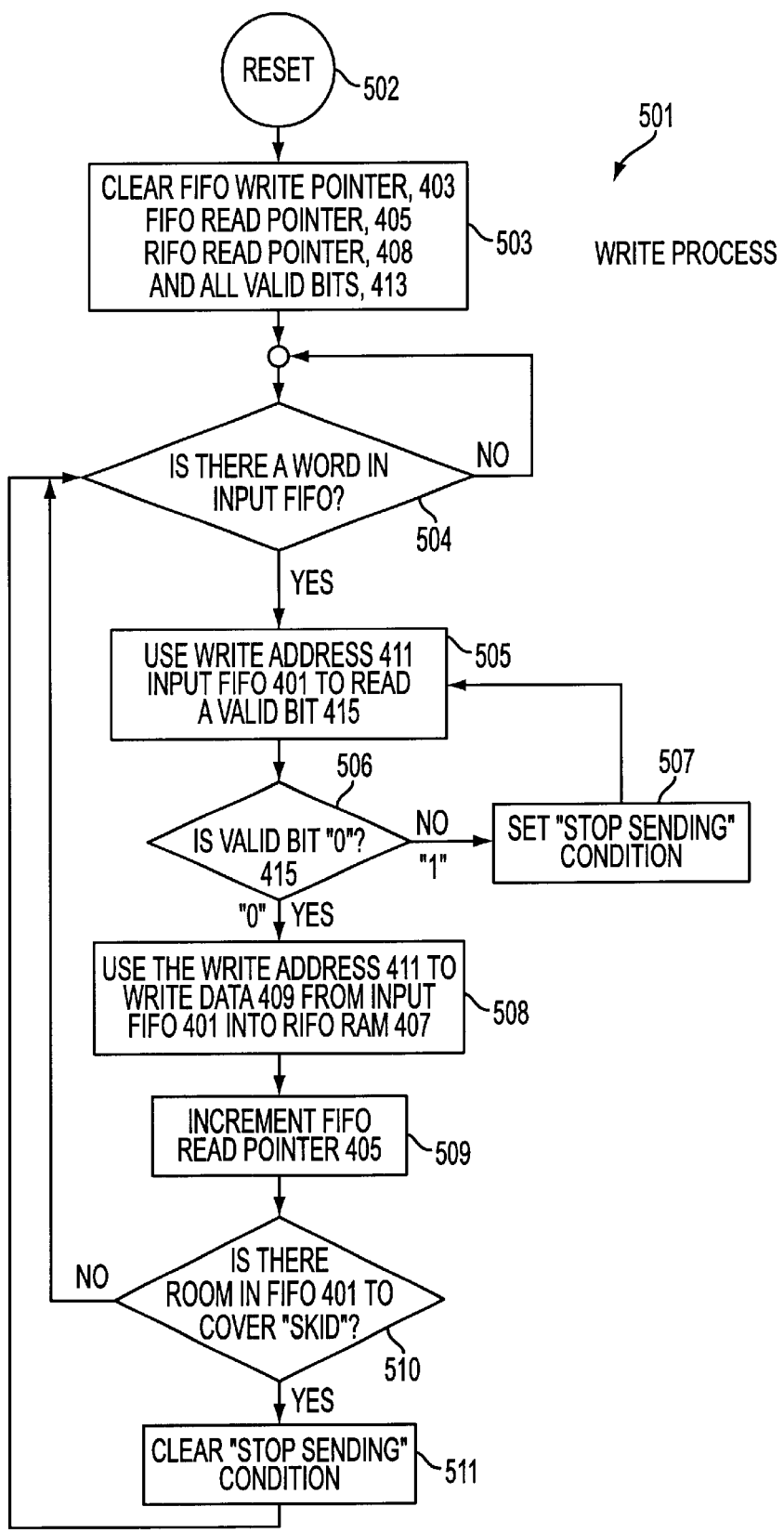
FIG. 15 is a flow-chart illustration showing an embodiment of the inventive write process procedure of FIG. 14.

We now described an embodiment of write process 501 with respect to the diagrammatic flowchart in FIG. 15. The RIFO 400 is reset (Step 502) upon receipt of a reset, whereupon the value of the FIFO write pointer 403, FIFO read pointer 405, RIFO read pointer 408, and all valid bits 413 are cleared (Step 503). A determination is then made as to whether there is a word in the input FIFO (Step 504). If there is no word in the input FIFO at the time, the determination (Step 504) is repeated until there is a word in the input FIFO. The input FIFO (by itself) is conventional in nature, and its pointers 403, 405 work in the conventional manner. A write address 411, associated with a datum 409, is read from the input FIFO 401 and used to get a valid bit 415 (Step 505). A determination is made relative to that valid bit as to whether that valid bit indicates valid data is stored in the corresponding RIFO RAM location (Step 506). If valid data is present in that location (valid bit is "1"), the datum 409 can not be written to the RIFO RAM because it would overwrite valid data; so the RIFO 400 needs to pause its acceptance of data, indicated by asserting a "stop sending" condition (Step 507). If the valid bit is "0" the datum 409 is written into the RIFO RAM 407 using the write address 411 (Step 508). Therefore, if the valid bits is "1" we set a "stop sending" condition (Step 507) and steps (steps 505, 506, 507) are repeated until the valid bit is "0", at which time we read the FIFO to get the data word in write it to RIFO RAM 407 using the write address 11 and set the valid bit (Step 508). In essence, this loop waits until the needed memory location is read by the read process 521, thereby allowing new data to be written. Since the datum 409 from the input FIFO has been written to the RIFO RAM, the next location in the input FIFO 401 can be examined, and so the FIFO read pointer is incremented (Step 509). Next, we determine if there is room in the FIFO to cover "skid" (Step 510). If there is room in the input FIFO 401 to cover skid, we clear the "stop sending" condition (Step 511) and then look for the next word in the input FIFO 401 (Step 504), and repeat the process order described. On the other hand, if there is not enough room in the input FIFO 401 to cover a skid, we do not clear the "stop sending" condition.

The "stop sending" condition is essentially another "full" signal, and can be logically ORed with the "full" signal generated by the input FIFO 401. As an alternative, the "stop sending condition" can be communicated to the driver by, for example, an interrupt or a condition flag DMAed to system memory 278, thereby avoiding stalls incurred by typical hardware handshaking. The "stop sending" condition is a preferred feature, but it can be deleted because the input FIFO's full signal will prevent any overruns. Eliminating the "stop sending" condition from the write process would deleted steps (Step 507, Step 510, and Step 511).

Figure 16:
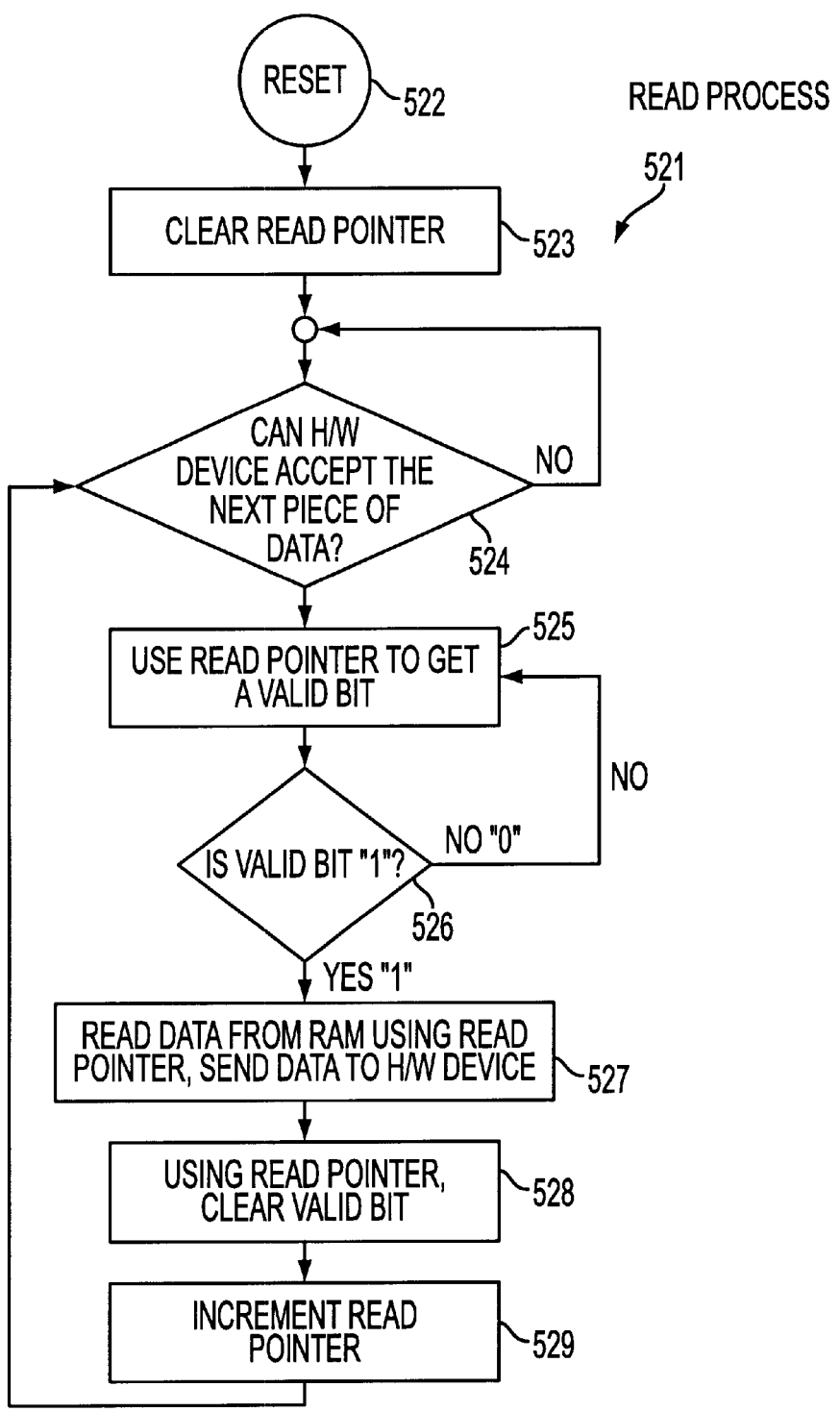
FIG. 16 is a flow-chart illustration showing an embodiment of the inventive read process procedure of FIG. 14.

We now describe an embodiment of read process 521 associated with write process 501 relative to FIG. 16. The process 521 is reset (Step 522) upon receipt of a reset signal, whereupon the value of the read pointer is cleared (Step 523). Next, we determine whether the hardware device can accept the next piece of data (Step 524), and if it cannot, we repeat the determination (Step 524) until the hardware device can accept next piece of data. Next we use the read pointer to get a valid bit (Step 525); if the valid bits is "0" (Step 526) we use the read pointer to again read the valid bit (Step 525) and make a determination (Step 526). This loop is waiting for valid data to be written to this RIFO RAM 407 location by the write process 501. If valid bit is "1", we read data from the RIFO RAM 407 using the read pointer, and send the read data to the hardware device processor 236 (Step 527). Next, using the read pointer, we clear the valid bit (Step 528), and increment the read pointer (Step 529) before returning to make another determination as to whether the hardware device can accept next piece of data (Step 524).

Because the RIFO 400 can substitute for RIFO 120, the "full" generation features associated with FIG. 6 through FIG. 13 can be adopted by someone skilled in the art to function with RIFO 400.

Figure 17:
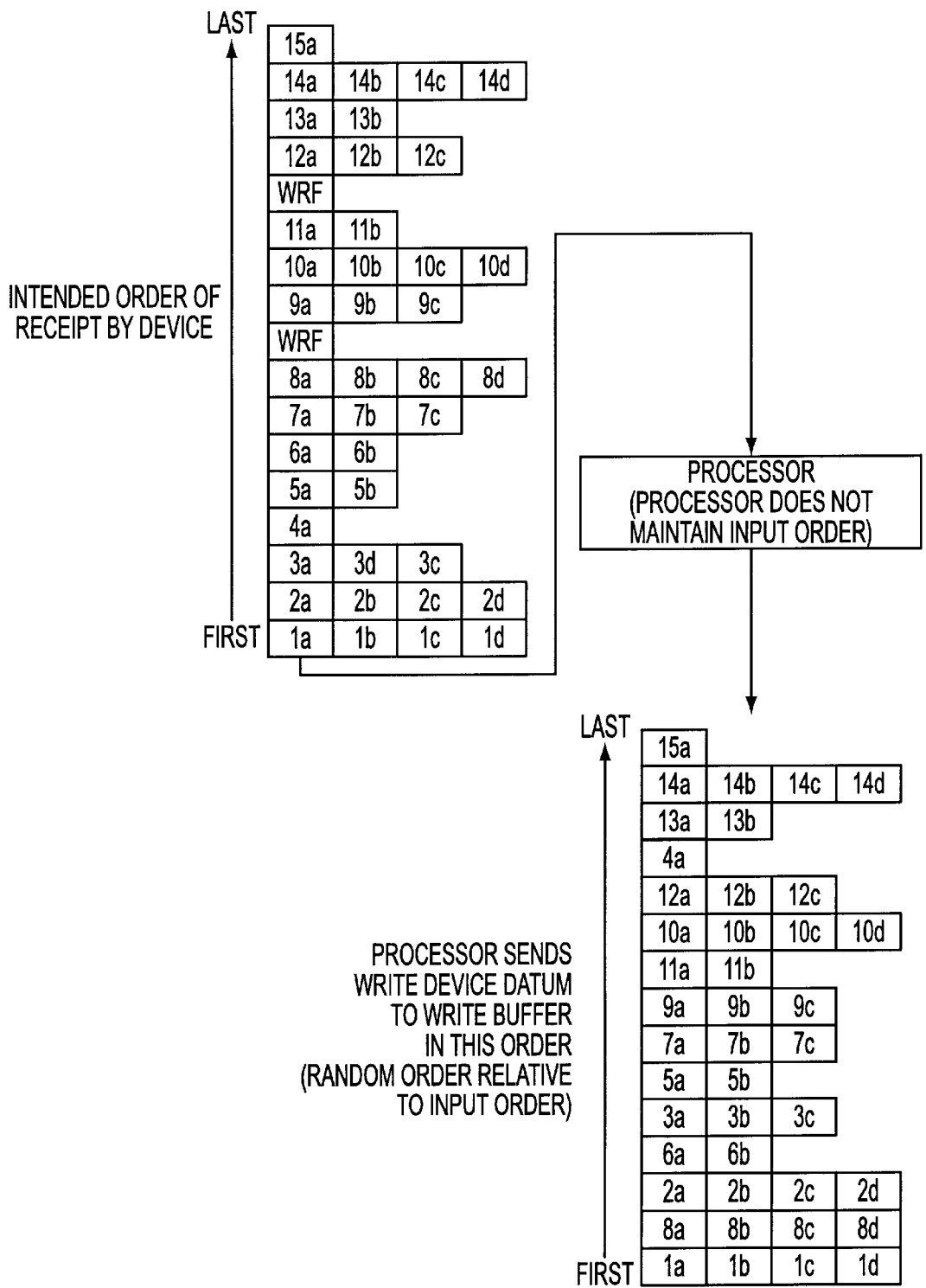
FIG. 17 is an illustration showing the manner in which the intended order of receipt of datum by a device may be scrambled by a processor so that the order of data at the output is random relative to the intended order.
Figure 18:
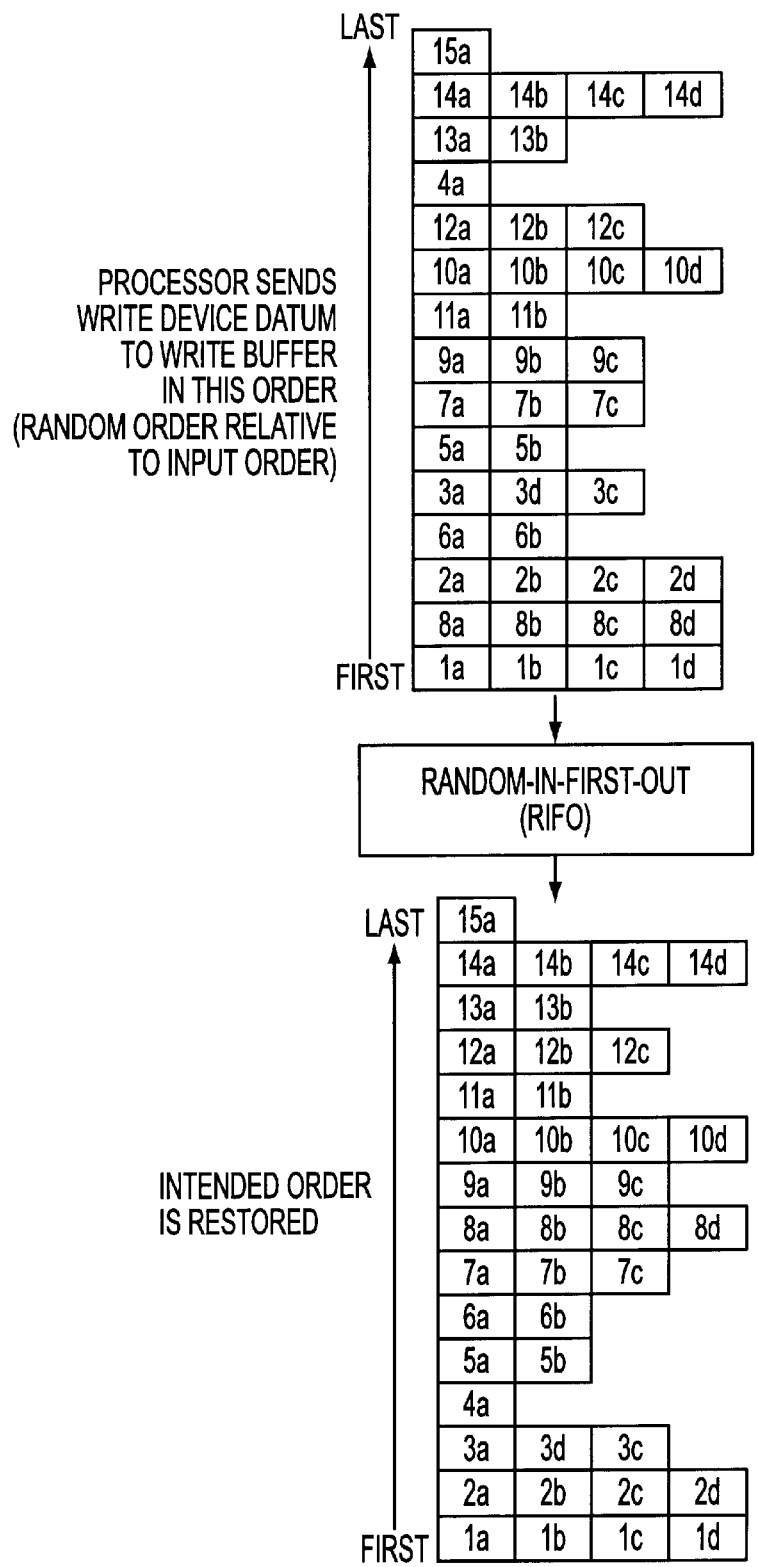
FIG. 18 is an illustration showing the manner in which the intended order of receipt of datum by a device is preserved when using the structure and method of the inventive Random-In-First-Out (RIFO) memory.

We now describe the manner in which the inventive RIFO restores the intended order of datum sent to the hardware device. In FIG. 17, we illustrate operation wherein the intended order of receipt by the hardware device is illustrated as first to last. Note that the location of write fence (WRF) are indicated. The intended order of receipt (i.e. the order in which the software program running on the processor 250 intends the order to be) by the hardware device is scrambled by the processor because the processor does not maintain the input order and sends write device data to the write buffer in a random order relative to the intended input order. In FIG. 17, we illustrate be sequence of write device data communicated from the processor to the random-in-first-out (RIFO) structure. Note that the random sequence at the input of the RIFO in FIG. 18 is the same sequence as output of the processor in FIG. 17. The inventive RIFO restores the intended order of the data at its output, which corresponds to the intended order illustrated in FIG. 17.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

All publications and patent applications mentioned in this specification are herein incorporated by reference to the same extent as if each individual publication or patent application was specifically and individually indicated to be incorporated by reference.

TABLE 1

Sequence of Device Write Operations in the Order Prescribed by the System or Software.

▼Groups of Processor Operations

| | | | |
|---|---|---|---|
| 1 WRITE 1a | WRITE 1b | WRITE 1c | WRITE 1d |
| To addr. A + 0 + 0 | To addr. A + 0 + 4 | To addr. A + 0 + 8 | To addr. A + 0 + 12 |
| 2 WRITE 2a | WRITE 2b | WRITE 2c | WRITE 2d |
| To addr. A + 0 + 16 | To addr. A + 0 + 2 | To addr. A + 0 + 24 | To addr. A + 0 + 28 |
| 3 WRITE 3a | WRITE 3b | WRITE 3c | |
| To addr. A + 0 + 32 | To addr. A + 0 + 36 | To addr. A + 0 + 40 | |
| 4 WRITE 4a | | | |
| To addr. A + 0 + 44 | | | |
| 5 WRITE 5a | WRITE 5b | | |
| To addr. A + 0 + 48 | To addr. A + 0 + 52 | | |
| 6 WRITE 6a | WRITE 6b | | |
| To addr. A + 0 + 56 | To addr. A + 0 + 60 | | |
| 7 WRITE 7a | WRITE 7b | WRITE 7c | |
| To addr. A + 0 + 64 | To addr. A + 0 + 68 | To addr. A + 0 + 72 | |
| 8 WRITE 8a | WRITE 8b | WRITE 8c | WRITE 8d |
| To addr. A + 0 + 76 | To addr. A + 0 + 80 | To addr. A + 0 + 84 | To addr. A + 0 + 88 |
| 9 WRITE FENCE (1) | | | |
| 10 WRITE 9a | WRITE 9b | WRITE 9c | |
| To addr. A + 4096 + 92 | To addr. A + 4096 + 96 | To addr. A + 4096 + 100 | |
| 11 WRITE 10a | WRITE 10b | WRITE 10c | WRITE 10d |
| To addr. A + 4096 + 104 | To addr. A + 4096 + 108 | To addr. A + 4096 + 112 | To addr. A + 4096 + 116 |
| 12 WRITE 11a | WRITE 11b | | |
| To addr. A + 4096 + 120 | To addr. A + 4096 + 124 | | |
| 13 WRITE FENCE (2) | | | |
| 14 WRITE 12a | WRITE 12b | WRITE 12c | |
| To addr. A + 0 + 128 | To addr. A + 0 + 132 | To addr. A + 0 + 136 | |
| 15 WRITE 13a | WRITE 13b | | |
| To addr. A + 0 + 140 | To addr. A + 0 + 144 | | |
| 16 WRITE 14a | WRITE 14b | WRITE 14c | WRITE 14d |
| To addr. A + 0 + 148 | To addr. A + 0 + 152 | To addr. A + 0 + 156 | To addr. A + 0 + 160 |
| 17 WRITE 15a | | | |
| To addr. A + 0 + 164 | | | |

TABLE 2A

Write Buffer at Time $t = t_0$

| Cache Line | 0 | 1 | 2 | 3 | 4 | 5 | 6 | 7 | RIFO Address |
|---|---|---|---|---|---|---|---|---|---|
| 0 | X | X | X | X | X | X | X | X | |
| 1 | X | X | X | X | X | X | X | X | |
| 2 | X | X | X | X | X | X | X | X | |
| 3 | X | X | X | X | X | X | X | X | |
| 4 | X | X | X | X | X | X | X | X | |

TABLE 2B

Write Buffer at Time $t = t_1$

| Cache Line | 0 | 1 | 2 | 3 | 4 | 5 | 6 | 7 | RIFO Address |
|---|---|---|---|---|---|---|---|---|---|
| 0 | X | X | X | X | X | X | X | X | |
| 1 | 1a | 1b | 1c | 1d | X | X | X | X | A + 0 + 0 |
| 2 | X | X | X | X | X | X | X | X | |
| 3 | X | X | X | X | X | X | X | X | |
| 4 | X | X | X | X | X | X | X | X | |

TABLE 2C

Write Buffer at Time $t = t_2$

| Cache Line | 0 | 1 | 2 | 3 | 4 | 5 | 6 | 7 | RIFO Address |
|---|---|---|---|---|---|---|---|---|---|
| 0 | X | X | X | 8a | 8b | 8c | 8d | X | A + 0 + 64 |
| 1 | 1a | 1b | 1c | 1d | X | X | X | X | A + 0 + 0 |
| 2 | X | X | X | X | X | X | X | X | |
| 3 | X | X | X | X | X | X | X | X | |
| 4 | X | X | X | X | X | X | X | X | |

TABLE 2D

Write Buffer at Time $t = t_3$

| Cache Line | 0 | 1 | 2 | 3 | 4 | 5 | 6 | 7 | RIFO Address |
|---|---|---|---|---|---|---|---|---|---|
| 0 | X | X | X | 8a | 8b | 8c | 8d | X | A + 0 + 64 |
| 1 | 1a | 1b | 1c | 1d | 2a | 2b | 2c | 2d | A + 0 + 0 |
| 2 | X | X | X | X | X | X | X | X | |
| 3 | X | X | X | X | X | X | X | X | |
| 4 | X | X | X | X | X | X | X | X | |

TABLE 2E

Write Buffer at Time $t = t_4$

| Cache Line | 0 | 1 | 2 | 3 | 4 | 5 | 6 | 7 | RIFO Address |
|---|---|---|---|---|---|---|---|---|---|
| 0 | X | X | X | 8a | 8b | 8c | 8d | X | A + 0 + 64 |
| 1 | 1a | 1b | 1c | 1d | 2a | 2b | 2c | 2d | A + 0 + 0 |
| 2 | X | X | X | X | X | X | 6a | 6b | A + 0 + 32 |
| 3 | X | X | X | X | X | X | X | X | |
| 4 | X | X | X | X | X | X | X | X | |

TABLE 2F

Write Buffer at Time $t = t_5$ (RIFO Write #1)

| Cache Line | 0 | 1 | 2 | 3 | 4 | 5 | 6 | 7 | RIFO Address |
|---|---|---|---|---|---|---|---|---|---|
| 0 | X | X | X | 8a | 8b | 8c | 8d | X | A + 0 + 64 |
| 1 | $W_1$ | $W_1$ | $W_1$ | $W_1$ | $W_1$ | $W_1$ | $W_1$ | $W_1$ | RIFOWR1 |
| 2 | X | X | X | X | X | X | 6a | 6b | A + 0 + 32 |
| 3 | X | X | X | X | X | X | X | X | |
| 4 | X | X | X | X | X | X | X | X | |

TABLE 2G

Write Buffer at Time $t = t_6$

| Cache Line | 0 | 1 | 2 | 3 | 4 | 5 | 6 | 7 | RIFO Address |
|---|---|---|---|---|---|---|---|---|---|
| 0 | X | X | X | 8a | 8b | 8c | 8d | X | A + 0 + 64 |
| 1 | X | X | X | X | X | X | X | X | |
| 2 | 3a | 3b | 3c | X | X | X | 6a | 6b | A + 0 + 32 |
| 3 | X | X | X | X | X | X | X | X | |
| 4 | X | X | X | X | X | X | X | X | |

TABLE 2H

Write Buffer at Time $t = t_7$

| Cache Line | 0 | 1 | 2 | 3 | 4 | 5 | 6 | 7 | RIFO Address |
|---|---|---|---|---|---|---|---|---|---|
| 0 | X | X | X | 8a | 8b | 8c | 8d | X | A + 0 + 64 |
| 1 | X | X | X | X | X | X | X | X | |
| 2 | 3a | 3b | 3c | X | 5a | 5b | 6a | 6b | A + 0 + 32 |
| 3 | X | X | X | X | X | X | X | X | |
| 4 | X | X | X | X | X | X | X | X | |

TABLE 2I

Write Buffer at Time $t = t_8$ (RIFO Write #2)

| Cache Line | 0 | 1 | 2 | 3 | 4 | 5 | 6 | 7 | RIFO Address |
|---|---|---|---|---|---|---|---|---|---|
| 0 | $W_0$ | $W_0$ | $W_0$ | $W_1$ | $W_1$ | $W_1$ | $W_1$ | $W_0$ | RIFOWR2 |
| 1 | X | X | X | X | X | X | X | X | |
| 2 | 3a | 3b | 3c | X | 5a | 5b | 6a | 6b | A + 0 + 32 |
| 3 | X | X | X | X | X | X | X | X | |
| 4 | X | X | X | X | X | X | X | X | |

TABLE 2J

Write Buffer at Time $t = t_9$

| Cache Line | 0 | 1 | 2 | 3 | 4 | 5 | 6 | 7 | RIFO Address |
|---|---|---|---|---|---|---|---|---|---|
| 0 | X | X | X | X | X | X | X | X | |
| 1 | X | X | X | X | X | X | X | X | |
| 2 | 3a | 3b | 3c | X | 5a | 5b | 6a | 6b | A + 0 + 32 |
| 3 | X | X | X | X | X | X | X | X | |
| 4 | 7a | 7b | 7c | X | X | X | X | X | A + 0 + 64 |

TABLE 2K

Write Buffer at Time t = $t_{10}$

| Cache Line | 0 | 1 | 2 | 3 | 4 | 5 | 6 | 7 | RIFO Address |
|---|---|---|---|---|---|---|---|---|---|
| 0 | X | X | X | X | X | X | X | X | |
| 1 | X | X | X | X | X | X | X | 9a | A + 4096 + 64 |
| 2 | 3a | 3b | 3c | X | 5a | 5b | 6a | 6b | A + 0 + 32 |
| 3 | 9b | 9c | X | X | X | X | X | X | A + 4096 + 96 |
| 4 | 7a | 7b | 7c | X | X | X | X | X | A + 0 + 64 |

TABLE 2L

Write Buffer at Time t = $t_{11}$

| Cache Line | 0 | 1 | 2 | 3 | 4 | 5 | 6 | 7 | RIFO Address |
|---|---|---|---|---|---|---|---|---|---|
| 0 | X | X | X | X | X | X | X | X | |
| 1 | X | X | X | X | X | X | X | 9a | A + 4096 + 64 |
| 2 | 3a | 3b | 3c | X | 5a | 5b | 6a | 6b | A + 0 + 32 |

TABLE 2L-continued

Write Buffer at Time t = $t_{11}$

| Cache Line | 0 | 1 | 2 | 3 | 4 | 5 | 6 | 7 | RIFO Address |
|---|---|---|---|---|---|---|---|---|---|
| 3 | 9b | 9c | X | X | X | X | 11a | 11b | A + 4096 + 96 |
| 4 | 7a | 7b | 7c | X | X | X | X | X | A + 0 + 64 |

TABLE 2M

Write Buffer at Time t = $t_{12}$ (RIFO Write #3)

| Cache Line | 0 | 1 | 2 | 3 | 4 | 5 | 6 | 7 | RIFO Address |
|---|---|---|---|---|---|---|---|---|---|
| 0 | X | X | X | X | X | X | X | X | |
| 1 | X | X | X | X | X | X | X | 9a | A + 4096 + 64 |
| 2 | $W_1$ | $W_1$ | $W_0$ | $W_1$ | $W_1$ | $W_1$ | $W_1$ | $W_1$ | RIFOWR3 |
| 3 | 9b | 9c | X | X | X | X | 11a | 11b | A + 4096 + 96 |
| 4 | 7a | 7b | 7c | X | X | X | X | X | A + 0 + 64 |

TABLE 2N

Write Buffer at Time t = $t_{13}$

| Cache Line | 0 | 1 | 2 | 3 | 4 | 5 | 6 | 7 | RIFO Address |
|---|---|---|---|---|---|---|---|---|---|
| 0 | X | X | X | X | X | X | X | X | |
| 1 | X | X | X | X | X | X | X | 9a | A + 4096 + 64 |
| 2 | X | X | X | X | X | X | X | X | |
| 3 | 9b | 9c | 10a | 10b | 10c | 10d | 11a | 11b | A + 4096 + 96 |
| 4 | 7a | 7b | 7c | X | X | X | X | X | A + 0 + 64 |

TABLE 2O

Write Buffer at Time t = $t_{14}$ (RIFO Write #4)

| Cache Line | 0 | 1 | 2 | 3 | 4 | 5 | 6 | 7 | RIFO Address |
|---|---|---|---|---|---|---|---|---|---|
| 0 | X | X | X | X | X | X | X | X | |
| 1 | X | X | X | X | X | X | X | 9a | A + 4096 + 64 |
| 2 | X | X | X | X | X | X | X | X | |
| 3 | 9b | 9c | 10a | 10b | 10c | 10d | 11a | 11b | A + 4096 + 96 |
| 4 | $W_1$ | $W_1$ | $W_1$ | $W_0$ | $W_0$ | $W_0$ | $W_0$ | $W_0$ | RIFOWR4 |

TABLE 2P

Write Buffer at Time t = $t_{15}$

| Cache Line | 0 | 1 | 2 | 3 | 4 | 5 | 6 | 7 | RIFO Address |
|---|---|---|---|---|---|---|---|---|---|
| 0 | X | X | X | X | X | X | X | X | |
| 1 | X | X | X | X | X | X | X | 9a | A + 4096 + 64 |
| 2 | 12a | 12b | 12c | X | X | X | X | X | A + 0 + 128 |
| 3 | 9b | 9c | 10a | 10b | 10c | 10d | 11a | 11b | A + 4096 + 96 |
| 4 | X | X | X | X | X | X | X | X | |

TABLE 2Q

Write Buffer at Time t = $t_{16}$

| Cache Line | 0 | 1 | 2 | 3 | 4 | 5 | 6 | 7 | RIFO Address |
|---|---|---|---|---|---|---|---|---|---|
| 0 | X | X | X | 4a | X | X | X | X | A + 0 + 32 |
| 1 | X | X | X | X | X | X | X | 9a | A + 4096 + 64 |
| 2 | 12a | 12b | 12c | X | X | X | X | X | A + 0 + 128 |
| 3 | 9b | 9c | 10a | 10b | 10c | 10d | 11a | 11b | A + 4096 + 96 |
| 4 | X | X | X | X | X | X | X | X | |

TABLE 2R

Write Buffer at Time t = $t_{17}$ (RIFO Write #5)

| Cache Line | 0 | 1 | 2 | 3 | 4 | 5 | 6 | 7 | RIFO Address |
|---|---|---|---|---|---|---|---|---|---|
| 0 | $W_0$ | $W_0$ | $W_0$ | $W_1$ | $W_0$ | $W_0$ | $W_0$ | $W_0$ | RIFOWR5 |
| 1 | X | X | X | X | X | X | X | 9a | A + 4096 + 64 |
| 2 | 12a | 12b | 12c | X | X | X | X | X | A + 0 + 128 |
| 3 | 9b | 9c | 10a | 10b | 10c | 10d | 11a | 11b | A + 4096 + 96 |
| 4 | X | X | X | X | X | X | X | X | |

TABLE 2S

Write Buffer at Time t = $t_{18}$

| Cache Line | 0 | 1 | 2 | 3 | 4 | 5 | 6 | 7 | RIFO Address |
|---|---|---|---|---|---|---|---|---|---|
| 0 | X | X | X | X | X | X | X | X | |
| 1 | X | X | X | X | X | X | X | 9a | A + 4096 + 64 |
| 2 | 12a | 12b | 12c | 13a | 13b | X | X | X | A + 0 + 128 |
| 3 | 9b | 9c | 10a | 10b | 10c | 10d | 11a | 11b | A + 4096 + 96 |
| 4 | X | X | X | X | X | X | X | X | |

TABLE 2T

Write Buffer at Time t = $t_{19}$ (RIFO Write #6)

| Cache Line | 0 | 1 | 2 | 3 | 4 | 5 | 6 | 7 | RIFO Address |
|---|---|---|---|---|---|---|---|---|---|
| 0 | X | X | X | X | X | X | X | X | |
| 1 | X | X | X | X | X | X | X | 9a | A + 4096 + 64 |
| 2 | 12a | 12b | 12c | 13a | 13b | X | X | X | A + 0 + 128 |
| 3 | $W_1$ | $W_1$ | $W_1$ | $W_1$ | $W_1$ | $W_1$ | $W_1$ | $W_1$ | RIFOWR6 |
| 4 | X | X | X | X | X | X | X | X | |

TABLE 2U

Write Buffer at Time t = $t_{20}$

| Cache Line | 0 | 1 | 2 | 3 | 4 | 5 | 6 | 7 | RIFO Address |
|---|---|---|---|---|---|---|---|---|---|
| 0 | 14d | X | X | X | X | X | X | X | A + 0 + 160 |
| 1 | X | X | X | X | X | X | X | 9a | A + 4096 + 64 |
| 2 | 12a | 12b | 12c | 13a | 13b | 14a | 14b | 14c | A + 0 + 128 |
| 3 | X | X | X | X | X | X | X | X | |
| 4 | X | X | X | X | X | X | X | X | |

TABLE 2V

Write Buffer at Time t = $t_{24}$ (RIFO Write #7)

| Cache Line | 0 | 1 | 2 | 3 | 4 | 5 | 6 | 7 | RIFO Address |
|---|---|---|---|---|---|---|---|---|---|
| 0 | 14d | X | X | X | X | X | X | X | A + 0 + 160 |
| 1 | $W_0$ | $W_0$ | $W_0$ | $W_0$ | $W_0$ | $W_0$ | $W_0$ | $W_1$ | RIFOWR7 |
| 2 | 12a | 12b | 12c | 13a | 13b | 14a | 14b | 14c | A + 0 + 128 |
| 3 | X | X | X | X | X | X | X | X | |
| 4 | X | X | X | X | X | X | X | X | |

TABLE 2W

Write Buffer at Time t = $t_{27}$

| Cache Line | 0 | 1 | 2 | 3 | 4 | 5 | 6 | 7 | RIFO Address |
|---|---|---|---|---|---|---|---|---|---|
| 0 | 14d | 15a | X | X | X | X | X | X | A + 0 + 160 |
| 1 | X | X | X | X | X | X | X | X | |
| 2 | 12a | 12b | 12c | 13a | 13b | 14a | 14b | 14c | A + 0 + 128 |
| 3 | X | X | X | X | X | X | X | X | |
| 4 | X | X | X | X | X | X | X | X | |

TABLE 2X

Write Buffer at Time t = $t_{28}$ (RIFO Write #8)

| Cache Line | 0 | 1 | 2 | 3 | 4 | 5 | 6 | 7 | RIFO Address |
|---|---|---|---|---|---|---|---|---|---|
| 0 | 14d | 15a | X | X | X | X | X | X | A + 0 + 160 |
| 1 | X | X | X | X | X | X | X | X | |
| 2 | $W_1$ | $W_1$ | $W_1$ | $W_1$ | $W_1$ | $W_1$ | $W_1$ | $W_1$ | RIFOWR8 |
| 3 | X | X | X | X | X | X | X | X | |
| 4 | X | X | X | X | X | X | X | X | |

TABLE 2Y

Write Buffer at Time t = $t_{29}$ (RIFO Write #9)

| Cache Line | 0 | 1 | 2 | 3 | 4 | 5 | 6 | 7 | RIFO Address |
|---|---|---|---|---|---|---|---|---|---|
| 0 | $W_1$ | $W_1$ | $W_0$ | $W_0$ | $W_0$ | $W_0$ | $W_0$ | $W_0$ | RIFOWR9 |
| 1 | X | X | X | X | X | X | X | X | |
| 2 | X | X | X | X | X | X | X | X | |
| 3 | X | X | X | X | X | X | X | X | |
| 4 | X | X | X | X | X | X | X | X | |

TABLE 2Z

Write Buffer at Time t = $t_{30}$

| Cache Line | 0 | 1 | 2 | 3 | 4 | 5 | 6 | 7 | RIFO Address |
|---|---|---|---|---|---|---|---|---|---|
| 0 | X | X | X | X | X | X | X | X | |
| 1 | X | X | X | X | X | X | X | X | |
| 2 | X | X | X | X | X | X | X | X | |
| 3 | X | X | X | X | X | X | X | X | |
| 4 | X | X | X | X | X | X | X | X | |

TABLE 3A

RIFO Condition at Time t=$t_0$ (initial).

| Device Write Addr. Space 1 (bytes) | Device Write Addr. Space 2 (bytes) | Contents of Device Input Buffer | Dev. Input BufferRead Addr. (Words) |
|---|---|---|---|
| A+0+0 | A+4096+0 | X | 0 |
| A+0+4 | A+4096+4 | X | 1 |
| A+0+8 | A+4096+8 | X | 2 |
| A+0+12 | A+4096+12 | X | 3 |
| A+0+16 | A+4096+16 | X | 4 |
| A+0+20 | A+4096+20 | X | 5 |
| A+0+24 | A+4096+24 | X | 6 |
| A+0+28 | A+4096+28 | X | 7 |
| A+0+32 | A+4096+32 | X | 8 |
| A+0+36 | A+4096+36 | X | 9 |
| A+0+40 | A+4096+40 | X | 10 |
| A+0+44 | A+4096+44 | X | 11 |
| A+0+48 | A+4096+48 | X | 12 |
| A+0+52 | A+4096+52 | X | 13 |
| A+0+56 | A+4096+56 | X | 14 |
| A+0+60 | A+4096+60 | X | 15 |
| A+0+64 | A+4096+64 | X | 16 |
| A+0+68 | A+4096+68 | X | 17 |
| A+0+72 | A+4096+72 | X | 18 |
| A+0+76 | A+4096+76 | X | 19 |
| A+0+80 | A+4096+80 | X | 20 |
| A+0+84 | A+4096+84 | X | 21 |
| A+0+88 | A+4096+88 | X | 22 |
| A+0+92 | A+4096+92 | X | 23 |
| A+0+96 | A+4096+96 | X | 24 |
| A+0+100 | A+4096+100 | X | 25 |
| A+0+104 | A+4096+104 | X | 26 |
| A+0+108 | A+4096+108 | X | 27 |
| A+0+112 | A+4096+112 | X | 28 |
| A+0+116 | A+4096+116 | X | 29 |
| A+0+120 | A+4096+120 | X | 30 |
| A+0+124 | A+4096+124 | X | 31 |
| A+0+128 | A+4096+128 | X | 32 |
| A+0+132 | A+4096+132 | X | 33 |
| A+0+136 | A+4096+136 | X | 34 |
| A+0+140 | A+4096+140 | X | 35 |
| A+0+144 | A+4096+144 | X | 36 |
| A+0+148 | A+4096+148 | X | 37 |
| A+0+152 | A+4096+152 | X | 38 |

TABLE 3A-continued

RIFO Condition at Time t=$t_0$ (initial).

| Device Write Addr. Space 1 (bytes) | Device Write Addr. Space 2 (bytes) | Contents of Device Input Buffer | Dev. Input BufferRead Addr. (Words) |
|---|---|---|---|
| A+0+156 | A+4096+156 | X | 39 |
| A+0+180 | A+4096+160 | X | 40 |
| A+0+164 | A+4096+164 | X | 41 |
| ... | ... | ... | ... |
| A+0+4095 | A+4096+4095 | X | 1023 |
| Out-of-Order Counter (OOC) | | 0 | |
| In-Order Counter (IOC) | | 0 | |
| Read Pointer (RDP) | | 0 | |

TABLE 3B

RIFOCond. at Time t=$t_5$, (RIFO Wrt#1).

| Device Write Addr. Space 1 (bytes) | Device Write Addr. Space 2 (bytes) | Contents of Device Input Buffer | Dev. Input BufferRead Addr. (Words) |
|---|---|---|---|
| A+0+0 | A+4096+0 | 1a | 0 |
| A+0+4 | A+4096+4 | 1b | 1 |
| A+0+8 | A+4096+8 | 1c | 2 |
| A+0+12 | A+4096+12 | 1d | 3 |
| A+0+16 | A+4096+16 | 2a | 4 |
| A+0+20 | A+4096+20 | 2b | 5 |
| A+0+24 | A+4096+24 | 2c | 6 |
| A+0+28 | A+4096+28 | 2d | 7 |
| A+0+32 | A+4096+32 | X | 8 |
| A+0+36 | A+4096+36 | X | 9 |
| A+0+40 | A+4096+40 | X | 10 |
| A+0+44 | A+4096+44 | X | 11 |
| A+0+48 | A+4096+48 | X | 12 |
| A+0+52 | A+4096+52 | X | 13 |
| A+0+56 | A+4096+56 | X | 14 |
| A+0+60 | A+4096+60 | X | 15 |
| A+0+64 | A+4096+64 | X | 16 |
| A+0+68 | A+4096+68 | X | 17 |
| A+0+72 | A+4096+72 | X | 18 |
| A+0+76 | A+4096+76 | X | 19 |
| A+0+80 | A+4096+80 | X | 20 |
| A+0+84 | A+4096+84 | X | 21 |
| A+0+88 | A+4096+88 | X | 22 |
| A+0+92 | A+4096+92 | X | 23 |
| A+0+98 | A+4096+96 | X | 24 |
| A+0+100 | A+4096+100 | X | 25 |
| A+0+104 | A+4096+104 | X | 26 |
| A+0+108 | A+4096+108 | X | 27 |
| A+0+112 | A+4096+112 | X | 28 |
| A+0+116 | A+4096+116 | X | 29 |
| A+0+120 | A+4096+120 | X | 30 |
| A+0+124 | A+4096+124 | X | 31 |
| A+0+128 | A+4096+128 | X | 32 |
| A+0+132 | A+4096+132 | X | 33 |
| A+0+136 | A+4096+136 | X | 34 |
| A+0+140 | A+4096+140 | X | 35 |
| A+0+144 | A+4096+144 | X | 36 |
| A+0+148 | A+4096+148 | X | 37 |
| A+0+152 | A+4096+152 | X | 38 |
| A+0+156 | A+4096+156 | X | 39 |
| A+0+160 | A+4096+160 | X | 40 |
| A+0+164 | A+4096+164 | X | 41 |
| ... | ... | ... | ... |
| A+0+4095 | A+4096+4095 | X | 1023 |
| Out-of-Order Counter (OOC) | | 8 | |
| In-Order Counter (IOC) | | 0 | |
| Read Pointer (RDP) | | 0 | |

TABLE 3C

RIFO Cond. at Time t=$t_8$ (RIFO Write #2).

| Device Write Addr. Space 1 (bytes) | Device Write Addr. Space 2 (bytes) | Contents of Device Input Buffer | Dev. Input BufferRead Addr. (Words) |
|---|---|---|---|
| A+0+0 | A+4096+0 | 1a | 0 |
| A+0+4 | A+4096+4 | 1b | 1 |
| A+0+8 | A+4096+8 | 1c | 2 |
| A+0+12 | A+4096+12 | 1d | 3 |
| A+0+16 | A+4096+16 | 2a | 4 |
| A+0+20 | A+4096+20 | 2b | 5 |
| A+0+24 | A+4096+24 | 2c | 6 |
| A+0+28 | A+4096+28 | 2d | 7 |
| A+0+32 | A+4096+32 | X | 8 |
| A+0+36 | A+4096+36 | X | 9 |
| A+0+40 | A+4096+40 | X | 10 |
| A+0+44 | A+4096+44 | X | 11 |
| A+0+48 | A+4096+48 | X | 12 |
| A+0+52 | A+4096+52 | X | 13 |
| A+0+56 | A+4096+56 | X | 14 |
| A+0+60 | A+4096+60 | X | 15 |
| A+0+64 | A+4096+64 | X | 16 |
| A+0+68 | A+4096+68 | X | 17 |
| A+0+72 | A+4096+72 | X | 18 |
| A+0+76 | A+4096+76 | 8a | 19 |
| A+0+80 | A+4096+80 | 8b | 20 |
| A+0+84 | A+4096+84 | 8c | 21 |
| A+0+88 | A+4096+88 | 8d | 22 |
| A+0+92 | A+4096+92 | X | 23 |
| A+0+96 | A+4096+96 | X | 24 |
| A+0+100 | A+4096+100 | X | 25 |
| A+0+104 | A+4096+104 | X | 26 |
| A+0+108 | A+4096+108 | X | 27 |
| A+0+112 | A+4096+112 | X | 28 |
| A+0+116 | A+4096+116 | X | 29 |
| A+0+120 | A+4096+120 | X | 30 |
| A+0+124 | A+4096+124 | X | 31 |
| A+0+128 | A+4096+128 | X | 32 |
| A+0+132 | A+4096+132 | X | 33 |
| A+0+136 | A+4096+136 | X | 34 |
| A+0+140 | A+4096+140 | X | 35 |
| A+0+144 | A+4096+144 | X | 36 |
| A+0+148 | A+4096+148 | X | 37 |
| A+0+152 | A+4096+152 | X | 38 |
| A+0+156 | A+4096+156 | X | 39 |
| A+0+160 | A+4096+160 | X | 40 |
| A+0+164 | A+4096+164 | X | 41 |
| ... | ... | ... | ... |
| A+0+4095 | A+4096+4095 | X | 1023 |
| Out-of-Order Counter (OOC) | | 12 | |
| In-Order Counter (IOC) | | 0 | |
| Read Pointer (RDP) | | 0 | |

TABLE 3D

RIFO Cond. at Time t=$t_{12}$ (RIFO Write #3).

| Device Write Addr. Space 1 (bytes) | Device Write Addr. Space 2 (bytes) | Contents of Device Input Buffer | Dev. Input BufferRead Addr. (Words) |
|---|---|---|---|
| A+0+0 | A+4096+0 | 1a | 0 |
| A+0+4 | A+4096+4 | 1b | 1 |
| A+0+8 | A+4096+8 | 1c | 2 |
| A+0+12 | A+4096+12 | 1d | 3 |
| A+0+16 | A+4096+16 | 2a | 4 |
| A+0+20 | A+4096+20 | 2b | 5 |
| A+0+24 | A+4096+24 | 2c | 6 |
| A+0+28 | A+4096+28 | 2d | 7 |
| A+0+32 | A+4096+32 | 3a | 8 |
| A+0+36 | A+4096+36 | 3b | 9 |
| A+0+40 | A+4096+40 | 3c | 10 |
| A+0+44 | A+4096+44 | X | 11 |
| A+0+48 | A+4096+48 | 5a | 12 |
| A+0+52 | A+4096+52 | 5b | 13 |

TABLE 3D-continued

RIFO Cond. at Time t=t$_{12}$ (RIFO Write #3).

| Device Write Addr. Space 1 (bytes) | Device Write Addr. Space 2 (bytes) | Contents of Device Input Buffer | Dev. Input BufferRead Addr. (Words) |
|---|---|---|---|
| A+0+56 | A+4096+56 | 6a | 14 |
| A+0+60 | A+4096+60 | 6b | 15 |
| A+0+64 | A+4096+64 | X | 16 |
| A+0+68 | A+4096+68 | X | 17 |
| A+0+72 | A+4096+72 | X | 18 |
| A+0+76 | A+4096+76 | 8a | 19 |
| A+0+80 | A+4096+80 | 8b | 20 |
| A+0+84 | A+4096+84 | 8c | 21 |
| A+0+88 | A+4096+88 | 8d | 22 |
| A+0+92 | A+4096+92 | X | 23 |
| A+0+96 | A+4096+96 | X | 24 |
| A+0+100 | A+4096+100 | X | 25 |
| A+0+104 | A+4096+104 | X | 26 |
| A+0+108 | A+4096+108 | X | 27 |
| A+0+112 | A+4096+112 | X | 28 |
| A+0+116 | A+4096+116 | X | 29 |
| A+0+120 | A+4096+120 | X | 30 |
| A+0+124 | A+4096+124 | X | 31 |
| A+0+128 | A+4096+128 | X | 32 |
| A+0+132 | A+4096+132 | X | 33 |
| A+0+136 | A+4096+136 | X | 34 |
| A+0+140 | A+4096+140 | X | 35 |
| A+0+144 | A+4096+144 | X | 36 |
| A+0+148 | A+4096+148 | X | 37 |
| A+0+152 | A+4096+152 | X | 38 |
| A+0+156 | A+4096+156 | X | 39 |
| A+0+160 | A+4096+160 | X | 40 |
| A+0+164 | A+4096+164 | X | 41 |
| . . . | . . . | . . . | . . . |
| A+0+4095 | A+4096+4095 | X | 1023 |
| Out-of-Order Counter (OOC) | | | 19 |
| In-Order Counter (IOC) | | | 0 |
| Read Pointer (RDP) | | | 0 |

TABLE 3E

RIFO Condition at Time t=t$_{14}$ (Write#4).

| Device Write Addr. Space 1 (bytes) | Device Write Addr. Space 2 (bytes) | Contents of Device Input Buffer | Dev. Input BufferRead Addr. (Words) |
|---|---|---|---|
| A+0+0 | A+4096+0 | 1a | 0 |
| A+0+4 | A+4096+4 | 1b | 1 |
| A+0+8 | A+4096+8 | 1c | 2 |
| A+0+12 | A+4096+12 | 1d | 3 |
| A+0+16 | A+4096+16 | 2a | 4 |
| A+0+20 | A+4096+20 | 2b | 5 |
| A+0+24 | A+4096+24 | 2c | 6 |
| A+0+28 | A+4096+28 | 2d | 7 |
| A+0+32 | A+4096+32 | 3a | 8 |
| A+0+36 | A+4096+36 | 3b | 9 |
| A+0+40 | A+4096+40 | 3c | 10 |
| A+0+44 | A+4096+44 | X | 11 |
| A+0+48 | A+4096+48 | 5a | 12 |
| A+0+52 | A+4096+52 | 5b | 13 |
| A+0+56 | A+4096+56 | 6a | 14 |
| A+0+60 | A+4096+60 | 6b | 15 |
| A+0+64 | A+4096+64 | 7a | 16 |
| A+0+68 | A+4096+68 | 7b | 17 |
| A+0+72 | A+4096+72 | 7c | 18 |
| A+0+76 | A+4096+76 | 8a | 19 |
| A+0+80 | A+4096+80 | 8b | 20 |
| A+0+84 | A+4096+84 | 8c | 21 |
| A+0+88 | A+4096+88 | 8d | 22 |
| A+0+92 | A+4096+92 | X | 23 |
| A+0+96 | A+4096+96 | X | 24 |
| A+0+100 | A+4096+100 | X | 25 |

TABLE 3E-continued

RIFO Condition at Time t=t$_{14}$ (Write#4).

| Device Write Addr. Space 1 (bytes) | Device Write Addr. Space 2 (bytes) | Contents of Device Input Buffer | Dev. Input BufferRead Addr. (Words) |
|---|---|---|---|
| A+0+104 | A+4096+104 | X | 26 |
| A+0+108 | A+4096+108 | X | 27 |
| A+0+112 | A+4096+112 | X | 28 |
| A+0+116 | A+4096+116 | X | 29 |
| A+0+120 | A+4096+120 | X | 30 |
| A+0+124 | A+4096+124 | X | 31 |
| A+0+128 | A+4096+128 | X | 32 |
| A+0+132 | A+4096+132 | X | 33 |
| A+0+136 | A+4096+136 | X | 34 |
| A+0+140 | A+4096+140 | X | 35 |
| A+0+144 | A+4096+144 | X | 36 |
| A+0+148 | A+4096+148 | X | 37 |
| A+0+152 | A+4096+152 | X | 38 |
| A+0+156 | A+4096+156 | X | 39 |
| A+0+160 | A+4096+160 | X | 40 |
| A+0+164 | A+4096+164 | X | 41 |
| . . . | . . . | . . . | . . . |
| A+0+4095 | A+4096+4095 | X | 1023 |
| Out-of-Order Counter (OOC) | | | 22 |
| In-Order Counter (IOC) | | | 0 |
| Read Pointer (RDP) | | | 0 |

TABLE 3F

RIFO Condition at Time t=t$_{17}$ (Write #5).

| Device Write Addr. Space 1 (bytes) | Device Write Addr. Space 2 (bytes) | Contents of Device Input Buffer | Dev. Input BufferRead Addr. (Words) |
|---|---|---|---|
| A+0+0 | A+4096+0 | 1a | 0 |
| A+0+4 | A+4096+4 | 1b | 1 |
| A+0+8 | A+4096+8 | 1c | 2 |
| A+0+12 | A+4096+12 | 1d | 3 |
| A+0+16 | A+4096+16 | 2a | 4 |
| A+0+20 | A+4096+20 | 2b | 5 |
| A+0+24 | A+4096+24 | 2c | 6 |
| A+0+28 | A+4096+28 | 2d | 7 |
| A+0+32 | A+4096+32 | 3a | 8 |
| A+0+36 | A+4096+36 | 3b | 9 |
| A+0+40 | A+4096+40 | 3c | 10 |
| A+0+44 | A+4096+44 | 4a | 11 |
| A+0+48 | A+4096+48 | 5a | 12 |
| A+0+52 | A+4096+52 | 5b | 13 |
| A+0+56 | A+4096+56 | 6a | 14 |
| A+0+60 | A+4096+60 | 6b | 15 |
| A+0+64 | A+4096+64 | 7a | 16 |
| A+0+68 | A+4096+68 | 7b | 17 |
| A+0+72 | A+4096+72 | 7c | 18 |
| A+0+76 | A+4096+76 | 8a | 19 |
| A+0+80 | A+4096+80 | 8b | 20 |
| A+0+84 | A+4096+84 | 8c | 21 |
| A+0+88 | A+4096+88 | 8d | 22 |
| A+0+92 | A+4096+92 | X | 23 |
| A+0+96 | A+4096+96 | X | 24 |
| A+0+100 | A+4096+100 | X | 25 |
| A+0+104 | A+4096+104 | X | 26 |
| A+0+108 | A+4096+108 | X | 27 |
| A+0+112 | A+4096+112 | X | 28 |
| A+0+116 | A+4096+116 | X | 29 |
| A+0+120 | A+4096+120 | X | 30 |
| A+0+124 | A+4096+124 | X | 31 |
| A+0+128 | A+4096+128 | X | 32 |
| A+0+132 | A+4096+132 | X | 33 |
| A+0+136 | A+4096+136 | X | 34 |
| A+0+140 | A+4096+140 | X | 35 |
| A+0+144 | A+4096+144 | X | 36 |
| A+0+148 | A+4096+148 | X | 37 |

TABLE 3F-continued

RIFO Condition at Time t=t$_{17}$ (Write #5).

| Device Write Addr. Space 1 (bytes) | Device Write Addr. Space 2 (bytes) | Contents of Device Input Buffer | Dev. Input BufferRead Addr. (Words) |
|---|---|---|---|
| A+0+152 | A+4096+152 | X | 38 |
| A+0+156 | A+4096+156 | X | 39 |
| A+0+160 | A+4096+160 | X | 40 |
| A+0+164 | A+4096+164 | X | 41 |
| ... | ... | ... | ... |
| A+0+4095 | A+4096+4095 | X | 1023 |
| Out-of-Order Counter (OOC) | | 23 | |
| In-Order Counter (IOC) | | 0 | |
| Read Pointer (RDP) | | 0 | |

TABLE 3G

RIFO Cond. at Time t=t$_{19}$ (RIFO Write #6).

| Device Write Addr. Space 1 (bytes) | Device Write Addr. Space 2 (bytes) | Contents of Device Input Buffer | Dev. Input BufferRead Addr. (Words) |
|---|---|---|---|
| A+0+0 | A+4096+0 | 1a | 0 |
| A+0+4 | A+4096+4 | 1b | 1 |
| A+0+8 | A+4096+8 | 1c | 2 |
| A+0+12 | A+4096+12 | 1d | 3 |
| A+0+16 | A+4096+16 | 2a | 4 |
| A+0+20 | A+4096+20 | 2b | 5 |
| A+0+24 | A+4096+24 | 2c | 6 |
| A+0+28 | A+4096+28 | 2d | 7 |
| A+0+32 | A+4096+32 | 3a | 8 |
| A+0+36 | A+4096+36 | 3b | 9 |
| A+0+40 | A+4096+40 | 3c | 10 |
| A+0+44 | A+4096+44 | 4a | 11 |
| A+0+48 | A+4096+48 | 5a | 12 |
| A+0+52 | A+4096+52 | 5b | 13 |
| A+0+56 | A+4096+56 | 6a | 14 |
| A+0+60 | A+4096+60 | 6b | 15 |
| A+0+64 | A+4096+64 | 7a | 16 |
| A+0+68 | A+4096+68 | 7b | 17 |
| A+0+72 | A+4096+72 | 7c | 18 |
| A+0+76 | A+4096+76 | 8a | 19 |
| A+0+80 | A+4096+80 | 8b | 20 |
| A+0+84 | A+4096+84 | 8c | 21 |
| A+0+88 | A+4096+88 | 8d | 22 |
| A+0+92 | A+4096+92 | X | 23 |
| A+0+96 | A+4096+96 | 9b | 24 |
| A+0+100 | A+4096+100 | 9c | 25 |
| A+0+104 | A+4096+104 | 10a | 26 |
| A+0+108 | A+4096+108 | 10b | 27 |
| A+0+112 | A+4096+112 | 10c | 28 |
| A+0+116 | A+4096+116 | 10d | 29 |
| A+0+120 | A+4096+120 | 11a | 30 |
| A+0+124 | A+4096+124 | 11b | 31 |
| A+0+128 | A+4096+128 | X | 32 |
| A+0+132 | A+4096+132 | X | 33 |
| A+0+136 | A+4096+136 | X | 34 |
| A+0+140 | A+4096+140 | X | 35 |
| A+0+144 | A+4096+144 | X | 36 |
| A+0+148 | A+4096+148 | X | 37 |
| A+0+152 | A+4096+152 | X | 38 |
| A+0+156 | A+4096+156 | X | 39 |
| A+0+160 | A+4096+160 | X | 40 |
| A+0+164 | A+4096+164 | X | 41 |
| ... | ... | ... | ... |
| A+0+4095 | A+4096+4095 | X | 1023 |
| Out-of-Order Counter (OOC) | | 8 | |
| In-Order Counter (IOC) | | 23 | |
| Read Pointer (RDP) | | 0 | |

TABLE 3H

RIFO Cond. at Time t=t$_{20}$ (RIFO Read #1).

| Device Write Addr. Space 1 (bytes) | Device Write Addr. Space 2 (bytes) | Contents of Device Input Buffer | Dev. Input BufferRead Addr. (Words) |
|---|---|---|---|
| A+0+0 | A+4096+0 | →1a | 0 |
| A+0+4 | A+4096+4 | 1b | 1 |
| A+0+8 | A+4096+8 | 1c | 2 |
| A+0+12 | A+4096+12 | 1d | 3 |
| A+0+16 | A+4096+16 | 2a | 4 |
| A+0+20 | A+4096+20 | 2b | 5 |
| A+0+24 | A+4096+24 | 2c | 6 |
| A+0+28 | A+4096+28 | 2d | 7 |
| A+0+32 | A+4096+32 | 3a | 8 |
| A+0+36 | A+4096+36 | 3b | 9 |
| A+0+40 | A+4096+40 | 3c | 10 |
| A+0+44 | A+4096+44 | 4a | 11 |
| A+0+48 | A+4096+48 | 5a | 12 |
| A+0+52 | A+4096+52 | 5b | 13 |
| A+0+56 | A+4096+56 | 6a | 14 |
| A+0+60 | A+4096+60 | 6b | 15 |
| A+0+64 | A+4096+64 | 7a | 16 |
| A+0+68 | A+4096+68 | 7b | 17 |
| A+0+72 | A+4096+72 | 7c | 18 |
| A+0+76 | A+4096+76 | 8a | 19 |
| A+0+80 | A+4096+80 | 8b | 20 |
| A+0+84 | A+4096+84 | 8c | 21 |
| A+0+88 | A+4096+88 | 8d | 22 |
| A+0+92 | A+4096+92 | X | 23 |
| A+0+96 | A+4096+96 | 9b | 24 |
| A+0+100 | A+4096+100 | 9c | 25 |
| A+0+104 | A+4096+104 | 10a | 26 |
| A+0+108 | A+4096+108 | 10b | 27 |
| A+0+112 | A+4096+112 | 10c | 28 |
| A+0+116 | A+4096+116 | 10d | 29 |
| A+0+120 | A+4096+120 | 11a | 30 |
| A+0+124 | A+4096+124 | 11b | 31 |
| A+0+128 | A+4096+128 | X | 32 |
| A+0+132 | A+4096+132 | X | 33 |
| A+0+136 | A+4096+136 | X | 34 |
| A+0+140 | A+4096+140 | X | 35 |
| A+0+144 | A+4096+144 | X | 36 |
| A+0+148 | A+4096+148 | X | 37 |
| A+0+152 | A+4096+152 | X | 38 |
| A+0+156 | A+4096+156 | X | 39 |
| A+0+160 | A+4096+160 | X | 40 |
| A+0+164 | A+4096+164 | X | 41 |
| ... | ... | ... | ... |
| A+0+4095 | A+4096+4095 | X | 1023 |
| Out-of-Order Counter (OOC) | | 8 | |
| In-Order Counter (IOC) | | 22 | |
| Read Pointer (RDP) | | 1 | |

TABLE 3I

RIFO Cond. at Time t=t$_{21}$ (RIFO Read #2).

| Device Write Addr. Space 1 (bytes) | Device Write Addr. Space 2 (bytes) | Contents of Device Input Buffer | Dev. Input BufferRead Addr. (Words) |
|---|---|---|---|
| A+0+0 | A+4096+0 | X | 0 |
| A+0+4 | A+4096+4 | →1b | 1 |
| A+0+8 | A+4096+8 | 1c | 2 |
| A+0+12 | A+4096+12 | 1d | 3 |
| A+0+16 | A+4096+16 | 2a | 4 |
| A+0+20 | A+4096+20 | 2b | 5 |
| A+0+24 | A+4096+24 | 2c | 6 |
| A+0+28 | A+4096+28 | 2d | 7 |
| A+0+32 | A+4096+32 | 3a | 8 |
| A+0+36 | A+4096+36 | 3b | 9 |
| A+0+40 | A+4096+40 | 3c | 10 |
| A+0+44 | A+4096+44 | 4a | 11 |

TABLE 3I-continued

RIFO Cond. at Time t=$t_{21}$ (RIFO Read #2).

| Device Write Addr. Space 1 (bytes) | Device Write Addr. Space 2 (bytes) | Contents of Device Input Buffer | Dev. Input BufferRead Addr. (Words) |
|---|---|---|---|
| A+0+48 | A+4096+48 | 5a | 12 |
| A+0+52 | A+4096+52 | 5b | 13 |
| A+0+56 | A+4096+56 | 6a | 14 |
| A+0+60 | A+4096+60 | 6b | 15 |
| A+0+64 | A+4096+64 | 7a | 16 |
| A+0+68 | A+4096+68 | 7b | 17 |
| A+0+72 | A+4096+72 | 7c | 18 |
| A+0+76 | A+4096+76 | 8a | 19 |
| A+0+80 | A+4096+80 | 8b | 20 |
| A+0+84 | A+4096+84 | 8c | 21 |
| A+0+88 | A+4096+88 | 8d | 22 |
| A+0+92 | A+4096+92 | X | 23 |
| A+0+96 | A+4096+96 | 9b | 24 |
| A+0+100 | A+4096+100 | 9c | 25 |
| A+0+104 | A+4096+104 | 10a | 26 |
| A+0+108 | A+4096+108 | 10b | 27 |
| A+0+112 | A+4096+112 | 10c | 28 |
| A+0+116 | A+4096+116 | 10d | 29 |
| A+0+120 | A+4096+120 | 11a | 30 |
| A+0+124 | A+4096+124 | 11b | 31 |
| A+0+128 | A+4096+128 | X | 32 |
| A+0+132 | A+4096+132 | X | 33 |
| A+0+136 | A+4096+136 | X | 34 |
| A+0+140 | A+4096+140 | X | 35 |
| A+0+144 | A+4096+144 | X | 36 |
| A+0+148 | A+4096+148 | X | 37 |
| A+0+152 | A+4096+152 | X | 38 |
| A+0+156 | A+4096+156 | X | 39 |
| A+0+160 | A+4096+160 | X | 40 |
| A+0+164 | A+4096+164 | X | 41 |
| ... | ... | ... | ... |
| A+0+4095 | A+4096+4095 | X | 1023 |
| Out-of-Order Counter (OOC) | | | 8 |
| In-Order Counter (IOC) | | | 21 |
| Read Pointer (RDP) | | | 2 |

TABLE 3J

RIFO Cond. at Time t=$t_{22}$ (RIFO Read #3).

| Device Write Addr. Space 1 (bytes) | Device Write Addr. Space 2 (bytes) | Contents of Device Input Buffer | Dev. Input BufferRead Addr. (Words) |
|---|---|---|---|
| A+0+0 | A+4096+0 | X | 0 |
| A+0+4 | A+4096+4 | X | 1 |
| A+0+8 | A+4096+8 | →1c | 2 |
| A+0+12 | A+4096+12 | 1d | 3 |
| A+0+16 | A+4096+16 | 2a | 4 |
| A+0+20 | A+4096+20 | 2b | 5 |
| A+0+24 | A+4096+24 | 2c | 6 |
| A+0+28 | A+4096+28 | 2d | 7 |
| A+0+32 | A+4096+32 | 3a | 8 |
| A+0+36 | A+4096+36 | 3b | 9 |
| A+0+40 | A+4096+40 | 3c | 10 |
| A+0+44 | A+4096+44 | 4a | 11 |
| A+0+48 | A+4096+48 | 5a | 12 |
| A+0+52 | A+4096+52 | 5b | 13 |
| A+0+56 | A+4096+56 | 6a | 14 |
| A+0+60 | A+4096+60 | 6b | 15 |
| A+0+64 | A+4096+64 | 7a | 16 |
| A+0+68 | A+4096+68 | 7b | 17 |
| A+0+72 | A+4096+72 | 7c | 18 |
| A+0+76 | A+4096+76 | 8a | 19 |
| A+0+80 | A+4096+80 | 8b | 20 |
| A+0+84 | A+4096+84 | 8c | 21 |
| A+0+88 | A+4096+88 | 8d | 22 |
| A+0+92 | A+4096+92 | X | 23 |

TABLE 3J-continued

RIFO Cond. at Time t=$t_{22}$ (RIFO Read #3).

| Device Write Addr. Space 1 (bytes) | Device Write Addr. Space 2 (bytes) | Contents of Device Input Buffer | Dev. Input BufferRead Addr. (Words) |
|---|---|---|---|
| A+0+96 | A+4096+96 | 9b | 24 |
| A+0+100 | A+4096+100 | 9c | 25 |
| A+0+104 | A+4096+104 | 10a | 26 |
| A+0+108 | A+4096+108 | 10b | 27 |
| A+0+112 | A+4096+112 | 10c | 28 |
| A+0+116 | A+4096+116 | 10d | 29 |
| A+0+120 | A+4096+120 | 11a | 30 |
| A+0+124 | A+4096+124 | 11b | 31 |
| A+0+128 | A+4096+128 | X | 32 |
| A+0+132 | A+4096+132 | X | 33 |
| A+0+136 | A+4096+136 | X | 34 |
| A+0+140 | A+4096+140 | X | 35 |
| A+0+144 | A+4096+144 | X | 36 |
| A+0+148 | A+4096+148 | X | 37 |
| A+0+152 | A+4096+152 | X | 38 |
| A+0+156 | A+4096+156 | X | 39 |
| A+0+160 | A+4096+160 | X | 40 |
| A+0+164 | A+4096+164 | X | 41 |
| ... | ... | ... | ... |
| A+0+4095 | A+4096+4095 | X | 1023 |
| Out-of-Order Counter (OOC) | | | 8 |
| In-Order Counter (IOC) | | | 20 |
| Read Pointer (RDP) | | | 3 |

TABLE 3K

RIFO Con. at Time t=$t_{23}$ (RIFO Read #4).

| Device Write Addr. Space 1 (bytes) | Device Write Addr. Space 2 (bytes) | Contents of Device Input Buffer | Dev. Input BufferRead Addr. (Words) |
|---|---|---|---|
| A+0+0 | A+4096+0 | X | 0 |
| A+0+4 | A+4096+4 | X | 1 |
| A+0+8 | A+4096+8 | X | 2 |
| A+0+12 | A+4096+12 | →1d | 3 |
| A+0+16 | A+4096+16 | 2a | 4 |
| A+0+20 | A+4096+20 | 2b | 5 |
| A+0+24 | A+4096+24 | 2c | 6 |
| A+0+28 | A+4096+28 | 2d | 7 |
| A+0+32 | A+4096+32 | 3a | 8 |
| A+0+36 | A+4096+36 | 3b | 9 |
| A+0+40 | A+4096+40 | 3c | 10 |
| A+0+44 | A+4096+44 | 4a | 11 |
| A+0+48 | A+4096+48 | 5a | 12 |
| A+0+52 | A+4096+52 | 5b | 13 |
| A+0+56 | A+4096+56 | 6a | 14 |
| A+0+60 | A+4096+60 | 6b | 15 |
| A+0+64 | A+4096+64 | 7a | 16 |
| A+0+68 | A+4096+68 | 7b | 17 |
| A+0+72 | A+4096+72 | 7c | 18 |
| A+0+76 | A+4096+76 | 8a | 19 |
| A+0+80 | A+4096+80 | 8b | 20 |
| A+0+84 | A+4096+84 | 8c | 21 |
| A+0+88 | A+4096+88 | 8d | 22 |
| A+0+92 | A+4096+92 | X | 23 |
| A+0+96 | A+4096+96 | 9b | 24 |
| A+0+100 | A+4096+100 | 9c | 25 |
| A+0+104 | A+4096+104 | 10a | 26 |
| A+0+108 | A+4096+108 | 10b | 27 |
| A+0+112 | A+4096+112 | 10c | 28 |
| A+0+116 | A+4096+116 | 10d | 29 |
| A+0+120 | A+4096+120 | 11a | 30 |
| A+0+124 | A+4096+124 | 11b | 31 |
| A+0+128 | A+4096+128 | X | 32 |
| A+0+132 | A+4096+132 | X | 33 |
| A+0+136 | A+4096+136 | X | 34 |
| A+0+140 | A+4096+140 | X | 35 |

TABLE 3K-continued

RIFO Con. at Time t=t₂₃ (RIFO Read #4).

| Device Write Addr. Space 1 (bytes) | Device Write Addr. Space 2 (bytes) | Contents of Device Input Buffer | Dev. Input BufferRead Addr. (Words) |
|---|---|---|---|
| A+0+144 | A+4096+144 | X | 36 |
| A+0+148 | A+4096+148 | X | 37 |
| A+0+152 | A+4096+152 | X | 38 |
| A+0+156 | A+4096+156 | X | 39 |
| A+0+160 | A+4096+160 | X | 40 |
| A+0+164 | A+4096+164 | X | 41 |
| ... | ... | ... | ... |
| A+0+4095 | A+4096+4095 | X | 1023 |
| Out-of-Order Counter (OOC) | | | 8 |
| In-Order Counter (IOC) | | | 19 |
| Read Pointer (RDP) | | | 4 |

TABLE 3L

RIFO Cond. at Time t=t₂₄ (RIFO Write #7).

| Device Write Addr. Space 1 (bytes) | Device Write Addr. Space 2 (bytes) | Contents of Device Input Buffer | Dev. Input BufferRead Addr. (Words) |
|---|---|---|---|
| A+0+0 | A+4096+0 | X | 0 |
| A+0+4 | A+4096+4 | X | 1 |
| A+0+8 | A+4096+8 | X | 2 |
| A+0+12 | A+4096+12 | X | 3 |
| A+0+16 | A+4096+16 | X | 4 |
| A+0+20 | A+4096+20 | 2b | 5 |
| A+0+24 | A+4096+24 | 2c | 6 |
| A+0+28 | A+4096+28 | 2d | 7 |
| A+0+32 | A+4096+32 | 3a | 8 |
| A+0+36 | A+4096+36 | 3b | 9 |
| A+0+40 | A+4096+40 | 3c | 10 |
| A+0+44 | A+4096+44 | 4a | 11 |
| A+0+48 | A+4096+48 | 5a | 12 |
| A+0+52 | A+4096+52 | 5b | 13 |
| A+0+56 | A+4096+56 | 6a | 14 |
| A+0+60 | A+4096+60 | 6b | 15 |
| A+0+64 | A+4096+64 | 7a | 16 |
| A+0+68 | A+4096+68 | 7b | 17 |
| A+0+72 | A+4096+72 | 7c | 18 |
| A+0+76 | A+4096+76 | 8a | 19 |
| A+0+80 | A+4096+80 | 8b | 20 |
| A+0+84 | A+4096+84 | 8c | 21 |
| A+0+88 | A+4096+88 | 8d | 22 |
| A+0+92 | A+4096+92 | 9a | 23 |
| A+0+96 | A+4096+96 | 9b | 24 |
| A+0+100 | A+4096+100 | 9c | 25 |
| A+0+104 | A+4096+104 | 10a | 26 |
| A+0+108 | A+4096+108 | 10b | 27 |
| A+0+112 | A+4096+112 | 10c | 28 |
| A+0+116 | A+4096+116 | 10d | 29 |
| A+0+120 | A+4096+120 | 11a | 30 |
| A+0+124 | A+4096+124 | 11b | 31 |
| A+0+128 | A+4096+128 | X | 32 |
| A+0+132 | A+4096+132 | X | 33 |
| A+0+136 | A+4096+136 | X | 34 |
| A+0+140 | A+4096+140 | X | 35 |
| A+0+144 | A+4096+144 | X | 36 |
| A+0+148 | A+4096+148 | X | 37 |
| A+0+152 | A+4096+152 | X | 38 |
| A+0+156 | A+4096+156 | X | 39 |
| A+0+160 | A+4096+160 | X | 40 |
| A+0+164 | A+4096+164 | X | 41 |
| ... | ... | ... | ... |
| A+0+4095 | A+4096+4095 | X | 1023 |
| Out-of-Order Counter (OOC) | | | 9 |
| In-Order Counter (IOC) | | | 18 |
| Read Pointer (RDP) | | | 5 |

TABLE 3M

RIFO Cond. at Time t=t₂₅ (RIFORead #5).

| Device Write Addr. Space 1 (bytes) | Device Write Addr. Space 2 (bytes) | Contents of Device Input Buffer | Dev. Input BufferRead Addr. (Words) |
|---|---|---|---|
| A+0+0 | A+4096+0 | X | 0 |
| A+0+4 | A+4096+4 | X | 1 |
| A+0+8 | A+4096+8 | X | 2 |
| A+0+12 | A+4096+12 | X | 3 |
| A+0+16 | A+4096+16 | →2a | 4 |
| A+0+20 | A+4096+20 | 2b | 5 |
| A+0+24 | A+4096+24 | 2c | 6 |
| A+0+28 | A+4096+28 | 2d | 7 |
| A+0+32 | A+4096+32 | 3a | 8 |
| A+0+36 | A+4096+36 | 3b | 9 |
| A+0+40 | A+4096+40 | 3c | 10 |
| A+0+44 | A+4096+44 | 4a | 11 |
| A+0+48 | A+4096+48 | 5a | 12 |
| A+0+52 | A+4096+52 | 5b | 13 |
| A+0+56 | A+4096+56 | 6a | 14 |
| A+0+60 | A+4096+60 | 6b | 15 |
| A+0+64 | A+4096+64 | 7a | 16 |
| A+0+68 | A+4096+68 | 7b | 17 |
| A+0+72 | A+4096+72 | 7c | 18 |
| A+0+76 | A+4096+76 | 8a | 19 |
| A+0+80 | A+4096+80 | 8b | 20 |
| A+0+84 | A+4096+84 | 8c | 21 |
| A+0+88 | A+4096+88 | 8d | 22 |
| A+0+92 | A+4096+92 | 9a | 23 |
| A+0+96 | A+4096+96 | 9b | 24 |
| A+0+100 | A+4096+100 | 9c | 25 |
| A+0+104 | A+4096+104 | 10a | 26 |
| A+0+108 | A+4096+108 | 10b | 27 |
| A+0+112 | A+4096+112 | 10c | 28 |
| A+0+116 | A+4096+116 | 10d | 29 |
| A+0+120 | A+4096+120 | 11a | 30 |
| A+0+124 | A+4096+124 | 11b | 31 |
| A+0+128 | A+4096+128 | X | 32 |
| A+0+132 | A+4096+132 | X | 33 |
| A+0+136 | A+4096+136 | X | 34 |
| A+0+140 | A+4096+140 | X | 35 |
| A+0+144 | A+4096+144 | X | 36 |
| A+0+148 | A+4096+148 | X | 37 |
| A+0+152 | A+4096+152 | X | 38 |
| A+0+156 | A+4096+156 | X | 39 |
| A+0+160 | A+4096+160 | X | 40 |
| A+0+164 | A+4096+164 | X | 41 |
| ... | ... | ... | ... |
| A+0+4095 | A+4096+4095 | X | 1023 |
| Out-of-Order Counter (OOC) | | | 8 |
| In-Order Counter (IOC) | | | 18 |
| Read Pointer (RDP) | | | 5 |

TABLE 3N

RIFO Cond. at Time t=t₂₆ (RIFO Read #6).

| Device Write Addr. Space 1 (bytes) | Device Write Addr. Space 2 (bytes) | Contents of Device Input Buffer | Dev. Input BufferRead Addr. (Words) |
|---|---|---|---|
| A+0+0 | A+4096+0 | X | 0 |
| A+0+4 | A+4096+4 | X | 1 |
| A+0+8 | A+4096+8 | X | 2 |
| A+0+12 | A+4096+12 | X | 3 |
| A+0+16 | A+4096+16 | X | 4 |
| A+0+20 | A+4096+20 | →2b | 5 |
| A+0+24 | A+4096+24 | 2c | 6 |
| A+0+28 | A+4096+28 | 2d | 7 |
| A+0+32 | A+4096+32 | 3a | 8 |
| A+0+36 | A+4096+36 | 3b | 9 |
| A+0+40 | A+4096+40 | 3c | 10 |
| A+0+44 | A+4096+44 | 4a | 11 |

TABLE 3N-continued

RIFO Cond. at Time t=t_{26} (RIFO Read #6).

| Device Write Addr. Space 1 (bytes) | Device Write Addr. Space 2 (bytes) | Contents of Device Input Buffer | Dev. Input BufferRead Addr. (Words) |
|---|---|---|---|
| A+0+48 | A+4096+48 | 5a | 12 |
| A+0+52 | A+4096+52 | 5b | 13 |
| A+0+56 | A+4096+56 | 6a | 14 |
| A+0+60 | A+4096+60 | 6b | 15 |
| A+0+64 | A+4096+64 | 7a | 16 |
| A+0+68 | A+4096+68 | 7b | 17 |
| A+0+72 | A+4096+72 | 7c | 18 |
| A+0+76 | A+4096+76 | 8a | 19 |
| A+0+80 | A+4096+80 | 8b | 20 |
| A+0+84 | A+4096+84 | 8c | 21 |
| A+0+88 | A+4096+88 | 8d | 22 |
| A+0+92 | A+4096+92 | 9a | 23 |
| A+0+96 | A+4096+96 | 9b | 24 |
| A+0+100 | A+4096+100 | 9c | 25 |
| A+0+104 | A+4096+104 | 10a | 26 |
| A+0+108 | A+4096+108 | 10b | 27 |
| A+0+112 | A+4096+112 | 10c | 28 |
| A+0+116 | A+4096+116 | 10d | 29 |
| A+0+120 | A+4096+120 | 11a | 30 |
| A+0+124 | A+4096+124 | 11b | 31 |
| A+0+128 | A+4096+128 | X | 32 |
| A+0+132 | A+4096+132 | X | 33 |
| A+0+136 | A+4096+136 | X | 34 |
| A+0+140 | A+4096+140 | X | 35 |
| A+0+144 | A+4096+144 | X | 36 |
| A+0+148 | A+4096+148 | X | 37 |
| A+0+152 | A+4096+152 | X | 38 |
| A+0+156 | A+4096+156 | X | 39 |
| A+0+160 | A+4096+160 | X | 40 |
| A+0+164 | A+4096+164 | X | 41 |
| . . . | . . . | . . . | . . . |
| A+0+4095 | A+4096+4095 | X | 1023 |
| Out-of-Order Counter (OOC) | | | 9 |
| in-Order Counter (IOC) | | | 17 |
| Read Pointer (RDP) | | | 6 |

TABLE 3O

RIFO Cond. at Time t=t_{27} (RIFO Read #7).

| Device Write Addr. Space 1 (bytes) | Device Write Addr. Space 2 (bytes) | Contents of Device Input Buffer | Dev. Input BufferRead Addr. (Words) |
|---|---|---|---|
| A+0+0 | A+4096+0 | X | 0 |
| A+0+4 | A+4096+4 | X | 1 |
| A+0+8 | A+4096+8 | X | 2 |
| A+0+12 | A+4096+12 | X | 3 |
| A+0+16 | A+4096+16 | X | 4 |
| A+0+20 | A+4096+20 | X | 5 |
| A+0+24 | A+4096+24 | →2c | 6 |
| A+0+28 | A+4096+28 | 2d | 7 |
| A+0+32 | A+4096+32 | 3a | 8 |
| A+0+36 | A+4096+36 | 3b | 9 |
| A+0+40 | A+4096+40 | 3c | 10 |
| A+0+44 | A+4096+44 | 4a | 11 |
| A+0+48 | A+4096+48 | 5a | 12 |
| A+0+52 | A+4096+52 | 5b | 13 |
| A+0+56 | A+4096+56 | 6a | 14 |
| A+0+60 | A+4096+60 | 6b | 15 |
| A+0+64 | A+4096+64 | 7a | 16 |
| A+0+68 | A+4096+68 | 7b | 17 |
| A+0+72 | A+4096+72 | 7c | 18 |
| A+0+76 | A+4096+76 | 8a | 19 |
| A+0+80 | A+4096+80 | 8b | 20 |
| A+0+84 | A+4096+84 | 8c | 21 |
| A+0+88 | A+4096+88 | 8d | 22 |
| A+0+92 | A+4096+92 | 9a | 23 |

TABLE 3O-continued

RIFO Cond. at Time t=t_{27} (RIFO Read #7).

| Device Write Addr. Space 1 (bytes) | Device Write Addr. Space 2 (bytes) | Contents of Device Input Buffer | Dev. Input BufferRead Addr. (Words) |
|---|---|---|---|
| A+0+96 | A+4096+96 | 9b | 24 |
| A+0+100 | A+4096+100 | 9c | 25 |
| A+0+104 | A+4096+104 | 10a | 26 |
| A+0+108 | A+4096+108 | 10b | 27 |
| A+0+112 | A+4096+112 | 10c | 28 |
| A+0+116 | A+4096+116 | 10d | 29 |
| A+0+120 | A+4096+120 | 11a | 30 |
| A+0+124 | A+4096+124 | 11b | 31 |
| A+0+128 | A+4096+128 | X | 32 |
| A+0+132 | A+4096+132 | X | 33 |
| A+0+136 | A+4096+136 | X | 34 |
| A+0+140 | A+4096+140 | X | 35 |
| A+0+144 | A+4096+144 | X | 36 |
| A+0+148 | A+4096+148 | X | 37 |
| A+0+152 | A+4096+152 | X | 38 |
| A+0+156 | A+4096+156 | X | 39 |
| A+0+160 | A+4096+160 | X | 40 |
| A+0+164 | A+4096+164 | X | 41 |
| . . . | . . . | . . . | . . . |
| A+0+4095 | A+4096+4095 | X | 1023 |
| Out-of-Order Counter (OOC) | | | 9 |
| In-Order Counter (IOC) | | | 16 |
| Read Pointer (RDP) | | | 7 |

TABLE 3P

RIFO Cond. at Time t=t_{28} (RIFO Write #8).

| Device Write Addr. Space 1 (bytes) | Device Write Addr. Space 2 (bytes) | Contents of Device Input Buffer | Dev. Input BufferRead Addr. (Words) |
|---|---|---|---|
| A+0+0 | A+4096+0 | X | 0 |
| A+0+4 | A+4096+4 | X | 1 |
| A+0+8 | A+4096+8 | X | 2 |
| A+0+12 | A+4096+12 | X | 3 |
| A+0+16 | A+4096+16 | X | 4 |
| A+0+20 | A+4096+20 | X | 5 |
| A+0+24 | A+4096+24 | X | 6 |
| A+0+28 | A+4096+28 | 2d | 7 |
| A+0+32 | A+4096+32 | 3a | 8 |
| A+0+36 | A+4096+36 | 3b | 9 |
| A+0+40 | A+4096+40 | 3c | 10 |
| A+0+44 | A+4096+44 | 4a | 11 |
| A+0+48 | A+4096+48 | 5a | 12 |
| A+0+52 | A+4096+52 | 5b | 13 |
| A+0+56 | A+4096+56 | 6a | 14 |
| A+0+60 | A+4096+60 | 6b | 15 |
| A+0+64 | A+4096+64 | 7a | 16 |
| A+0+68 | A+4096+68 | 7b | 17 |
| A+0+72 | A+4096+72 | 7c | 18 |
| A+0+76 | A+4096+76 | 8a | 19 |
| A+0+80 | A+4096+80 | 8b | 20 |
| A+0+84 | A+4096+84 | 8c | 21 |
| A+0+88 | A+4096+88 | 8d | 22 |
| A+0+92 | A+4096+92 | 9a | 23 |
| A+0+96 | A+4096+96 | 9b | 24 |
| A+0+100 | A+4096+100 | 9c | 25 |
| A+0+104 | A+4096+104 | 10a | 26 |
| A+0+108 | A+4096+108 | 10b | 27 |
| A+0+112 | A+4096+112 | 10c | 28 |
| A+0+116 | A+4096+116 | 10d | 29 |
| A+0+120 | A+4096+120 | 11a | 30 |
| A+0+124 | A+4096+124 | 11b | 31 |
| A+0+128 | A+4096+128 | 12a | 32 |
| A+0+132 | A+4096+132 | 12b | 33 |
| A+0+136 | A+4096+136 | 12c | 34 |
| A+0+140 | A+4096+140 | 13a | 35 |

TABLE 3P-continued

RIFO Cond. at Time t=t₂₈ (RIFO Write #8).

| Device Write Addr. Space 1 (bytes) | Device Write Addr. Space 2 (bytes) | Contents of Device Input Buffer | Dev. Input BufferRead Addr. (Words) |
|---|---|---|---|
| A+0+144 | A+4096+144 | 13b | 36 |
| A+0+148 | A+4096+148 | 14a | 37 |
| A+0+152 | A+4096+152 | 14b | 38 |
| A+0+156 | A+4096+156 | 14c | 39 |
| A+0+160 | A+4096+160 | X | 40 |
| A+0+164 | A+4096+164 | X | 41 |
| ... | ... | ... | ... |
| A+0+4095 | A+4096+4095 | X | 1023 |
| Out-of-Order Counter (OOC) | | 8 | |
| In-Order Counter (IOC) | | 25 | |
| Read Pointer (RDP) | | 7 | |

TABLE 3Q

RIFO Cond. at Time t=t₂₉ (RIFO Write #9).

| Device Write Addr. Space 1 (bytes) | Device Write Addr. Space 2 (bytes) | Contents of Device Input Buffer | Dev. Input BufferRead Addr. (Words) |
|---|---|---|---|
| A+0+0 | A+4096+0 | X | 0 |
| A+0+4 | A+4096+4 | X | 1 |
| A+0+8 | A+4096+8 | X | 2 |
| A+0+12 | A+4096+12 | X | 3 |
| A+0+16 | A+4096+16 | X | 4 |
| A+0+20 | A+4096+20 | X | 5 |
| A+0+24 | A+4096+24 | X | 6 |
| A+0+28 | A+4096+28 | 2d | 7 |
| A+0+32 | A+4096+32 | 3a | 8 |
| A+0+36 | A+4096+36 | 3b | 9 |
| A+0+40 | A+4096+40 | 3c | 10 |
| A+0+44 | A+4096+44 | 4a | 11 |
| A+0+48 | A+4096+48 | 5a | 12 |
| A+0+52 | A+4096+52 | 5b | 13 |
| A+0+56 | A+4096+56 | 6a | 14 |
| A+0+60 | A+4096+60 | 6b | 15 |
| A+0+64 | A+4096+64 | 7a | 16 |
| A+0+68 | A+4096+68 | 7b | 17 |
| A+0+72 | A+4096+72 | 7c | 18 |
| A+0+76 | A+4096+76 | 8a | 19 |
| A+0+80 | A+4096+80 | 8b | 20 |
| A+0+84 | A+4096+84 | 8c | 21 |
| A+0+88 | A+4096+88 | 8d | 22 |
| A+0+92 | A+4096+92 | 9a | 23 |
| A+0+96 | A+4096+96 | 9b | 24 |
| A+0+100 | A+4096+100 | 9c | 25 |
| A+0+104 | A+4096+104 | 10a | 26 |
| A+0+108 | A+4096+108 | 10b | 27 |
| A+0+112 | A+4096+112 | 10c | 28 |
| A+0+116 | A+4096+116 | 10d | 29 |
| A+0+120 | A+4096+120 | 11a | 30 |
| A+0+124 | A+4096+124 | 11b | 31 |
| A+0+128 | A+4096+128 | 12a | 32 |
| A+0+132 | A+4096+132 | 12b | 33 |
| A+0+136 | A+4096+136 | 12c | 34 |
| A+0+140 | A+4096+140 | 13a | 35 |
| A+0+144 | A+4096+144 | 13b | 36 |
| A+0+148 | A+4096+148 | 14a | 37 |
| A+0+152 | A+4096+152 | 14b | 38 |
| A+0+156 | A+4096+156 | 14c | 39 |
| A+0+160 | A+4096+160 | 14d | 40 |
| A+0+164 | A+4096+164 | 15a | 41 |
| ... | ... | ... | ... |
| A+0+4095 | A+4096+4095 | X | 1023 |
| Out-of-Order Counter (OOC) | | 10 | |
| In-Order Counter (IOC) | | 25 | |
| Read Pointer (RDP) | | 7 | |

TABLE 3R

RIFO Cond. at Time t=t₃₀ (RIFO Read#8).

| Device Write Addr. Space 1 (bytes) | Device Write Addr. Space 2 (bytes) | Contents of Device Input Buffer | Dev. Input BufferRead Addr. (Words) |
|---|---|---|---|
| A+0+0 | A+4096+0 | X | 0 |
| A+0+4 | A+4096+4 | X | 1 |
| A+0+8 | A+4096+8 | X | 2 |
| A+0+12 | A+4096+12 | X | 3 |
| A+0+16 | A+4096+16 | X | 4 |
| A+0+20 | A+4096+20 | X | 5 |
| A+0+24 | A+4096+24 | X | 6 |
| A+0+28 | A+4096+28 | →2d | 7 |
| A+0+32 | A+4096+32 | 3a | 8 |
| A+0+36 | A+4096+36 | 3b | 9 |
| A+0+40 | A+4096+40 | 3c | 10 |
| A+0+44 | A+4096+44 | 4a | 11 |
| A+0+48 | A+4096+48 | 5a | 12 |
| A+0+52 | A+4096+52 | 5b | 13 |
| A+0+56 | A+4096+56 | 6a | 14 |
| A+0+60 | A+4096+60 | 6b | 15 |
| A+0+64 | A+4096+64 | 7a | 16 |
| A+0+68 | A+4096+68 | 7b | 17 |
| A+0+72 | A+4096+72 | 7c | 18 |
| A+0+76 | A+4096+76 | 8a | 19 |
| A+0+80 | A+4096+80 | 8b | 20 |
| A+0+84 | A+4096+84 | 8c | 21 |
| A+0+88 | A+4096+88 | 8d | 22 |
| A+0+92 | A+4096+92 | 9a | 23 |
| A+0+96 | A+4096+96 | 9b | 24 |
| A+0+100 | A+4096+100 | 9c | 25 |
| A+0+104 | A+4096+104 | 10a | 26 |
| A+0+108 | A+4096+108 | 10b | 27 |
| A+0+112 | A+4096+112 | 10c | 28 |
| A+0+116 | A+4096+116 | 10d | 29 |
| A+0+120 | A+4096+120 | 11a | 30 |
| A+0+124 | A+4096+124 | 11b | 31 |
| A+0+128 | A+4096+128 | 12a | 32 |
| A+0+132 | A+4096+132 | 12b | 33 |
| A+0+136 | A+4096+136 | 12c | 34 |
| A+0+140 | A+4096+140 | 13a | 35 |
| A+0+144 | A+4096+144 | 13b | 36 |
| A+0+148 | A+4096+148 | 14a | 37 |
| A+0+152 | A+4096+152 | 14b | 38 |
| A+0+156 | A+4096+156 | 14c | 39 |
| A+0+160 | A+4096+160 | 14d | 40 |
| A+0+164 | A+4096+164 | 15a | 41 |
| ... | ... | ... | ... |
| A+0+4095 | A+4096+4095 | X | 1023 |
| Out-of-Order Counter (OOC) | | 10 | |
| In-Order Counter (IOC) | | 24 | |
| Read Pointer (RDP) | | 8 | |

We claim:

1. In a data processing system having a host processor executing write instructions and communicating results in the form of symbols generated by said write instructions to at least one hardware device coupled to said host processor for receiving said symbols from said host processor, a method for preserving a predetermined order in which said symbols are received by said hardware device, said method comprising steps of:

sending a symbol from said host processor to a storage with an identifier indicating a symbol ordering relative to other of said symbols;

storing said symbol and said indicator in said storage; and altering the order of dispatch of said symbols from said storage to said hardware device based on said indicator so that said symbols are received by said hardware device in said predetermined order independent of the order in which said symbols were communicated by said host processor.

2. The method in claim 1, wherein said indicator is a bit associated with an address.

3. The method in claim 1, further including step of:

executing a write fence operation in said host processor when a particular first symbol is intended to be received by said hardware device before said hardware device receives a second symbol.

4. The method in claim 3, wherein said indicator is a bit associated with an address and said bit has a first state and a second state; and further including step of:

changing the state of said bit associated with said address from a current state to the other state every time said step of executing a write fence operation is preformed.

5. In a data processing system having a host processor executing write instructions and communicating results in the form of symbols generated by said write instructions to at least one hardware device coupled to said host processor for receiving said symbols from said host processor, a method for preserving a predetermined order in which said symbols are received by said hardware device, said method comprising steps of:

sending a said symbol from said host processor to a storage with an address indicating a symbol ordering relative to other of said symbols;

storing said sent symbol at a location in said storage if a flag indicator associated with said location indicates said storage does not have valid data at said address, said location being associated with said address;

waiting to store said sent symbol at said location in said storage if said flag indicator associated with said location indicates said storage contains a valid symbol at said location;

reading, in a sequential location manner, a next symbol from said storage at a next location if a flag indicator associated with said next location indicates said storage contains said valid symbol at said next location; and waiting to read from said next location if said flag indicator associated with said next location indicates said storage does not contain a said valid symbol at said next location.

6. The method in claim 5, wherein the step of reading, changes said flag indicator associated with said next location from indicating said storage contains a valid symbol to indicating said storage does not contain a valid symbol.

7. The method in claim 5, wherein the step of waiting to store further comprises putting said sent symbol in a first-in-first-out memory, said first-in-first-out memory storing a plurality of said sent symbols.

* * * * *